United States Patent
Muraoka et al.

(10) Patent No.: US 9,040,208 B2
(45) Date of Patent: May 26, 2015

(54) CATALYST LAYER FOR FUEL CELL MEMBRANE ELECTRODE ASSEMBLY, FUEL CELL MEMBRANE ELECTRODE ASSEMBLY USING THE CATALYST LAYER, FUEL CELL, AND METHOD FOR PRODUCING THE CATALYST LAYER

(75) Inventors: Masashi Muraoka, Osaka (JP); Kohtaroh Saitoh, Osaka (JP); Hirotaka Mizuhata, Osaka (JP); Takenori Onishi, Osaka (JP); Yimin Zhu, Fremont, CA (US); Ionel C. Stefan, Hayward, CA (US); Baixin Qian, Sunnyvale, CA (US); Jay Goldman, Mountain View, CA (US)

(73) Assignees: OneD Material LLC, Palo Alto, CA (US); Sharp Kabushiki Kaisha, Osaka (JP)

( * ) Notice: Subject to any disclaimer, the term of this patent is extended or adjusted under 35 U.S.C. 154(b) by 703 days.

(21) Appl. No.: 12/772,862

(22) Filed: May 3, 2010

(65) Prior Publication Data
US 2011/0008707 A1    Jan. 13, 2011

Related U.S. Application Data

(60) Provisional application No. 61/175,293, filed on May 4, 2009.

(51) Int. Cl.
*H01M 8/10* (2006.01)
*B01J 23/00* (2006.01)
(Continued)

(52) U.S. Cl.
CPC .......... *H01M 4/9016* (2013.01); *H01M 4/9075* (2013.01); *H01M 4/9083* (2013.01);
(Continued)

(58) Field of Classification Search
None
See application file for complete search history.

(56) References Cited

U.S. PATENT DOCUMENTS

| 4,849,311 A | 7/1989 | Itoh et al. |
|---|---|---|
| 5,399,184 A | 3/1995 | Harada |

(Continued)

FOREIGN PATENT DOCUMENTS

| JP | 2008-066229 A | 3/2008 |
|---|---|---|
| JP | 2008-66230 A | 3/2008 |

(Continued)

OTHER PUBLICATIONS

Björk, M.T., et al., "One-dimensional steeplechase for electrons realized," *Nano Letters* 2(2):87-89, American Chemical Society, United States (Jan. 2002).

(Continued)

*Primary Examiner* — Sarah A Slifka
(74) *Attorney, Agent, or Firm* — Sterne, Kessler, Goldstein & Fox P.L.L.C.

(57) ABSTRACT

A catalyst layer for a fuel cell membrane electrode assembly includes a plurality of agglomerates, adjacent ones of the plurality of agglomerates contacting with each other with pores provided between said adjacent ones of the plurality of agglomerates, each of the plurality of agglomerates being formed by packing a plurality of catalysts each consisting of noble metal fine particles supported on a fiber-like support material, adjacent ones of the plurality of catalysts contacting with each other with pores provided between said adjacent ones of the plurality of catalysts, and each of the plurality of catalysts contacting with a plurality of catalysts other than said each catalyst at a plurality of contact points. This allows providing a catalyst layer, a fuel cell membrane electrode assembly, and a fuel cell, each of which has compact size and excellent power generation performance, and a method for producing the same.

11 Claims, 31 Drawing Sheets

(51) Int. Cl.
*H01M 4/90* (2006.01)
*H01M 4/92* (2006.01)

(52) U.S. Cl.
CPC ............ *H01M4/925* (2013.01); *H01M 4/926* (2013.01); *H01M 8/1004* (2013.01); *H01M 8/1009* (2013.01); *H01M 8/1011* (2013.01); *H01M 8/1013* (2013.01); *Y02E 60/523* (2013.01); *Y02E 60/522* (2013.01)

(56) References Cited

U.S. PATENT DOCUMENTS

| | | | |
|---|---|---|---|
| 5,505,928 | A | 4/1996 | Alivisatos et al. |
| 5,635,041 | A | 6/1997 | Bahar et al. |
| 5,690,807 | A | 11/1997 | Clark, Jr. et al. |
| 5,751,018 | A | 5/1998 | Alivisatos et al. |
| 5,897,945 | A | 4/1999 | Lieber et al. |
| 5,990,479 | A | 11/1999 | Weiss et al. |
| 5,997,832 | A | 12/1999 | Lieber et al. |
| 6,036,774 | A | 3/2000 | Lieber et al. |
| 6,048,616 | A | 4/2000 | Gallagher et al. |
| 6,136,156 | A | 10/2000 | El-Shall et al. |
| 6,225,198 | B1 | 5/2001 | Alivisatos et al. |
| 6,306,736 | B1 | 10/2001 | Alivisatos et al. |
| 6,413,489 | B1 | 7/2002 | Ying et al. |
| 6,875,537 | B2 | 4/2005 | Tani et al. |
| 6,926,985 | B2 | 8/2005 | Wariishi et al. |
| 6,933,033 | B1 | 8/2005 | Forsyth et al. |
| 6,949,206 | B2 | 9/2005 | Whiteford et al. |
| 6,962,823 | B2 | 11/2005 | Empedocles et al. |
| 7,179,561 | B2 | 2/2007 | Niu et al. |
| 2002/0179434 | A1 | 12/2002 | Dai et al. |
| 2003/0089899 | A1 | 5/2003 | Lieber et al. |
| 2004/0234841 | A1 | 11/2004 | Yoshitake et al. |
| 2005/0066883 | A1 | 3/2005 | Dubrow et al. |
| 2005/0181195 | A1 | 8/2005 | Dubrow |
| 2006/0188774 | A1 | 8/2006 | Niu et al. |
| 2007/0212538 | A1 | 9/2007 | Niu |
| 2007/0238001 | A1* | 10/2007 | Koyama .................. 429/33 |
| 2008/0280169 | A1 | 11/2008 | Niu et al. |
| 2009/0017363 | A1 | 1/2009 | Niu et al. |

FOREIGN PATENT DOCUMENTS

| | | |
|---|---|---|
| JP | 2008-523565 A | 7/2008 |
| JP | 2009-524567 A | 7/2009 |
| WO | WO 01/03208 A1 | 1/2001 |
| WO | WO 02/17362 A2 | 2/2002 |
| WO | WO 02/48701 A2 | 6/2002 |
| WO | WO 02/075831 A1 | 9/2002 |

OTHER PUBLICATIONS

Cao, YunWei and Banin, Uri, Growth and properties of semiconductor core/shell nanocrystals with InAs cores *J. Am. Chem. Soc.* 122(40):9692-9702, American Chemical Society, United States (Sep. 2000).

Cui, Y., et al., "Diameter-controlled synthesis of single-crystal silicon nanowires" *Appl. Phys. Lett.* 78(15):2214-2216, American Institute of Physics, United States (2001).

Cui, Y. et al., "Doping and electrical transport in silicon nanowires" *J. Phys. Chem. B* 104(22):5213-5216, American Chemical Society, United States (May 2000).

Dabbousi, B.O., et al., "(CdSe)ZnS core-shell quantum dots: Synthesis and characterization of a size series of highly luminescent nanocrysallites" *J. Phys. Chem. B* 101(46):9463-9475, American Chemical Society, United States (Nov. 1997).

Duan, X. and Lieber, C.M., "General synthesis of compound semiconductor nanowires," *Adv. Mater.* 12(4):298-302, Wiley-VCH Verlag GmbH & Co. KGaA, Weinheim, Germany (2000).

Greene, L.E., et al., "Low-temperature wafer scale production of ZnO nanowire arrays," *Angew. Chem. Int. Ed. Engl.* 42(26):3031-3034, Wiley-VCH, Germany (2003).

Gudiksen, M.S. and Lieber, C.M., "Diameter-selective synthesis of semiconductor nanowires" *J. Am. Chem. Soc.* 122(32):8801-8802, American Chemical Society, United States (2000).

Gudiksen, M.S., et al., "Growth of nanowire supedattice structures for nanoscale photonics and electronics," *Nature* 415(6872):617-20, Nature Publishing Group, England (Feb. 2002).

Gudiksen, M.S., et al., "Synthetic control of the diameter and length of single crystal semiconductor nanowires" *J. Phys. Chem. B* 105(19):4062-4064, American Chemical Society, United States (2001).

Jun, Y.W., et al., "Controlled synthesis of multi-armed CdS nanorod architectures using mono surfactant system" *J. Am. Chem. Soc.* 123(21):5150-51, American Chemical Society, United States (May 2001).

Liu, C., et al., "Sol-Gel Synthesis of Free-Standing Ferroelectric Lead Zirconate Titanate Nanoparticles," *J. Am. Chem. Soc.* 123(18):4344-45, American Chemical Society, United States (Apr. 2001).

Manna, L., et al., "Epitaxial growth and photochemical annealing of graded CdS/ZnS shells on colloidal CdSe nanorods," *J. Am. Chem. Soc.* 124(24):7136-7145, American Chemical Society, United States (May 2002).

Manna, L., et al., "Synthesis of Soluble and Processable Rod-,Arrow-, Teardrop-, and Tetrapod-Shaped CdSe Nanocrystals" *J. Am. Chem. Soc.* 122(51):12700-06, American Chemical Society, United States (Dec. 2000).

Morales, A.M. and Lieber, C.M., "A laser ablation method for the synthesis of crystalline semiconductor nanowires" *Science* 279(5348):208-11, American Association for the Advancement of Science, United States (Jan. 1998).

Peng, X, et al., "Shape control of CdSe nanocrystals," *Nature* 404(6773):59-61, Nature Publishing Group, England (Mar. 2000).

Peng, X., et al., "Epitaxial growth of highly luminescent CdSe/CdS core/shell nanocrystals with photostability and electronic accessibility," *J. Am. Chem. Soc.* 119(30):7019-7029, American Chemical Society, United States (Jul. 1997).

Puntes, V.F., et al., "Colloidal nanocrystal shape and size control: the case of cobalt," *Science* 291(5511):2115-17, American Association for the Advancement of Science, United States (Mar. 2001).

Urban, J.J., et al., "Synthesis of single-crystalline perovskite nanowirescomposed of barium titanate and strontium titanate" *J. Am. Chem. Soc.,* 124(7):1186-87, American Chemical Society, United States (Jan. 2002).

Wu, Y., et al., "Block-byblock growth of single-crystalline Si/SiGe supedattice nanowires," *Nano Letters* 2(2):83-86, American Chemical Society, United States (Jan. 2002).

Yun, W.S., et al., "Ferroelectric Properties of Individual Barium Titanate Nanowires Investigated by Scanned Probe Microscopy" *Nano Letters* 2(5):447-50, American Chemical Society, United States (2002).

U.S. Appl. No. 60/370,095, inventor Empedocles, entitled "Nanowire heterostructures for encoding information," filed Apr. 2, 2002.

U.S. Appl. No. 60/738,100, inventor Niu, entitled "Nanowire structures comprising carbon," filed Nov. 21, 2005.

U.S. Appl. No. 61/108,301, inventor Zhu, entitled "Membrane Electrode Assemblies with Interfacial Layer," filed Oct. 24, 2008.

English language translation (machine generated) for Japanese Patent Publication No. 2008-66230 A, Industrial Property Digital Library (IPDL) of Japanese Patent Office (JPO), (2008).

* cited by examiner

FIG. 4
(a) EXAMPLE 1 (FIG. 3)
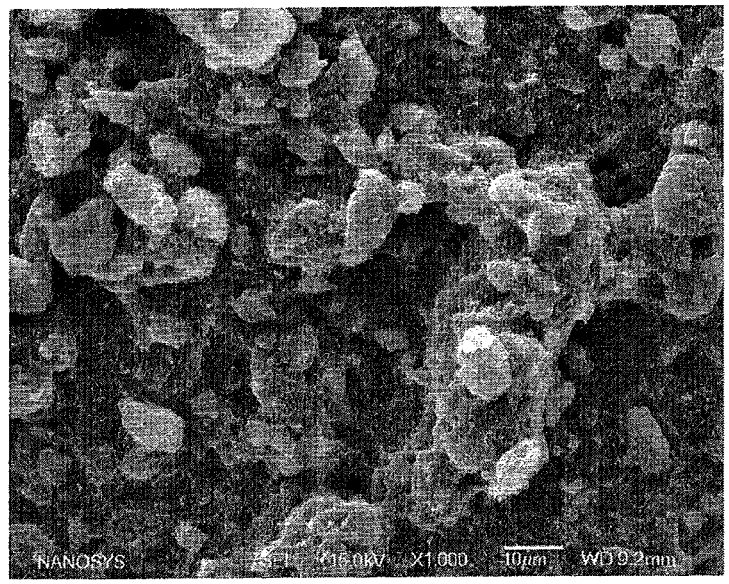
(b) COMPARATIVE EXAMPLE 1 (FIG. 2)
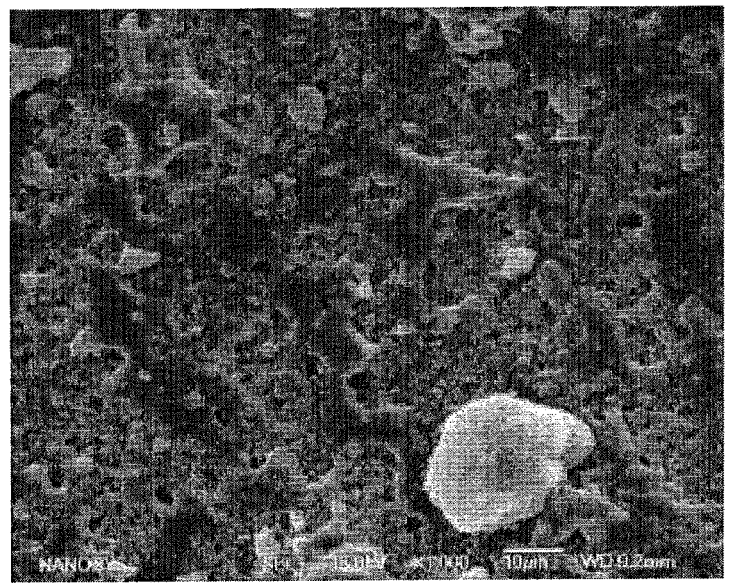

FIG. 7
(a)
(b)
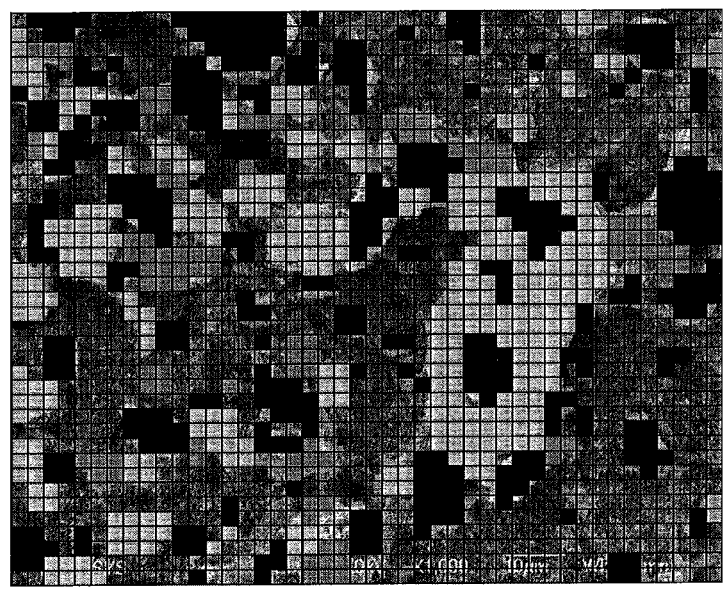

Interparticle distance

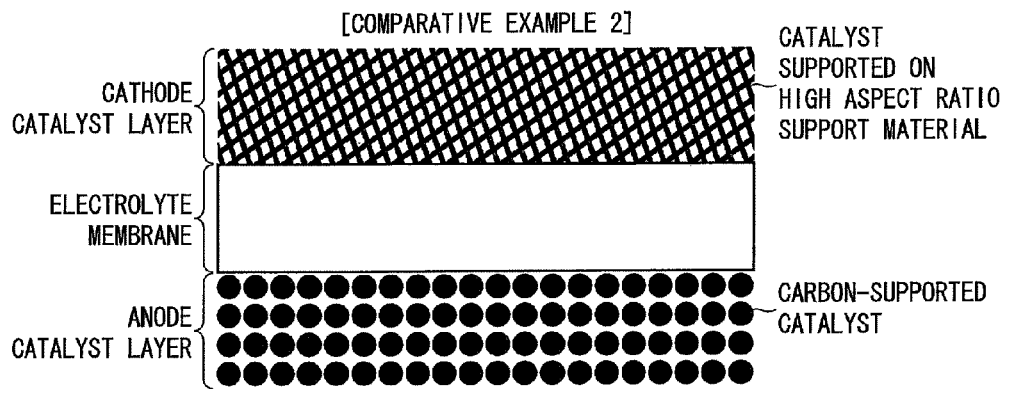
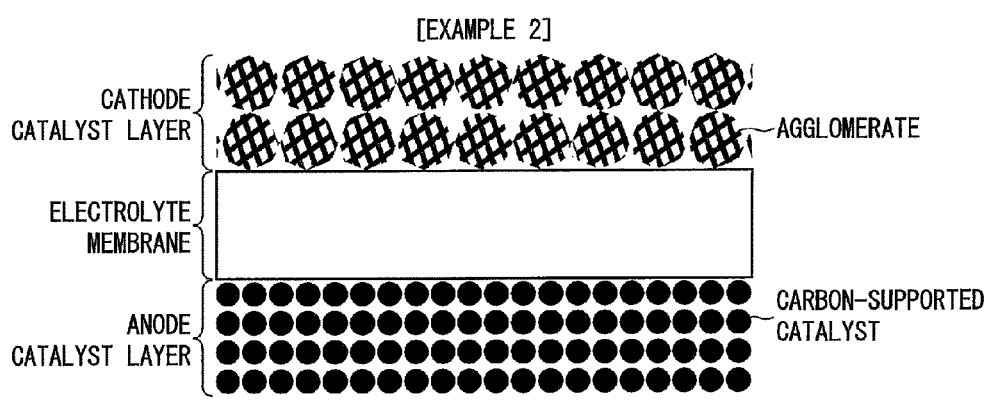

FIG. 17
(a)
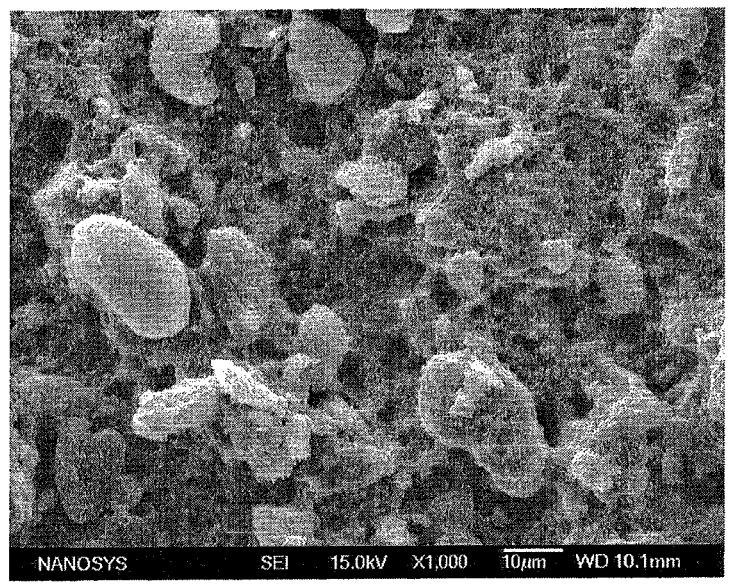
(b)

FIG. 18 – PRIOR ART
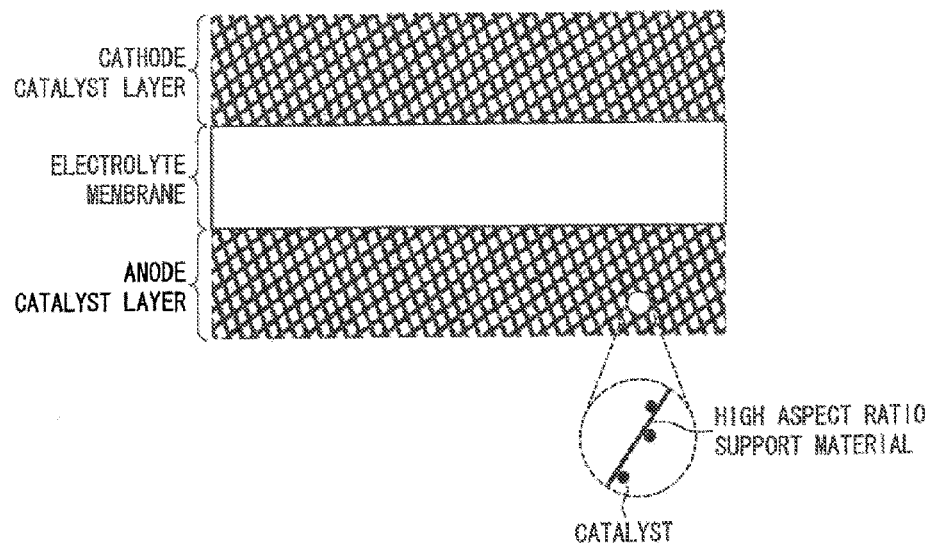
FIG. 19
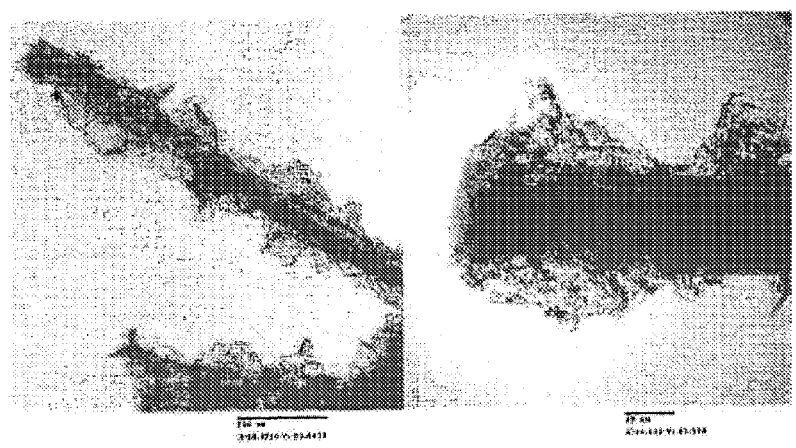

FIG. 30A
EXAMPLE A
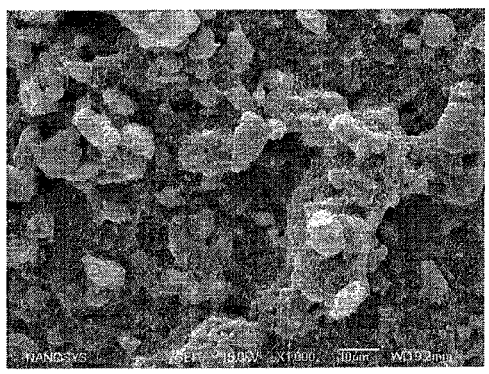
FIG. 30B
COMPARATIVE EXAMPLE A
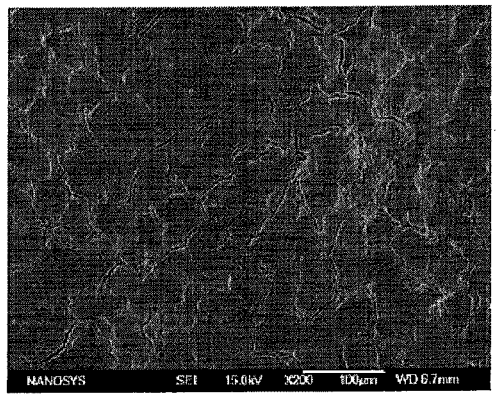
COMPARATIVE EXAMPLE B
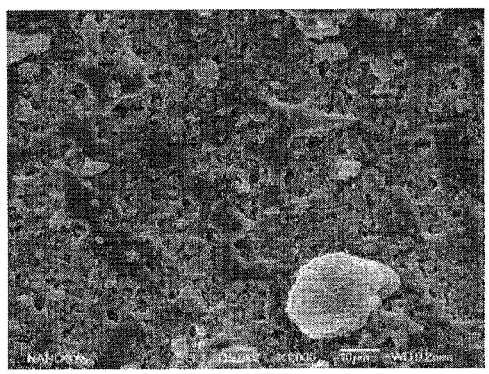
FIG. 30C FIG. 32A
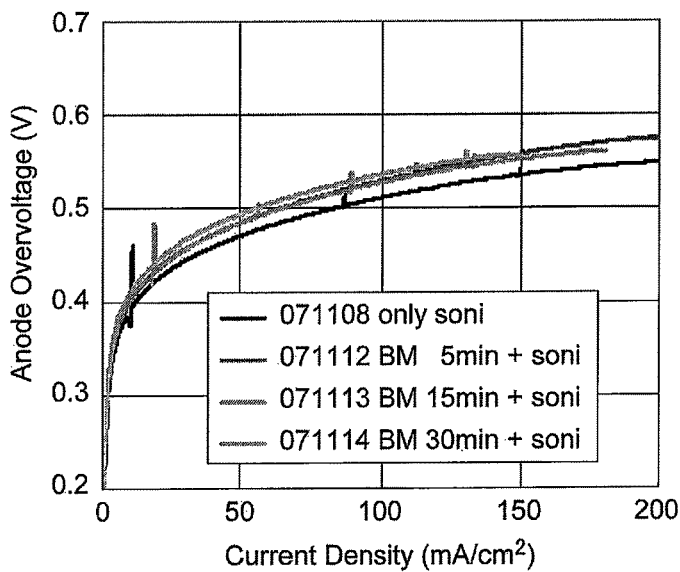
EXAMPLE A : 071108
COMPARATIVE EXAMPLE B : 071114
Each electrodes has ave. 0.5mg/cm² of PtRu loading.
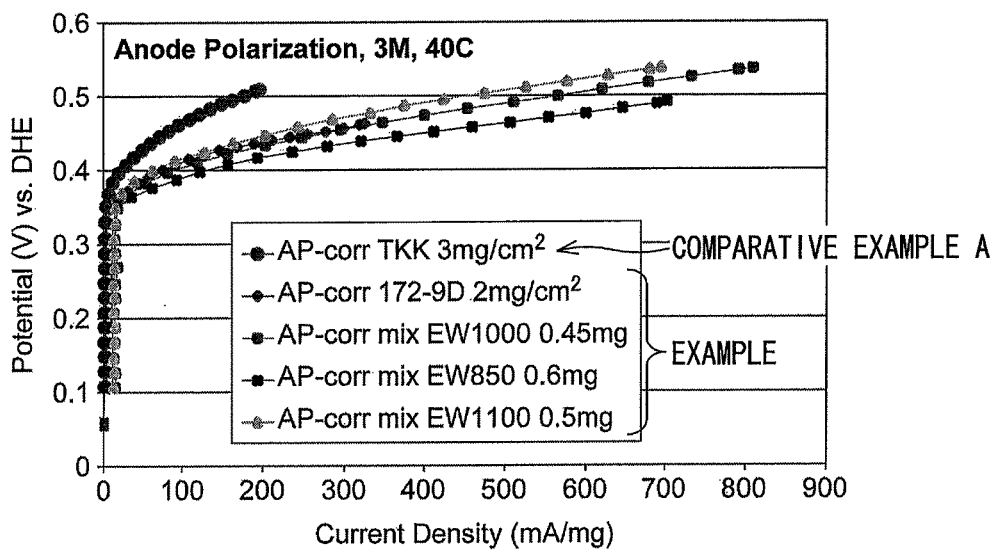
FIG. 32B

FIG. 33

|  | TPB area (m²/g) | Catalyst Utilization (%) | Anode polarization i (mA/mg-PtRu) | |
|---|---|---|---|---|
|  |  |  | @0.45V, 40℃ (activity + accessibility) | @0.3V, 40℃ (activity dominant) |
| Example | 47 | 61 | 260 | 9.8 |
| Comparative Example | 23 | 39 | 76 | 3.8 |
| Advantage | X2 | X1.6 | X3.4 | X2.6 |

FIG. 34A
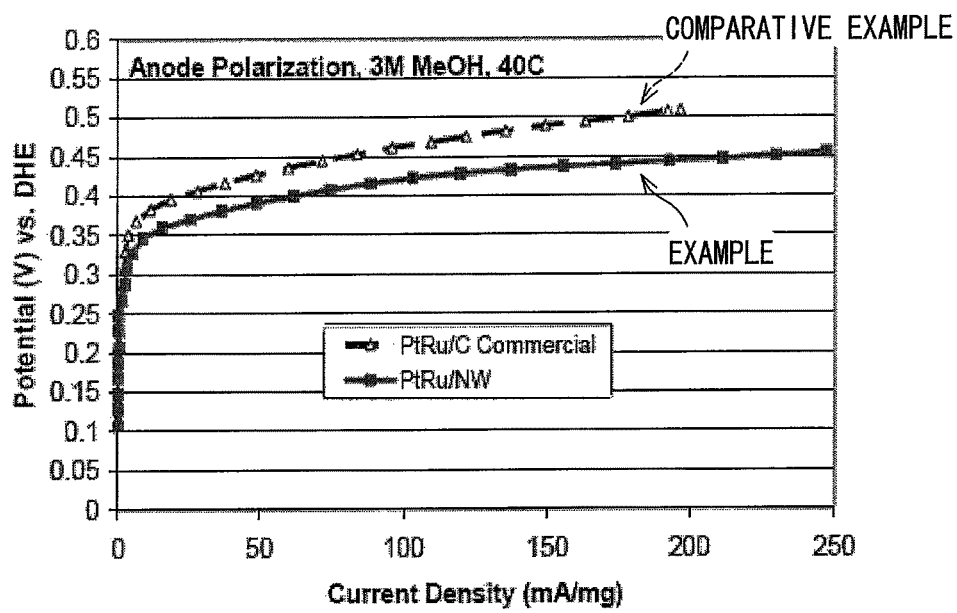
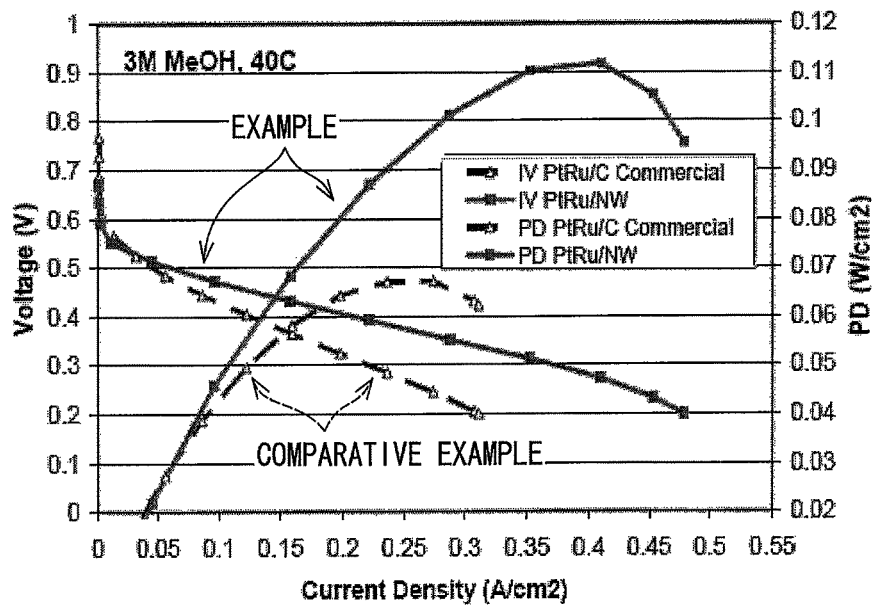
FIG. 34B

CATALYST LAYER FOR FUEL CELL MEMBRANE ELECTRODE ASSEMBLY, FUEL CELL MEMBRANE ELECTRODE ASSEMBLY USING THE CATALYST LAYER, FUEL CELL, AND METHOD FOR PRODUCING THE CATALYST LAYER

CROSS REFERENCE TO RELATED APPLICATIONS

This application claims the benefit of U.S. Provisional Application No. 61/175,293, entitled "Membrane Electrode Assemblies for Fuel Cells", filed May 4, 2009, which is incorporated herein by reference in its entirety.

BACKGROUND OF THE INVENTION

1. Field of the Invention

The present invention relates to a catalyst layer etc. used for a fuel cell membrane electrode assembly.

2. Background Art

Catalyst layers are used for conventional fuel cell membrane electrode assemblies.

A known catalytic electrode for a fuel cell includes a catalyst layer having aegagropila-linnaei-shaped carbons made by spherically growing a nanocarbon material with a diamond particle as a nucleus and causing the nanocarbon material thus grown to support a platinum group catalyst. Further, a known solid polymer electrolyte fuel cell electrode containing carbon particles which are monolayer carbon nano-horn aggregates in which monolayer carbon nano-horns made up of monolayer carbon nano-tubes of a unique structure having a conical shape at one end are aggregated into balls.

FIG. 18 is a drawing showing a structure of a conventional catalyst layer. The conventional catalyst layer is homogeneously filled with support materials.

However, catalyst layers used for conventional fuel cell membrane electrodes suffer the following problems.

Since a catalyst layer is homogeneously filled with support materials, densely filling the catalyst layer with the support materials so as to make the catalyst layer compact will make pore size and porosity small, resulting in a lower material diffusibility. Extracting a high current using the catalyst layer with a lower material diffusibility will lead to insufficient release of generated gas from an anode and insufficient discharge of generated water from a cathode and to insufficient feeding of fuel and air. This is likely to drop power generation performance of a fuel cell. Although the compact (i.e. thin) catalyst layer has advantage in terms of proton conduction in the catalyst layer, since the length of proton diffusion is short, it is difficult to keep pore size and porosity large, when the catalyst layer is compact.

Since the catalyst layer has nonconductive diamond particles in aegagropila-linnaei-shaped carbons, a fuel cell catalyst electrode suffers low electronic conductivity, resulting in lower power generation performance of a fuel cell.

A carbon nano-horn in a carbon nano-horn aggregate and the central nucleus of the carbon nano-horn aggregate contact with each other only at one point. Consequently, it is highly likely that contact between carbon nano-horns get broken. This is highly likely to result in drop of electronic conductivity (power generation performance). Further, such structure is unstable as a structure of a catalyst layer.

The present invention was made in view of the foregoing problems. An object of the present invention is to provide a catalyst layer, a fuel cell membrane electrode assembly, and a fuel cell, each of which has a compact size and has excellent power generation performance, and a method for producing the catalyst layer, the fuel cell membrane electrode assembly, and the fuel cell.

BRIEF SUMMARY OF THE INVENTION

In order to achieve the foregoing object, a catalyst layer of the present invention for a fuel cell membrane electrode assembly is a catalyst layer comprising a plurality of agglomerates, adjacent ones of the plurality of agglomerates contacting with each other with pores provided between said adjacent ones of the plurality of agglomerates, each of the plurality of agglomerates being formed by packing a plurality of catalysts each consisting of noble metal fine particles supported on a fiber-like support material, adjacent ones of the plurality of catalysts contacting with each other with pores provided between said adjacent ones of the plurality of catalysts, and each of the plurality of catalysts contacting with a plurality of catalysts other than said each catalyst at a plurality of contact points.

In the catalyst layer of the present invention, pores (primary pores) are provided between adjacent catalysts. Further, pores (secondary pores) are provided between adjacent agglomerates. Since the catalyst layer of the present invention includes both the primary pores and the secondary pores thus formed, the catalyst layer of the present invention is advantageous in terms of the following points in comparison with conventional catalyst layers used for fuel cell membrane electrode assemblies.

Initially, conventional catalyst layers include only primary pores, whereas the catalyst layer of the present invention includes both primary pores and secondary pores. Accordingly, the catalyst layer of the present invention has better material diffusibility than conventional catalyst layers.

Further, in the catalyst layer of the present invention, each of a plurality of catalysts contacts with a plurality of catalysts other than the catalyst at a plurality of contact points. Therefore, although densely packing agglomerates in the catalyst layer or densely packing catalysts in the agglomerates in order to make the catalyst layer of the present invention compact will result in smaller primary pores and secondary pores, catalysts contact more densely with each other at portions where the catalysts contact with each other at a plurality of contact points. This prevents drop of power generation performance.

As described above, the catalyst layer of the present invention can overcome a trade-off relation between the request for making the catalyst layer compact and the request for high power generation performance necessary for a fuel cell.

For the sake of argument, a catalyst layer including only secondary pores in order to improve material diffusibility of the catalyst layer can be assumed. However, such catalyst layer would be thicker because catalysts could not be densely provided in the catalyst layer. This would drop material diffusibility and electron conductivity of the catalyst layer. Therefore, such catalyst layer is not realistic.

Further, since agglomerates and catalysts consisting the catalyst layer of the present invention can be formed without using a nonconductive material such as diamond, the catalyst layer of the present invention exhibits better power generation performance compared with known catalyst layers that include nonconductive diamond particles.

Further, since the catalyst layer of the present invention has such a structure that catalysts contact with each other at a plurality of contact points, the catalyst layer of the present invention has better electron conductivity and better structural stability compared with known structures in which a carbon nano-horn contacts with the central nucleus of a carbon nano-horn aggregate only at one point.

In order to achieve the foregoing object, a method of the present invention for producing a catalyst layer for a fuel cell membrane electrode is a method comprising the steps of: ultrasonicating and dispersing hydrophobic catalysts each consisting of noble metal fine particles supported on a fiber-like support material and proton-conductive polymers into a solvent so as to prepare a catalyst dispersion liquid; and applying the catalyst dispersion liquid to a substrate so as to form a catalyst layer.

Since the shear force of ultrasonication is not so strong, dispersing catalysts by ultrasonication allows the catalysts to form agglomerates. Such formation of agglomerates results in formation of pores (primary pores) between adjacent catalysts and formation of pores (secondary pores) between adjacent agglomerates. Further, individual catalysts contact with other catalysts at a plurality of contact points.

That is, when hydrophobic catalysts and proton-conductive polymers are ultrasonicated and dispersed into a solvent such as alcohol, the catalysts agglomerate in such a manner that the area of interface between the catalysts and the solvent is small, because the catalysts are hydrophobic. By nature, the shape of an agglomerate that secures the smallest area where catalysts contact with a solvent is a shape where fiber-like support materials are aligned and agglomerated in a bundle.

However, catalysts are randomly aligned in a solvent due to ultrasonication. Consequently, primary pores are provided between adjacent catalysts, and catalysts form agglomerates in such a manner that individual catalysts contact with other catalysts at a plurality of contact points.

Further, the shear force of ultrasonication is not so strong compared with other dispersing process such as ball mill dispersion. Consequently, agglomerates formed in the solvent are not pulverized or catalysts do not disperse again.

A catalyst dispersion liquid including the agglomerates of the catalysts is applied to a substrate such as an electrolyte membrane, a carbon paper, a carbon cloth, and a PTFE sheet. Consequently, the agglomerates are laminated on the substrate in such a manner that secondary pores are provided between adjacent agglomerates, and thus a catalyst layer is formed.

Lastly, the catalyst layer thus formed is dried and the solvents in the primary pores and the secondary pores are evaporated. This realizes a connected state between the primary pores and the secondary pores.

Note that a catalyst layer can be distributed as a product independent from an electrolyte membrane, if the catalyst layer is formed on a later-mentioned substrate instead of the electrolyte membrane.

An example of a catalyst layer that can be distributed as a product independent from an electrolyte membrane is a "gas diffusion electrode" produced by forming a catalyst layer on a substrate such as a carbon paper and a carbon cloth. The carbon paper and the carbon cloth are generally referred to as a "gas diffusion layer". Another example of a catalyst layer that can be distributed as a product independent from an electrolyte membrane is a "catalyst transfer film" produced by forming a catalyst layer on a plastic substrate such as a PTFE sheet.

Either of the "gas diffusion electrode" and the "catalyst transfer film" is produced by applying a catalyst dispersion liquid on a substrate. Process for producing the catalyst dispersion liquid and a process for applying the catalyst dispersion liquid on the substrate are not so different from those in a case of "applying the catalyst dispersion liquid to an electrolyte membrane".

Hot-pressing the "gas diffusion electrode" onto an electrolyte membrane provides a fuel cell membrane electrode assembly. Hot-pressing the "catalyst transfer film" onto an electrolyte membrane and peeling off a plastic substrate provides a fuel cell membrane electrode assembly.

BRIEF DESCRIPTION OF DRAWINGS/FIGURES

FIG. 4(a) is a drawing showing an SEM picture of the anode catalyst layer in Example 1 shown in FIG. 3. FIG. 4(b) is a drawing showing an SEM picture of the anode catalyst layer in Comparative Example 1 shown in FIG. 2.

FIG. 7(a) is a drawing obtained by applying 39×44 meshes (the length of a side of each mesh is 2.77 μm and the area of each mesh is 7.72 μm$^2$) to the SEM picture shown in FIG. 4(a). Further, FIG. 7(b) is a drawing obtained by daubing meshes including agglomerates whose shortest diameter is at least 3 μm with different colors for individual particles in FIG. 7(a).

FIG. 14 is a drawing showing a fuel cell membrane electrode assembly in accordance with a comparative example (Comparative Example 2) prepared in order to confirm the effect of the catalyst layer of the present invention.

FIG. 15 is a drawing showing a fuel cell membrane electrode assembly in accordance with an example (Example 2) in which the catalyst layer of the present invention was used as a cathode catalyst layer.

FIG. 17(a) is an SEM picture of the cathode catalyst layer in accordance with Example 2 shown in FIG. 15. FIG. 17(b) is an SEM picture of the cathode catalyst layer in accordance with Comparative Example 2 shown in FIG. 14.

FIG. 18 is a drawing showing a structure of a conventional catalyst layer.

FIG. 19 shows transmission electron micrograph images of 1.67 nm Pt:Ru (1:1) nanoparticles deposited on the surface of nanographite coated nanowires at two different magnifications.

Figure 27:
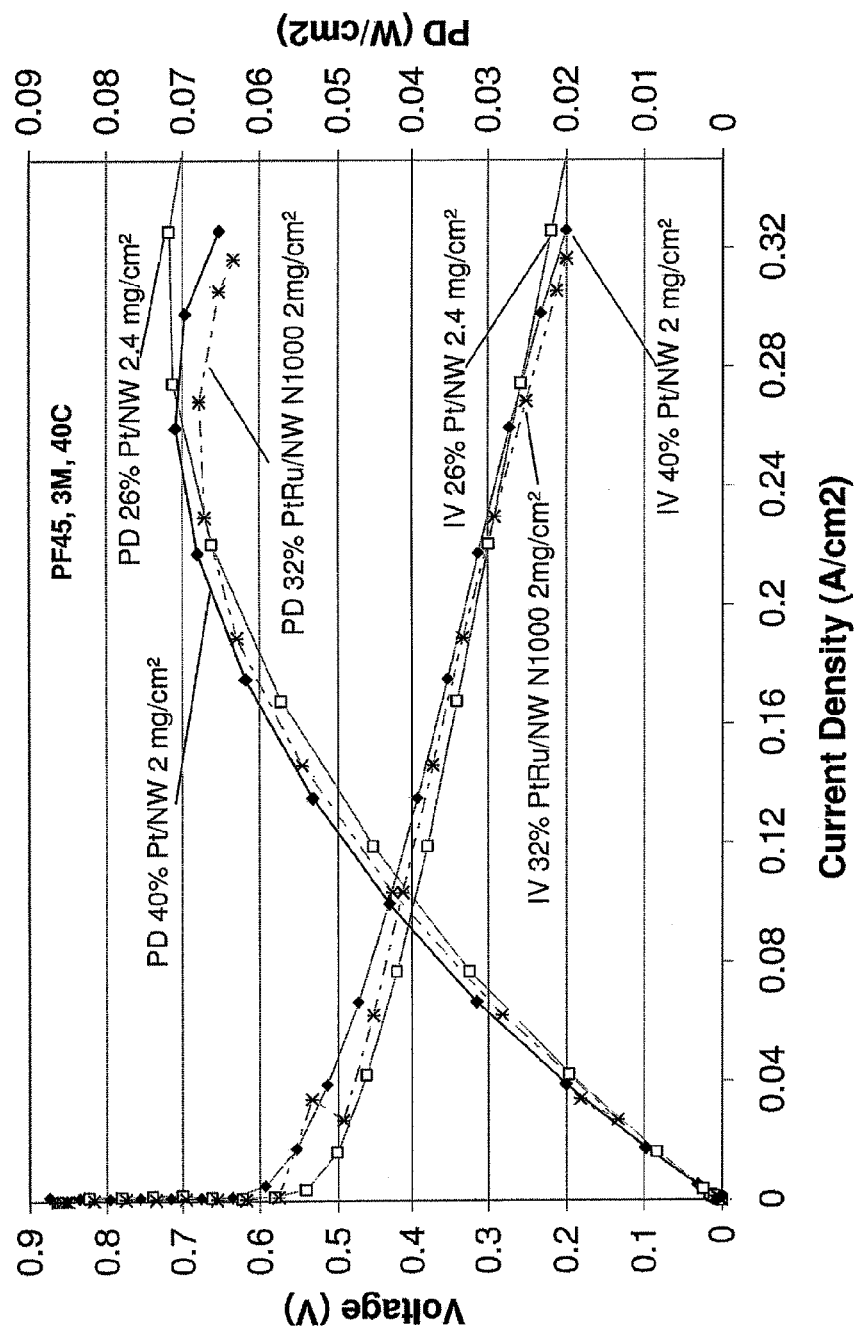

FIG. 27 compares the Voltage and Power Density as a function of current density for Pt and Pt:Ru nanowire associated catalysts, including the impact of EW1000 Nafion on performance.

Figure 28:
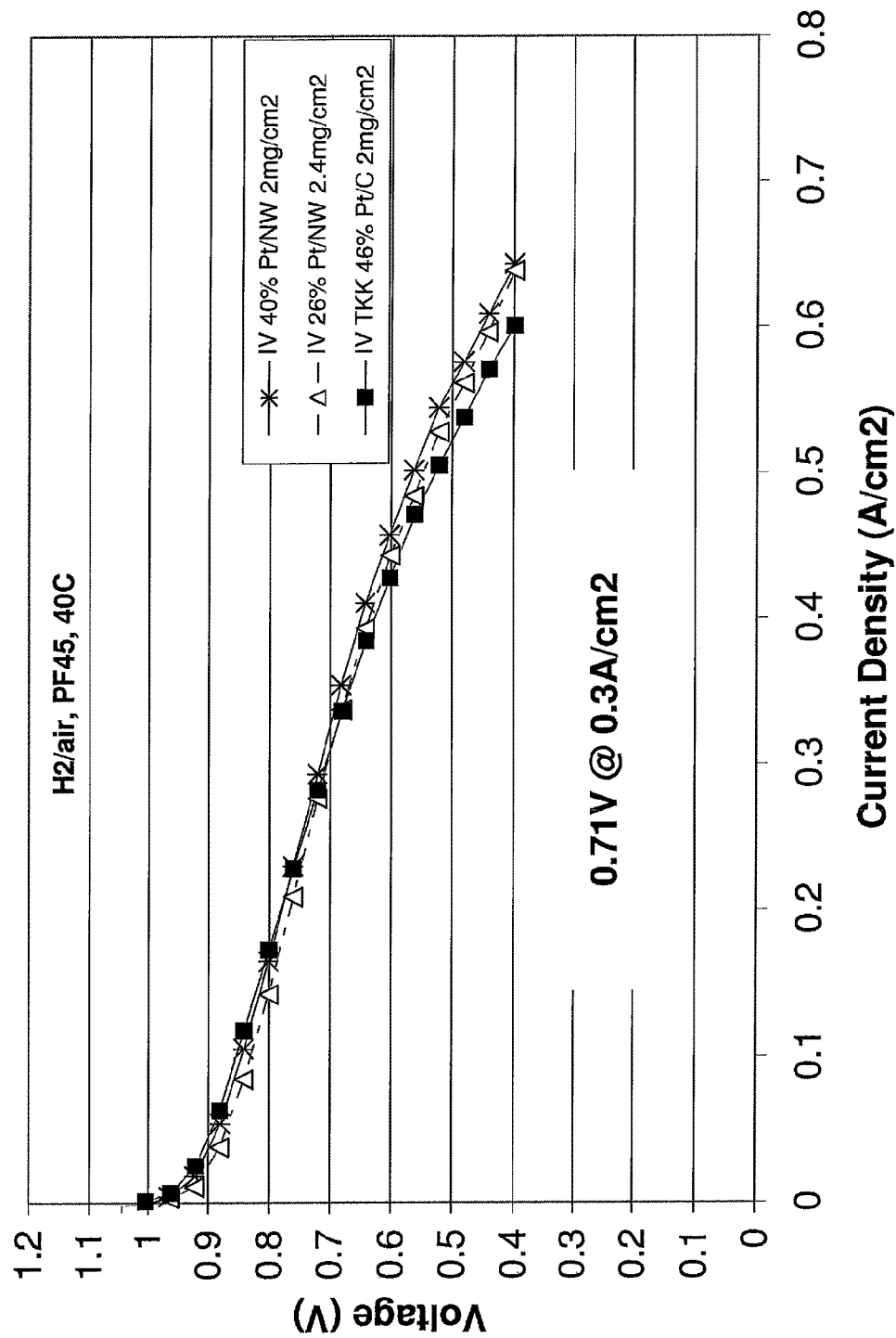

FIG. 28 shows the cathode polarization of two different concentrations of Pt-catalyst-associated nanowires of the present invention as compared with a Pt-Carbon-associated catalyst (TKK).

Figure 29:
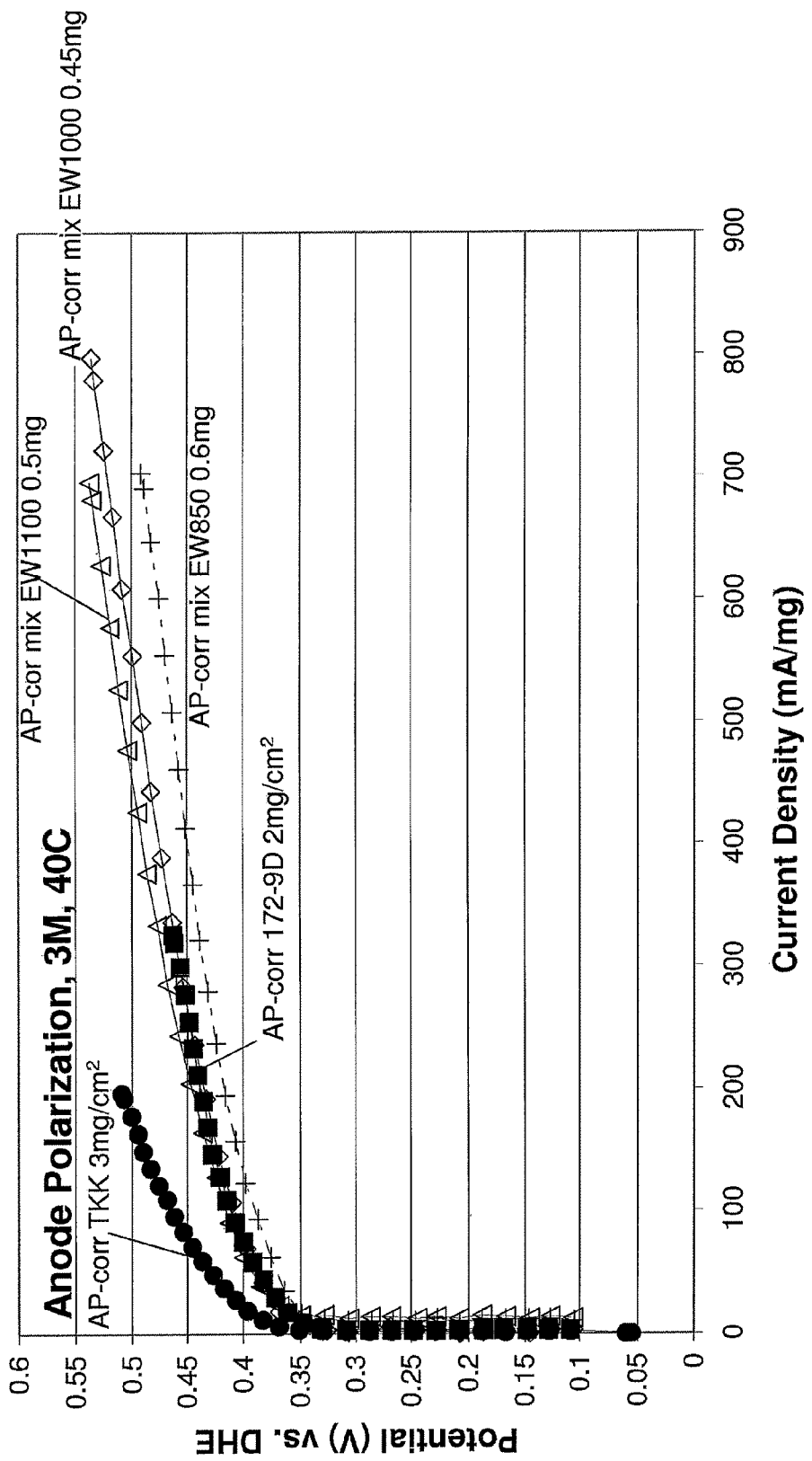

FIG. 29 shows the potential v. DHE versus current density for Pt:Ru-carbon supported catalysts (TKK and 172-9D) compared with three Pt:Ru-nanowire-supported electrochemical catalysts of the present invention.

FIG. 30A-C shows SEM pictures.

Figure 31:
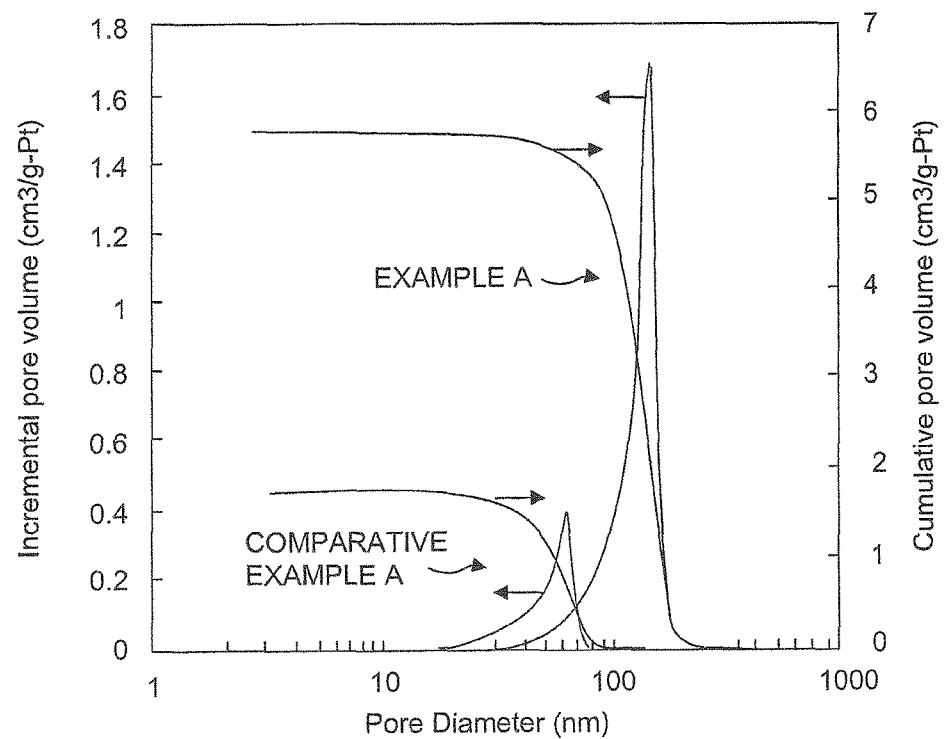

FIG. 31 shows pore size distribution.

FIG. 32A-B shows anode polarization performance.

FIG. 33 shows anode polarization performance.

FIG. 34A-B shows anode polarization and DMFC performance.

Figure 35:
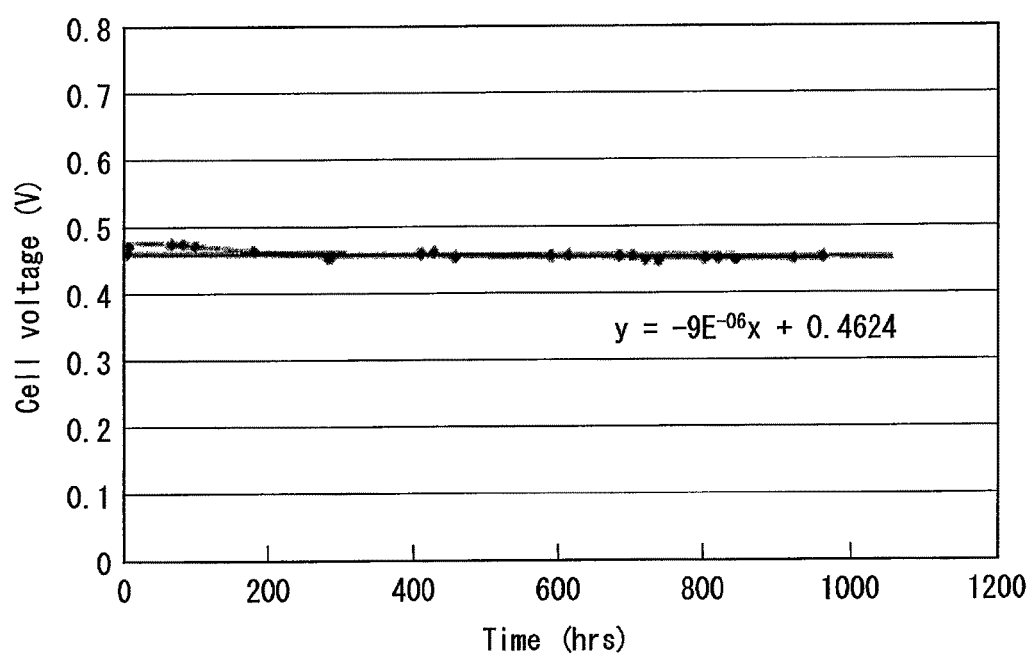

FIG. 35 shows durability test.

Figure 36C:
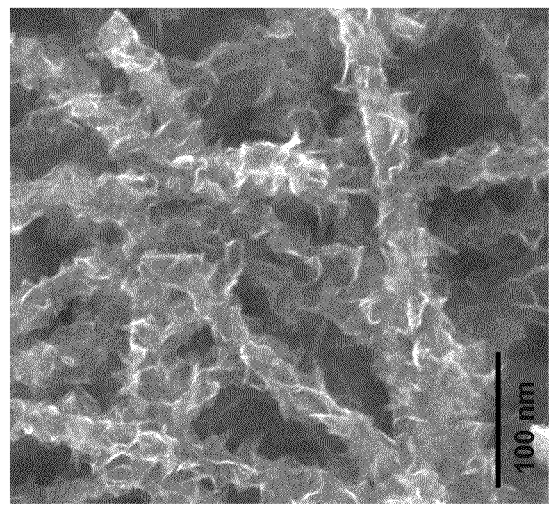
Figure 36B:
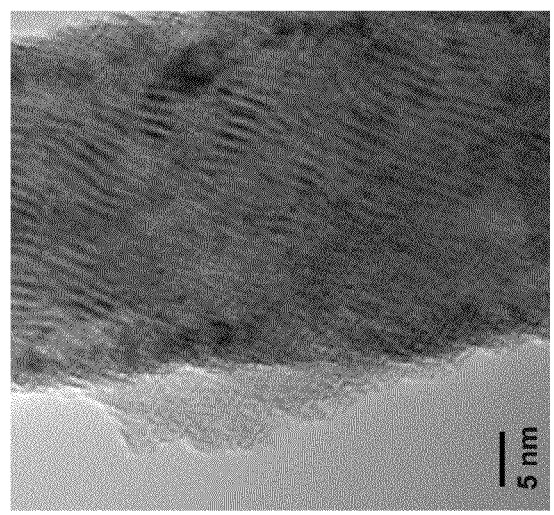
Figure 36A:
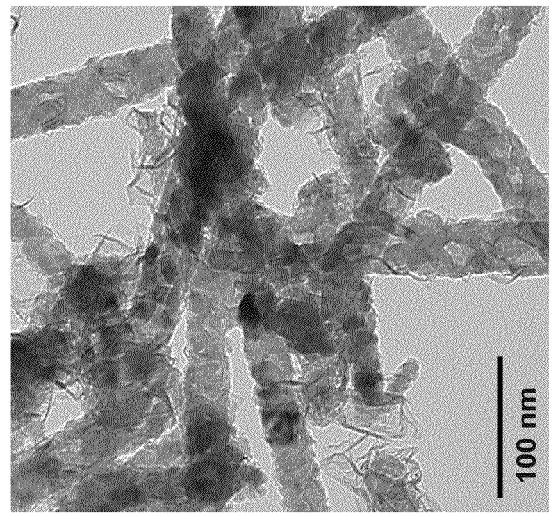

FIGS. 36A-C relate to advanced inorganic nanowire material development processes.

Figure 37B:
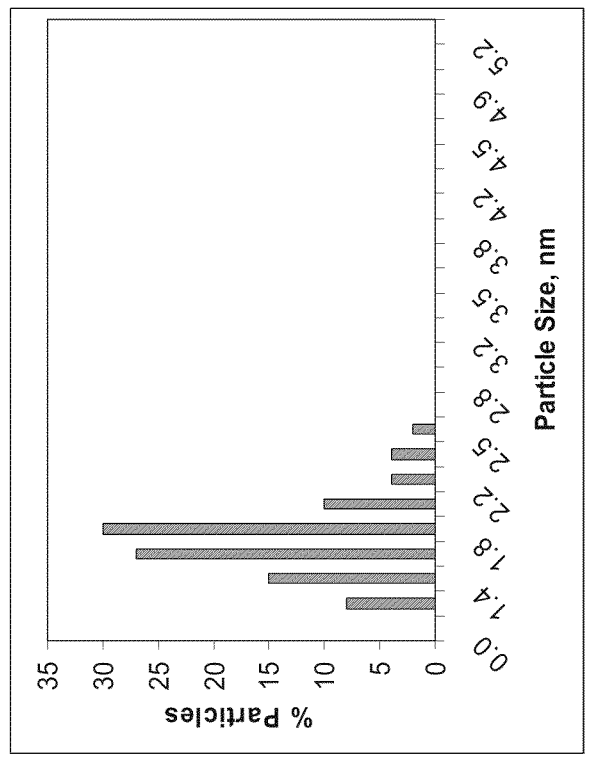
Figure 37A:
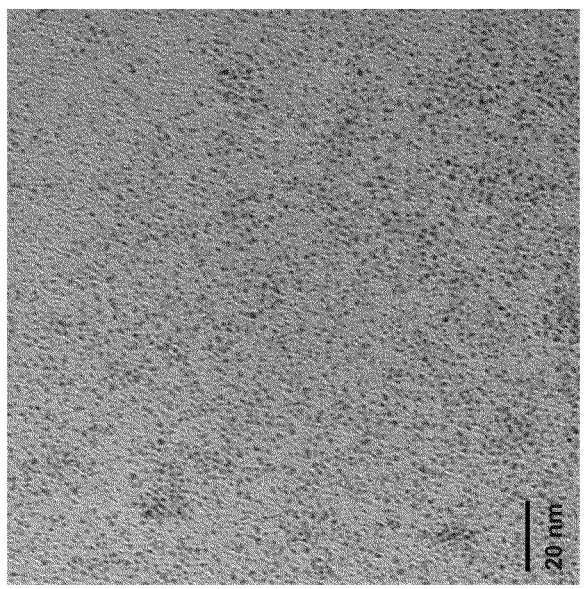

FIGS. 37A-B relate to catalyst nano-particle formation.

Figures 38A, 38B:
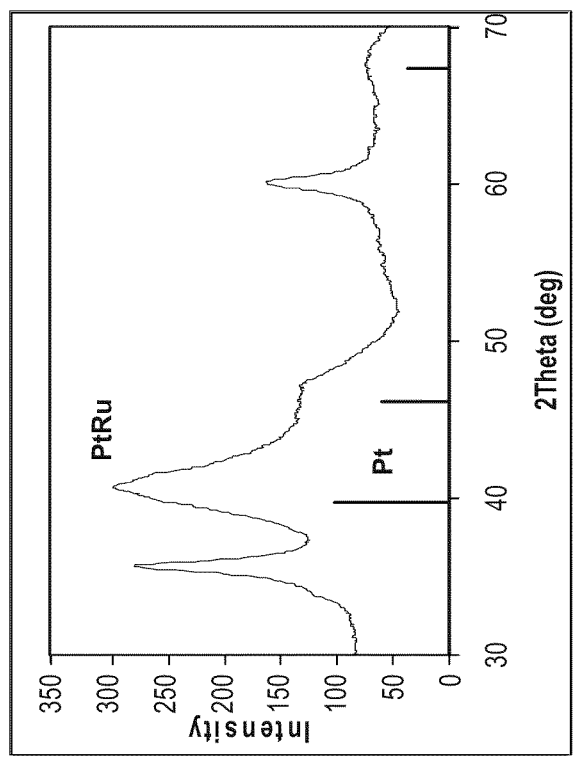

FIGS. 38A-B relate to catalyst nano-particle characteristics.

Figure 39B:
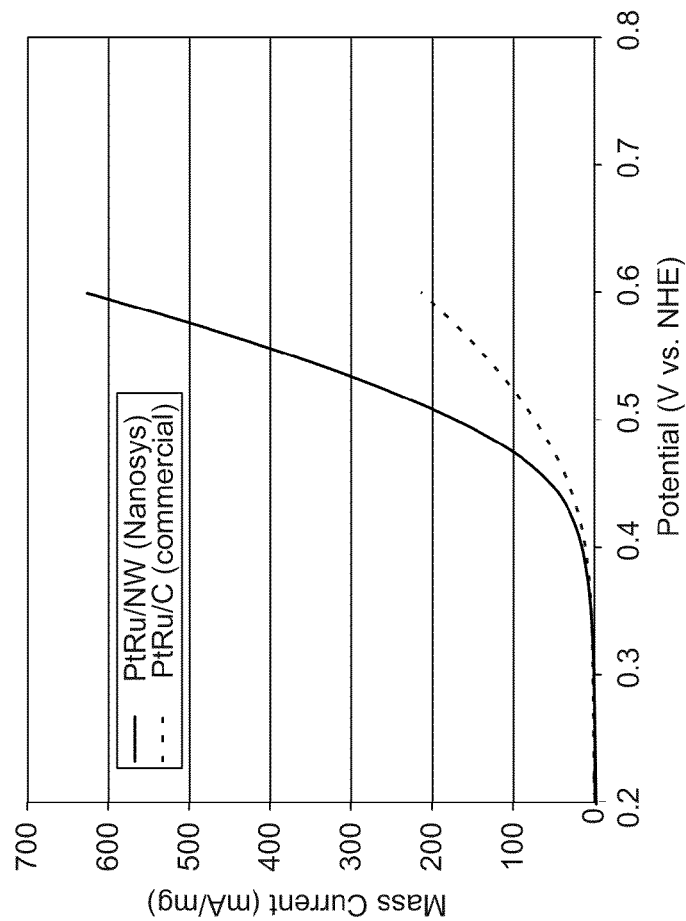
Figure 39A:
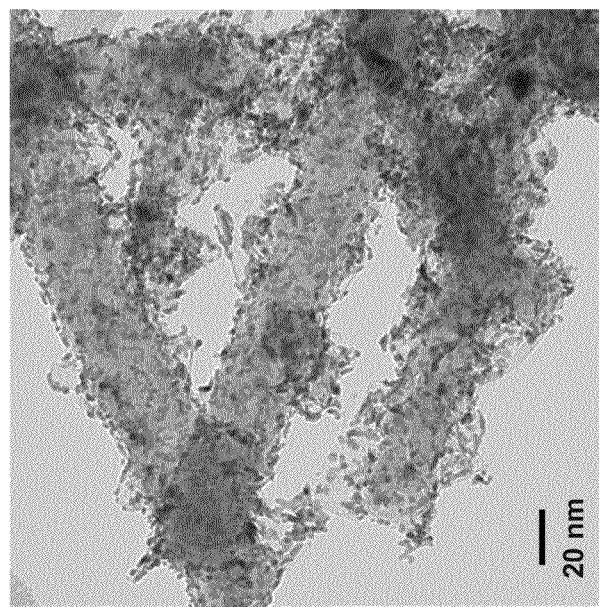

FIGS. 39A-B relate to nanowire deposited nano-catalyst activity.

Figure 40A:
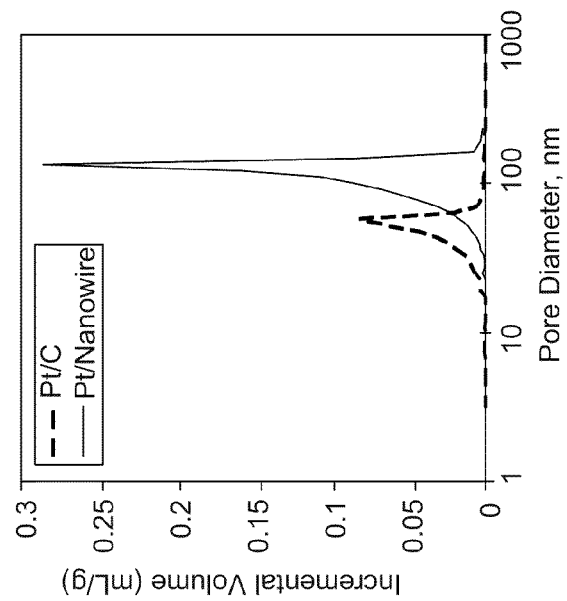
Figure 40B:
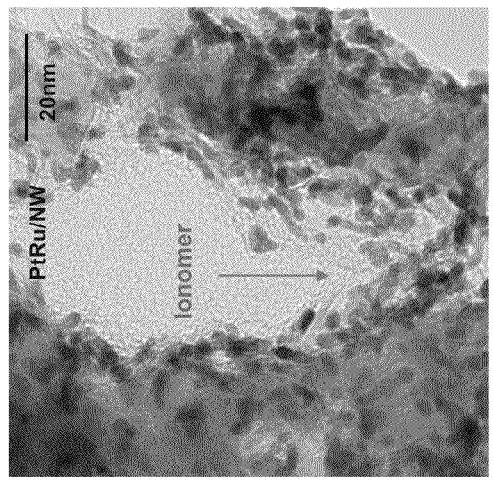
Figure 40C:
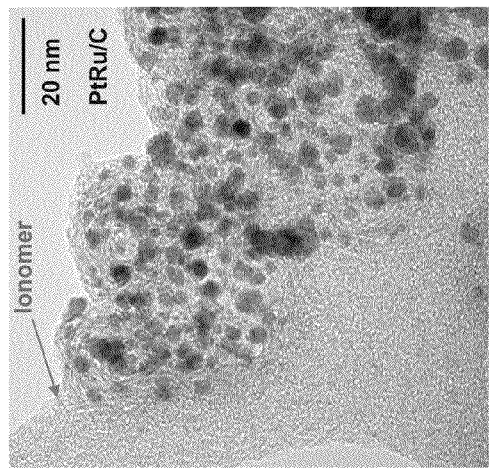

FIGS. 40A-C are relate to membrane electrode assemblies (MEA) development.

DETAILED DESCRIPTION OF THE INVENTION

The following explains one embodiment of the present invention. It should be noted that the present invention is not limited to this embodiment.

1. Catalyst Layer

Figure 1:
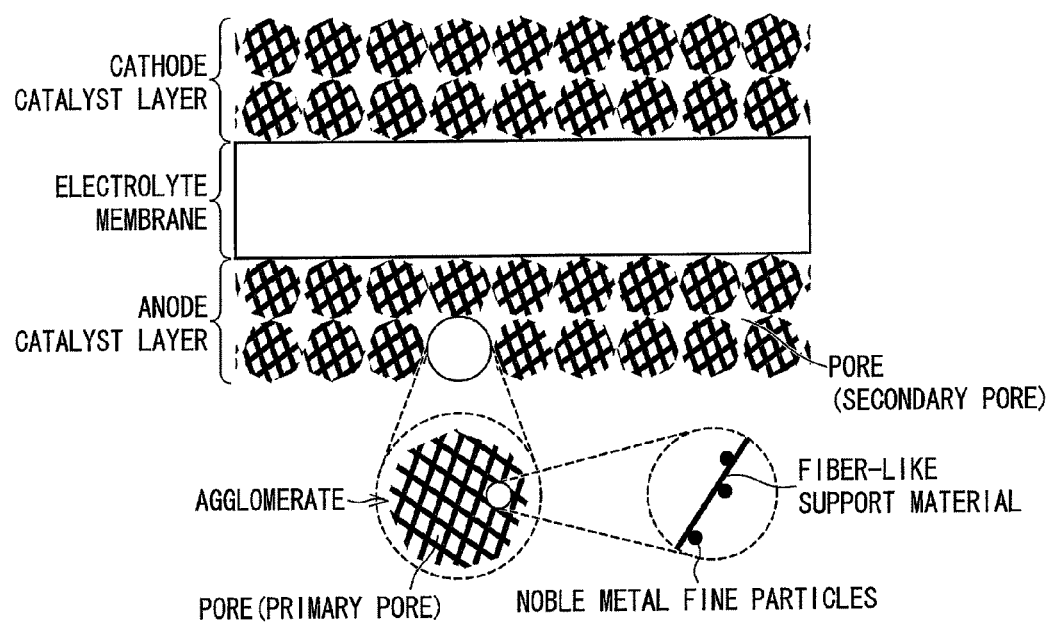
FIG. 1 is a drawing showing a fuel cell membrane electrode in which the catalyst layer of the present invention is used for both an anode catalyst layer and a cathode catalyst layer.

In order to facilitate the understanding of the present invention, the following schematically explains a catalyst layer of the present invention with reference to FIG. 1.

FIG. 1 is a drawing showing a fuel cell membrane electrode in which the catalyst layer of the present invention is used for both an anode catalyst layer and a cathode catalyst layer. As shown in FIG. 1, the catalyst layer of the present invention includes a plurality of agglomerates, and adjacent agglomerates contact with each other with pores (secondary pores) provided therebetween.

Further, each agglomerate is formed by packing a plurality of catalysts each consisting of noble metal fine particles supported on a fiber-like support material, and adjacent catalysts contact with each other with pores (primary pores) provided therebetween. Individual catalysts contact with other catalysts at a plurality of contact points.

The catalyst layer of the present embodiment is used in a fuel cell membrane electrode assembly. Further specific use of the catalyst layer of the present embodiment is not particularly limited, but the catalyst layer of the present embodiment is preferably used as an anode catalyst layer or a cathode catalyst layer.

The catalyst layer of the present embodiment includes a plurality of agglomerates, adjacent ones of which contact with each other with pores (hereinafter "second pores") therebetween. That is, the catalyst layer of the present embodiment is designed such that pores are provided between adjacent agglomerates.

The shape of the agglomerate is not particularly limited and may be any desired shape. The shape of the agglomerate here indicates a shape formed by outer surface of the agglomerate. Specifically, the shape of the agglomerate is preferably a sphere, a cylinder, a rectangular column, or a cone. Among them, the shape of a sphere is more preferable. Note that the shape of a sphere includes not only a perfect sphere but also a imperfect sphere such as a rugby-ball shape. In the catalyst layer of the present embodiment, a plurality of agglomerates included in one catalyst layer do not necessarily have the same shape. For example, one catalyst layer may include both an agglomerate with a spherical shape and an agglomerate with another shape. When one catalyst layer includes agglomerates with different shapes, it is preferable that the different shapes include at least a spherical shape.

Figure 9:
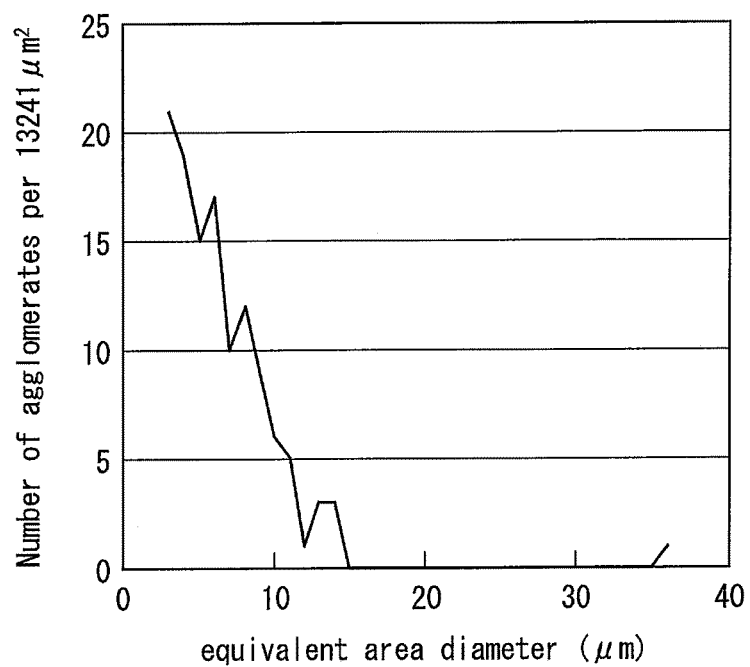
FIG. 9 is a histogram relating to a particle size of an agglomerate.

In the present embodiment, a plurality of agglomerates included in one catalyst layer are not necessarily have the same size. For example, an agglomerate with a large size and an agglomerate with a small size may coexist in one catalyst layer. This arrangement allows easily forming secondary pores with a desired shape and volume. Specifically, the mean of the equivalent circle diameter of the agglomerate is preferably not less than 0.5 µm and not more than 100 µm, and more preferably not less than 1 µm and not more than 10 µm. Note that the equivalent circle diameter of the agglomerate indicates the diameter of a circle having the same area as the projected area of the agglomerate. The equivalent circle diameter may be calculated in accordance with a publicly known method. As shown in FIG. 9, the equivalent circle diameter may be calculated based on an SEM image captured by conventional a field emission scanning electron microscope. By observing the SEM image, an outer portion of the agglomerate is determined and the number of pixels in an area surrounded by the outer portion (corresponding to the projected area of the agglomerate) is counted. In consideration of magnification of the SEM image, the projected area of the agglomerate is calculated based on the number of pixels and the diameter of a circle having the same area as the projected area of the agglomerate is calculated.

The agglomerates contact with each other in such a manner that adjacent agglomerates form pores therebetween. The number of agglomerates contacting with one agglomerate is not particularly limited. For example, the number may be one or plural. The number of agglomerates contacting with one agglomerate is preferably plural.

Each of the plurality of agglomerates is formed by packing a plurality of catalysts each consisting of noble metal fine particles supported on a fiber-like support material, adjacent ones of the plurality of catalysts contacting with each other with pores (which may be hereinafter referred to as primary pores) provided between adjacent ones of the plurality of catalysts.

The shape of the fiber-like support material is not particularly limited. Preferable examples of the shape include a nano-wire, a nano-rod, a nano-tube, a nano-ribbon, and any combination thereof. An example of the combination is a support material, one part of which has a nano-wire shape and the other part of which has a nano-tube shape. Needless to say, the fiber-like support material may have a branched shape.

The material of the fiber-like support material is not particularly limited.

Preferable examples of the support include semiconductor materials such as Si, Ge, Sn, Se, Te, B, C (including diamond), P, B—C, B—P ($BP_6$), B—Si, Si—C, Si—Ge, Si—Sn and Ge—Sn, SiC, BN, BP, BAs, AlN, AlP, AlAs, AlSb, GaN, GaP, GaAs, GaSb, InN, InP, InAs, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, AgF, AgCl, AgBr, AgI, $BeSiN_2$, $CaCN_2$, $ZnGeP_2$, $CdSnAs_2$, $ZnSnSb_2$, $CuGeP_3$, $CuSi_2P_3$, (Cu, Ag) (Al, Ga, In, Tl, Fe) (S, Se, $Te)_2$, $Si_3N_4$, $Ge_3N_4$, $Al_2O_3$, (Al, Ga, $In)_2$(S, Se, $Te)_3$, $Al_2CO$, and any combination thereof.

Further, preferable examples of the support material include: metals such as gold, nickel, palladium, iridium, cobalt, chrome, aluminum, titan, and tin); polymer; conductive polymer; ceramic; and any combination thereof.

Further, the support material is preferably made of at least one material selected from the group consisting of $RuO_2$, SiC, GaN, $TiO_2$, $SnO_2$, $WC_x$, $MoC_x$, ZrC, $WN_x$, and $MoN_x$ (x is a positive integer).

In terms of both the shape and the material, the fiber-like support material is preferably a carbon nano-fiber or a carbon nano-tube.

The mean diameter of the fiber-like support materials is not particularly limited. For example, the mean diameter is preferably not more than 500 nm, and further preferably not more than 300 nm. The mean diameter here indicates the mean of diameters of minimum circles which circumscribe cross sections of the fiber-like support materials. The mean diameter of the support materials may be calculated based on an SEM image or a TEM image or calculated by other publicly known method. The aspect ratio of the fiber-like support materials is not particularly limited. For example, the aspect ratio is preferably not less than 10 and not more than 1350. The aspect ratio is considered as preferable when the mean diameter of the fiber-like support materials is not more than 500 nm, and considered as further preferable when the mean diameter of the fiber-like support materials is not more than 300 nm.

The diameter of the support material with high aspect ratio used in later-mentioned Example 1 is approximately 40 nm. The maximum diameter of the agglomerate in Example 1 is 54 μm (see FIG. 13). If it is assumed that the support material does not flex, the maximum length of the support material is equal to the size of the agglomerate.

Based on this understanding, the aspect ratio is defined as follows.

"Aspect ratio" = "length of support material" ÷

"diameter of support material"

= 54 μm ÷ 40 nm = 1350

The value "1350" is the upper limit of the aspect ratio.

Further, the central value of the numerical range of the aspect ratio is supposed to be 165. The central value is obtained by dividing 6.6 μm (see FIG. 9) which is the mean diameter of the agglomerates included in the catalyst layer of Example 1 by the diameter (40 nm) of the high-aspect-ratio support material (6.6 μm÷40 nm).

The metal which constitutes the noble metal fine particles is not particularly limited. Preferable examples of the metal include Pt, Au, Pd, Ru, Re, Rh, Os, Ir, Fe, Co, Ni, Cu, Ag, V, Cr, Mo, W, any alloy thereof, and any mixture thereof. More preferable examples of the metal include Pt, Ru, and any mixture thereof. Such metal allows formation of a catalyst layer with excellent power generation performance.

Each of the plurality of catalysts contacts with a plurality of catalysts other than the catalyst (a plurality of catalysts different from the catalyst) at a plurality of points. The number of catalysts with which each of the plurality of catalysts contacts is not particularly limited as long as the number is plural. For example, it is preferable that the plurality of catalysts are positioned in a network manner so that each catalyst contacts with a plurality of other catalysts. This arrangement allows the agglomerate to have a stabilized structure and allows easy formation of primary pores with a desired shape and size.

It is preferable to arrange the catalyst layer of the present embodiment such that the mean pore diameter of pores (secondary pores) provided between the adjacent agglomerates is larger than the mean pore diameter of pores (primary pores) provided between the adjacent catalysts.

To be more specific, the mean pore diameter of pores (secondary pores) provided between the adjacent agglomerates is preferably not less than 0.5 μm and not more than 50 μm, more preferably not less than 0.5 μm and not more than 10 μm, and most preferably not less than 0.5 μm and not more than 5 μm. On the other hand, the mean pore diameter of pores (primary pores) provided between the adjacent catalysts is preferably not less than 1 nm and not more than 250 nm, more preferably not less than 10 nm and not more than 250 nm, and most preferably not less than 60 nm and not more than 250 nm.

Specifically, more preferable arrangement is such that the mean pore diameter of pores (primary pores) provided between the adjacent catalysts is not less than 60 nm and not more than 250 nm, while the mean pore diameter of pores (secondary pores) provided between the adjacent agglomerates is not less than 0.5 μm and not more than 5 μm. However, the present embodiment is not limited to this arrangement.

Figure 12:
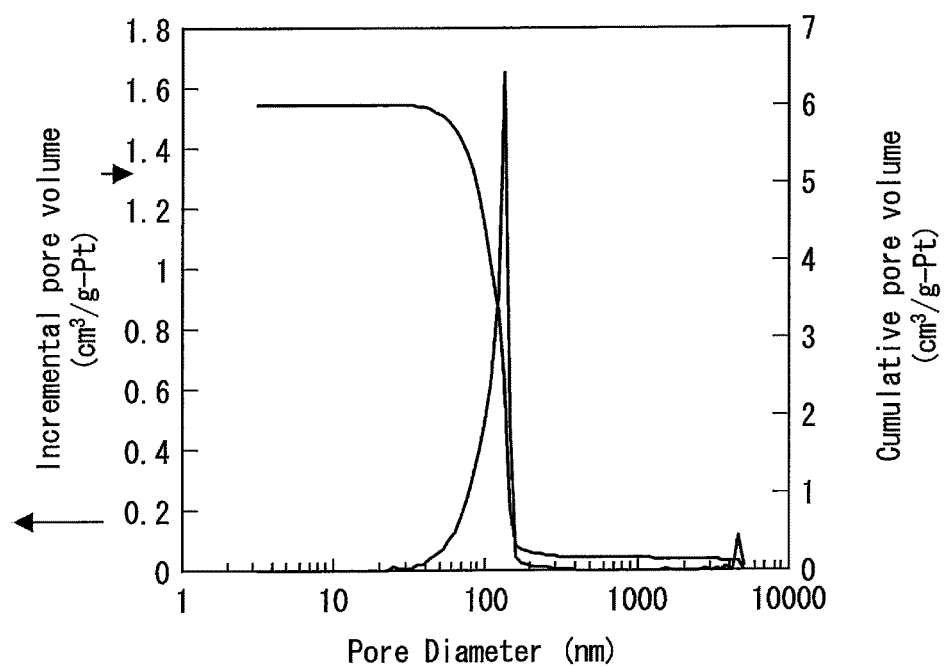
FIG. 12 is a drawing showing pore size distribution in an anode catalyst layer in Example 1 shown in FIG. 3.

The mean pore diameter of pores provided between the agglomerates and the mean pore diameter of pores provided between the catalysts can be calculated based on a well known method. Specifically, as shown in FIG. 12, the mean pore diameters can be calculated by using an automatic porosimeter device (AutoPoreIV9520) manufactured by Micromeritics Instrument Corporation. As for details of the calculation process, see the protocol attached to the automatic porosimeter device. In particular, the mean pore diameter of the secondary pores is calculated while setting the lower limit of a pore diameter range to be 250 nm.

It is preferable to arrange the catalyst layer of the present embodiment such that content of all pores whose size (mean pore diameter) ranges from 0.5 μm to 5 μm out of the pores provided between the adjacent agglomerates is not less than 0.5% and not more than 5% with respect to content of all pores existing in the catalyst layer.

In the catalyst layer of the present embodiment, total porosity of both the primary pores and the secondary pores is not particularly limited. For example, the porosity preferably ranges from 70% to 90%. The basis for the lower limit is that the porosity of Comparative Example 1 is 69% as shown in (b) of FIG. 4. Further, the central value of the numerical range should be approximately 80%. This is because the porosity of Example 1 is 81% (see (a) of FIG. 4).

2. Fuel Cell Membrane Electrode Assembly

A fuel cell membrane electrode assembly of the present embodiment includes the catalyst layer of the present invention as at least one of an anode catalyst layer and a cathode catalyst layer. It is more preferable that the fuel cell membrane electrode assembly of the present embodiment includes the catalyst layer of the present invention not only as an anode layer but also as a cathode layer. This arrangement allows further improving power generation performance.

The catalyst layer of the present invention has been already detailed above and therefore an explanation thereof is omitted here.

The numbers of the anode catalyst layer and the cathode catalyst layer that are included in the fuel cell membrane assembly of the present embodiment are not particularly limited. The fuel cell membrane electrode assembly of the present embodiment may include any desired number of the anode catalyst layer and any desired number of the cathode catalyst layer. For example, the fuel cell membrane electrode assembly of the present embodiment may include only one anode catalyst layer and only one cathode catalyst layer, or may include only one anode catalyst layer and a plurality of cathode catalyst layers or a plurality of anode catalyst layers and only one cathode catalyst layer, or may include a plurality of anode catalyst layers and a plurality of cathode catalyst layers. When including a plurality of anode catalyst layers and/or a plurality of cathode catalyst layers, all layers may be the catalyst layer of the present invention or only a part of the all layers may be the catalyst layer of the present invention.

It is preferable that the fuel cell membrane electrode assembly of the present embodiment includes an electrolyte film in addition to the anode catalyst layer and the cathode catalyst layer. The electrolyte film may be any publicly known electrolyte film and a specific structure thereof is not particularly limited. Further, the number of electrolyte film included in the fuel cell membrane electrode assembly of the present embodiment is not particularly limited, and the fuel cell membrane electrode assembly of the present embodiment may include any desired number of electrolyte film.

FIG. 1 shows one embodiment of the fuel cell membrane electrode assembly of the present invention. However, the present invention is not limited to this embodiment.

As shown in FIG. 1, the fuel cell membrane electrode assembly includes a cathode catalyst layer and an anode catalyst layer, and an electrolyte film is provided between the cathode catalyst layer and the anode catalyst layer. Among the layers and the film, both of the cathode catalyst layer and the anode catalyst layer are made of the catalyst layer of the present invention.

Each of the anode catalyst layer and the cathode catalyst layer includes agglomerates with substantially spherical shape. Each of the agglomerates includes a fiber-like support material which supports noble-metal particles. The noble-metal particles on the support material serve as a catalyst.

As shown in FIG. 1, pores (primary pores) are provided between catalysts, and pores (secondary pores) are provided between agglomerates.

With the above arrangement, it is possible to realize a fuel cell membrane electrode assembly having excellent power generation performance and having a compact size.

3. Fuel Cell

A fuel cell of the present embodiment includes the fuel cell membrane electrode assembly of the present embodiment.

The fuel cell membrane electrode assembly of the present invention has been already explained above and therefore an explanation thereof is omitted here.

The kinds of the fuel cell of the present embodiment is not particularly limited. Preferable examples of the fuel cell of the present embodiment include a methanol fuel cell, a formic fuel cell, an ethanol fuel cell, a hydrogen fuel cell, and an ethylene glycol fuel cell.

The number of fuel cell membrane electrode assembly included in the fuel cell of the present embodiment is not particularly limited, and the fuel cell of the present embodiment may include any desired number of fuel cell membrane electrode assembly.

Components of the fuel cell of the present embodiment other than the fuel cell membrane electrode assembly may be any publicly known components.

4. Method for Producing Catalyst Layer Used in Fuel Cell Membrane Electrode Assembly A method for producing a catalyst layer for a fuel cell membrane electrode assembly of the present embodiment includes the steps of: (1) ultrasonicating and dispersing hydrophobic catalysts each consisting of noble metal fine particles supported on a fiber-like support material and proton-conductive polymers into a solvent so as to prepare a catalyst dispersion liquid, and (2) applying the catalyst dispersion liquid to a substrate so as to form a catalyst layer.

Initially, an explanation is made as to the step (1).

The hydrophobic catalyst consisting of noble metal fine particles supported on a fiber-like support material is not particularly limited, and may be any catalyst prepared by combining the aforementioned support material with the aforementioned noble metal fine particles. The support material and the noble metal fine particles have been already explained above and explanations thereof are omitted here.

The proton-conductive polymer is not particularly limited. Preferable examples of the proton-conductive polymer include ionomer (e.g. perfluorocarbon sulfonic acid (specifically, Nafion®, Hyflon®, Ion ionomer) etc.), carboxyl-group-containing perfluorocarbon (Flemion®), polystyrene sulfonate copolymer, polyvinyl sulfonate copolymer, and sulfonate imide. This allows formation of primary pores and secondary pores each having desired shape and size.

The solvent is not particularly limited. A preferable example of the solvent is alcohol. The alcohol is preferably methanol, ethanol, propanol, or butanol. The alcohol is more preferably propanol (e.g. 2-propanol). This allows formation of primary pores and secondary pores each having desired shape and size.

The solvent may contain other component. For example, the solvent preferably contains water. This allows easy regulation of the polarity of the solvent, thereby allowing formation of primary pores and secondary pores each having desired shape and size. The amount of water to be contained in the solvent is not particularly limited. The amount of water is preferably not more than 50%, more preferably not more than 40%, further preferably not more than 30%, further more preferably not more than 20%, and most preferably not more than 10% with respect to the volume of the solvent.

In the step (1), the catalysts and the polymers are ultrasonicated and dispersed into the solvent. The ultrasonication and dispersion may be carried out with a publicly known ultrasonicating device. Conditions for the ultrasonication are not particularly limited as long as the conditions allow the catalysts and the polymers to be dispersed into the solvent. For example, the ultrasonic to be emitted ranges preferably from 15 kHz to 400 kHz and more preferably from 30 kHz to 200 kHz. This arrangement does not excessively prevent agglomeration of the catalysts etc., allowing formation of primary pores and secondary pores each having desired shape and size. It is preferable that the ultrasonication is carried out while cooling the catalysts, the polymers, and the solvent. This arrangement does not prevent agglomeration of the catalysts, since this arrangement prevents increase in the temperature of the solvent by the ultrasonication. Consequently, this arrangement allows more efficient formation of primary pores and secondary pores each having desired shape and size.

Then, an explanation is made as to the step (2).

In the step (2), the catalyst dispersion liquid is applied to the substrate.

The substrate is not particularly limited. Preferable examples of the substrate include an electrolyte film, gas diffusion layer (specifically, carbon paper, carbon cloth, etc.), and a catalyst transfer film (specifically, plastic substrate such as PTFE sheet).

Selection of the substrate on which the catalyst layer is formed allows the catalyst layer to be distributed independently of the fuel cell membrane electrode assembly. In a case of using a gas diffusion layer as the substrate, hot-pressing the "gas diffusion electrode", i.e. "catalyst layer formed on the gas diffusion layer" onto an electrolyte membrane provides a fuel cell membrane electrode assembly. Hot-pressing the "catalyst transfer film electrode", i.e. "catalyst layer formed on the catalyst transfer film" onto an electrolyte membrane and peeling off the catalyst transfer film (e.g. plastic substrate) provides a fuel cell membrane electrode assembly.

A method for applying the catalyst dispersion liquid to the substrate is not particularly limited. Preferable examples of the method include spray-application, application by doctor blade, brush-application, and immersion. This arrangement allows easy production of a catalyst layer having uniform thickness.

The method for producing a catalyst layer for a fuel cell membrane electrode assembly of the present embodiment may include a step in addition to the above steps (1) and (2). For example, it is preferable to arrange the method to carry out, after the step (2), the step (3) of drying the catalyst layer. This arrangement allows evaporating the solvent in the primary pores and the secondary pores, realizing a connected state between the primary pores and the secondary pores.

Specific arrangement of the step (3) is not particularly limited. For example, the catalyst layer may be dried at room temperature (approximately 15-25° C.) or may be dried by application of heat (e.g. 150-300° C., 150-200° C.). In consideration of stable formation of primary pores and secondary pores with a desired shape and size and prevention of deterioration in proton-conductive polymers included in the catalyst layer, lower temperature for drying the catalyst layer is more preferable.

EXAMPLES

1. Comparative Example 1

Figure 2:
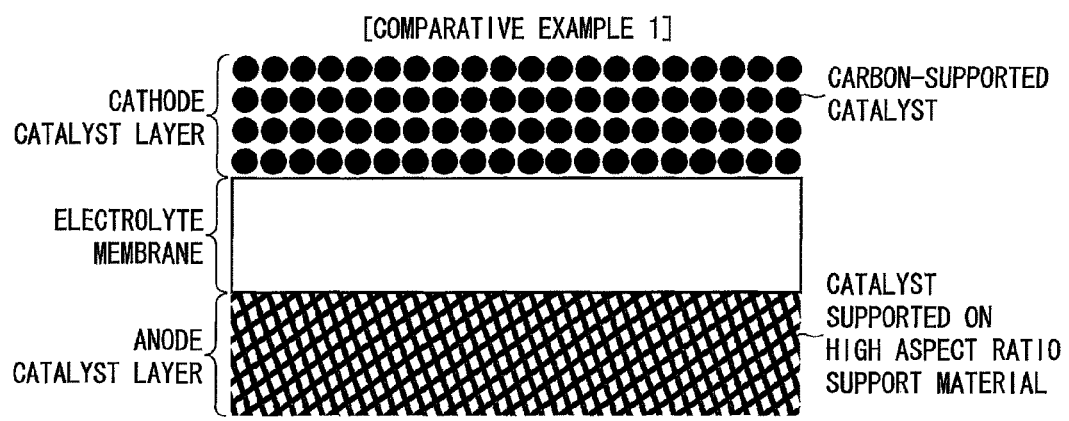
FIG. 2 is a drawing showing a fuel cell membrane electrode assembly in accordance with a comparative Example (Comparative Example 1) prepared in order to confirm the effect of the catalyst layer of the present invention.

FIG. 2 is a drawing showing a fuel cell membrane electrode assembly in accordance with a comparative Example (Comparative Example 1) prepared in order to confirm the effect of the catalyst layer of the present invention.

A cathode catalyst layer in Comparative Example 1 was formed by spraying, to an electrolyte membrane, a catalyst dispersion liquid in which a carbon-supported Pt catalyst, a Nafion® solution, 2-propanol, and water were dispersed. Further, an anode catalyst layer in Comparative Example 1 was formed by spraying, to an electrolyte membrane, a catalyst dispersion liquid in which a nanowire-supported PtRu catalyst, a Nafion® solution, 2-propanol, and water were dispersed by a ball mill.

Both in preparing the cathode catalyst layer and the anode catalyst layer, the Nafion® solution was a 5 wt % Nafion® solution produced by Sigma-Aldrich (product number 274704, Nafion perfluorinated ion-exchange resin, 5 wt % soln in lower aliphatic alcohols/H20 mix).

2. Example 1

Figure 3:
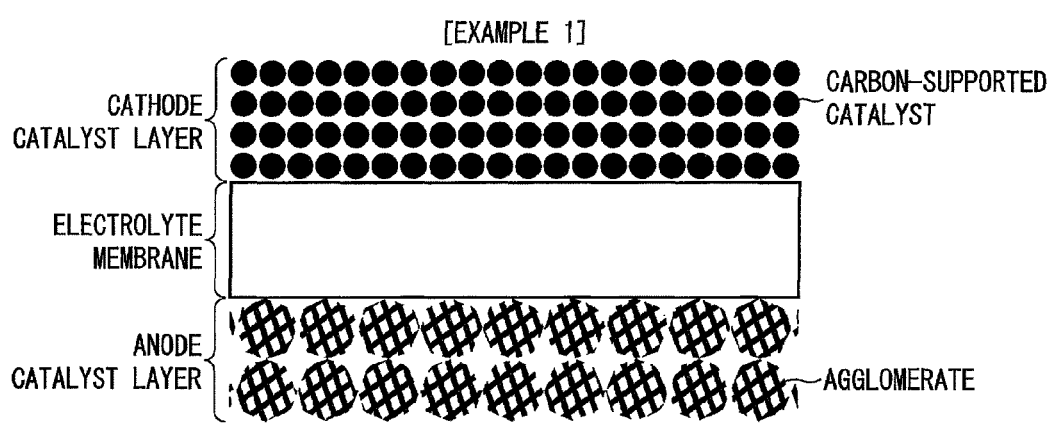
FIG. 3 is a drawing showing a fuel cell membrane electrode assembly in accordance with an example (Example 1) in which the catalyst layer of the present invention was used as an anode catalyst layer.

FIG. 3 is a drawing showing a fuel cell membrane electrode assembly in accordance with an example (Example 1) in which the catalyst layer of the present invention was used as an anode catalyst layer.

An anode catalyst layer in Example 1 was formed by spraying, to an electrolyte membrane, a catalyst dispersion liquid prepared by ultrasonicating a nanowire-supported PtRu-catalyst, a Nafion® solution, 2-propanol, and water.

The cathode catalyst layer in Example 1 was the same as that in Comparative Example 1 and an explanation thereof is omitted here.

3. Results of Analyses

SEM (scanning electron microscope) images of the catalyst layers of Example 1 and Comparative Example 1 were obtained and structures of respective catalyst layers were observed. The SEM images were obtained with a conventional field emission scanning electron microscope.

FIG. 4(a) is a drawing showing an SEM picture of the anode catalyst layer in Example 1 shown in FIG. 3. FIG. 4(b) is a drawing showing an SEM picture of the anode catalyst layer in Comparative Example 1 shown in FIG. 2.

Figure 5:
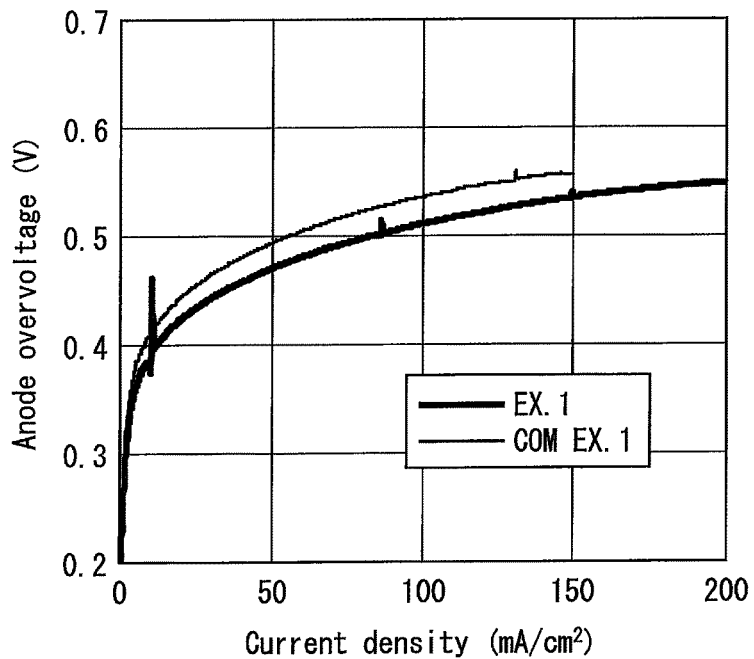
FIG. 5 is a drawing showing the results of anode polarization tests for Example 1 shown in FIG. 3 and Comparative Example 1 shown in FIG. 2.

Further, FIG. 5 is a drawing showing the results of anode polarization tests for Example 1 shown in FIG. 3 and Comparative Example 1 shown in FIG. 2.

It was found from the SEM picture shown in FIG. 4(a) that the anode catalyst layer had an inhomogeneous structure in which agglomerates of nanowire-supported PtRu catalysts, each agglomerate having longest diameter of at least 10 µm, contacted with each other. Further, the porosity of the anode catalyst layer was calculated as 81%. Further, the peak of the pore size distribution determined by mercury intrusion porosimetry for the catalyst layer prepared by similar manner was 147 nm. The anode polarization performance was evaluated by feeding a 3 mol/L methanol aqueous solution to the anode and hydrogen to the cathode. As a result, a methanol oxidization current of 34.0 mA/cm$^2$ was obtained at 0.45V as shown in FIG. 5. In FIG. 5, the longitudinal axis indicates a voltage whose reference is a voltage normally obtained by oxidization-reduction of hydrogen, and the lateral axis indicates current density per electrode area.

It was found from the SEM picture of FIG. 4(b) that the catalyst layer had a homogeneous structure without agglomerates whose longest diameter was at least 10 µm. The porosity of the catalyst layer was calculated as 69%. The anode polarization performance was evaluated by feeding a 3 mol/L methanol aqueous solution to the anode and hydrogen to the cathode. As a result, a methanol oxidization current of 22.4 mA/cm$^2$ was obtained at 0.45V as shown in FIG. 5.

FIG. 5 shows that Example 1 provides a larger current than Comparative Example 1 at the same potential.

Figure 6:
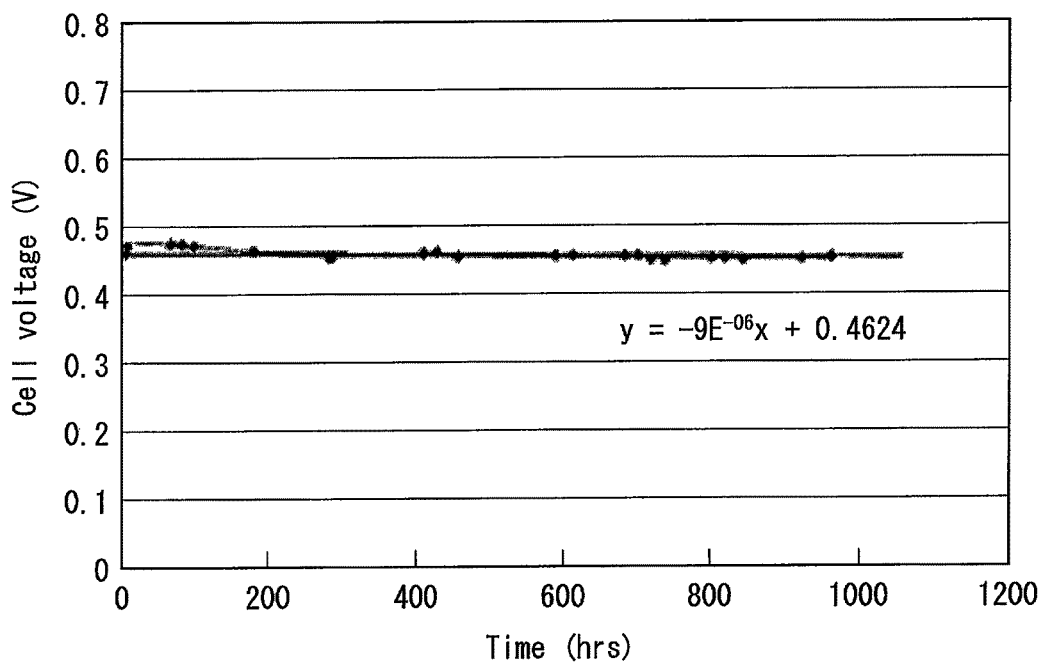
FIG. 6 is a drawing showing a chronological drop of a cell voltage in Example 1 shown in FIG. 3.

FIG. 6 is a drawing showing a chronological drop of a cell voltage in Example 1 shown in FIG. 3.

Even after a durability test for 1000 hours, the cell voltage dropped only by approximately 9 μV/hr with respect to a current of 100 mA/cm², and Example 1 exhibited a high and long-term reliability. Further, Example 1 exhibited high reliability after initial operation for 200 hours.

FIG. 7(a) is a drawing obtained by applying 39×44 meshes (the length of a side of each mesh is 2.77 μm and the area of each mesh is 7.72 μm²) to the SEM picture shown in FIG. 4(a). Further, FIG. 7(b) is a drawing obtained by daubing meshes including agglomerates whose shortest diameter is at least 3 μm with different colors for individual particles in FIG. 7(a).

Figure 8:
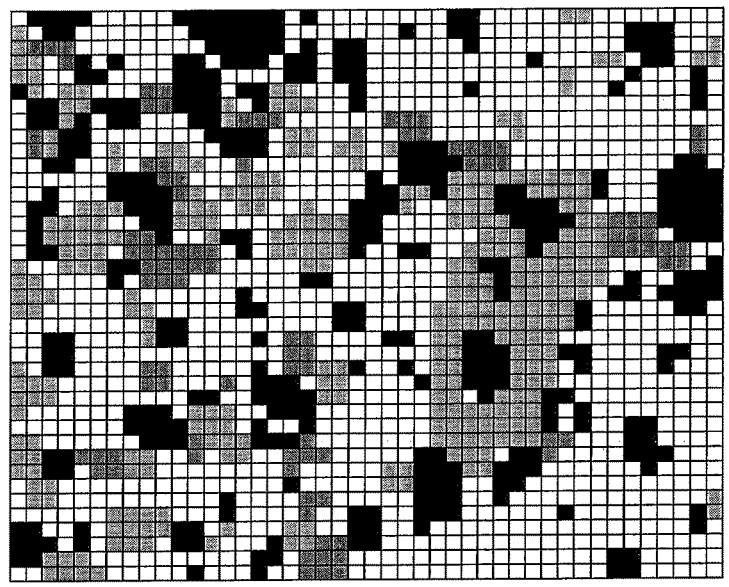
FIG. 8 is a drawing obtained by extracting only meshed portions from the drawing shown in FIG. 7(b).

FIG. 8 is a drawing obtained by extracting only meshed portions from the drawing shown in FIG. 7(b).

In FIG. 8, the ratio of the daubed area with respect to the whole area is 44.4% and the ratio of the non-daubed area (area where no agglomerate exists) with respect to the whole area is 55.6%.

FIG. 9 is a histogram relating to a particle size of an agglomerate.

It was found from the histogram that the mean diameter of an agglomerate is 6.6 μm, the median diameter of the agglomerate is 6 μm, and the mode diameter of the agglomerate is 3 μm.

Figure 10:
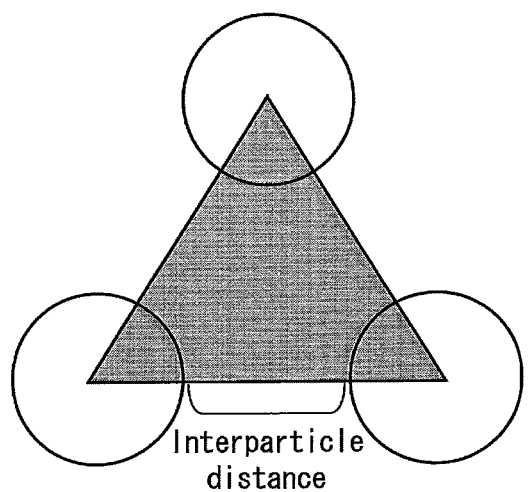
FIG. 10 is a reference drawing for calculating an inter-particle distance in an agglomerate.

FIG. 10 is a reference drawing for calculating an inter-particle distance in an agglomerate.

Considering that agglomerates were positioned at individual peaks of an equilateral triangle, the inter-particle distance was calculated as follows.

Since the mean size of an agglomerate is 6.6 (μm), when the inter-particle distance is x, the area (S1) of an equilateral triangle is $S1=\sqrt{3}/4 \times (x+6.6)^2$.

On the other hand, the area (S2) of agglomerates on the equilateral triangle is $S2=(6.6/2)^2 \times 3.14/2=17.1$ (μm²).

As described in the explanation relating to FIG. 8, when the inter-particle distance is calculated so that the ratio of the area of agglomerates with respect to the whole area is 44.4%, the inter-particle distance is 2.8 μm.

Figure 11:
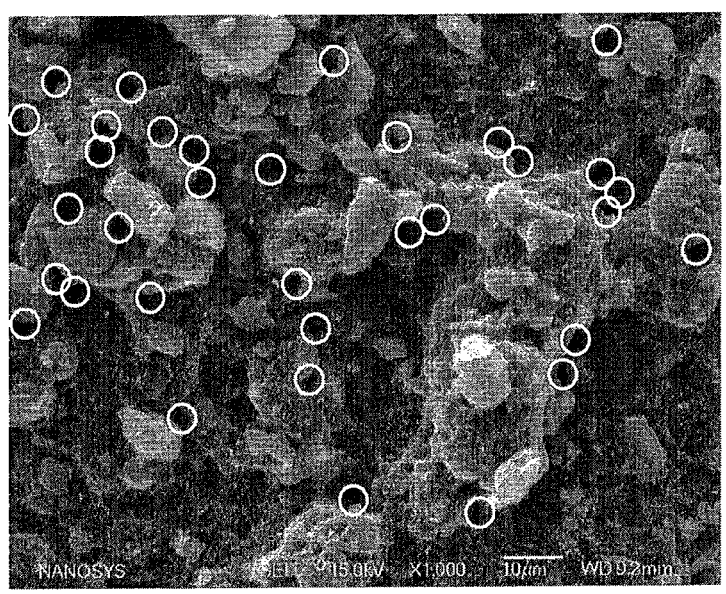
FIG. 11 is a drawing showing, using circle marks, secondary pores formed as gaps between agglomerates in FIG. 7.

FIG. 11 is a drawing showing, using circle marks, secondary pores formed as gaps between agglomerates in FIG. 7. The diameter of each circle mark is approximately 5 μm.

FIG. 12 is a drawing showing pore size distribution in an anode catalyst layer in Example 1 shown in FIG. 3. The pore diameter distribution was measured by an automatic porosimeter (AutoPoreIV9520) manufactured by Micromeritics Instrument Corporation.

According to data of the pore size distribution, the total pore content of secondary pores (0.5-5 μm) is 0.164 (cm³/g-Pt), and the total pore content of primary pores (60-250 nm) is 5.599 (cm³/g-Pt). The ratio of secondary pores to all pores is calculated as 2.8%.

Figure 13:
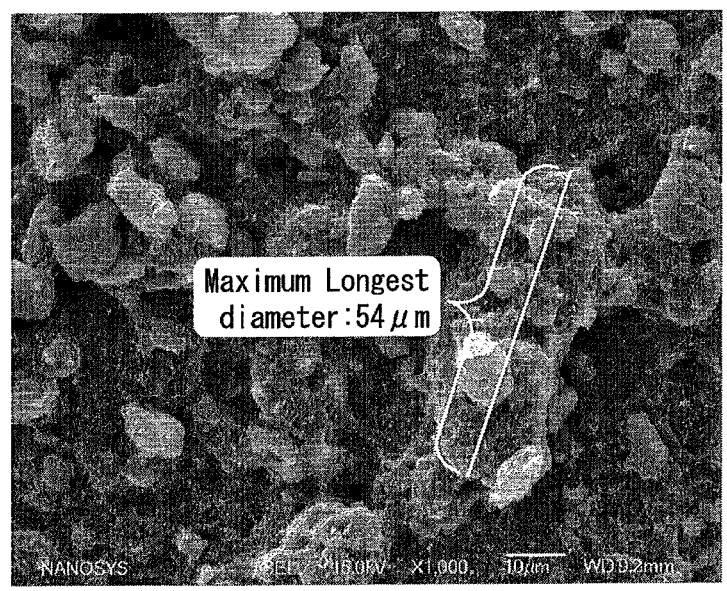
FIG. 13 is a drawing showing the maximum size (54 μm) of an agglomerate based on FIG. 7(a).

FIG. 13 is a drawing showing the maximum size (54 μm) of an agglomerate based on FIG. 7(a).

4. Comparative Example 2

FIG. 14 is a drawing showing a fuel cell membrane electrode assembly in accordance with a comparative example (Comparative Example 2) prepared in order to confirm the effect of the catalyst layer of the present invention.

In Comparative Example 2, a cathode catalyst layer was prepared in the same manner as preparation of the anode catalyst layer in Comparative Example 1 except that the materials for catalysts are different. Specifically, the material for the catalyst in Comparative Example 1 is a nanowire-supported PtRu catalyst, whereas the material for the catalyst in Comparative Example 2 is a nanowire-supported Pt catalyst. Except for this difference, a Nafion solution, a solvent etc. are common between the anode catalyst layer in Comparative Example 1 and the cathode catalyst layer in Comparative Example 2.

Further, in Comparative Example 2, an anode catalyst layer was prepared in the same manner as preparation of the cathode catalyst layer in Comparative Example 1 except that the materials for catalysts are different. Specifically the material for the catalyst in Comparative Example 1 is a carbon-supported Pt catalyst, whereas the material for the catalyst in Comparative Example 2 is a carbon-supported PtRu catalyst. Except for this difference, a Nafion solution, a solvent etc. are common between the cathode catalyst layer in Comparative Example 1 and the anode catalyst layer in Comparative Example 2. Cathode polarization performance was evaluated by feeding hydrogen to the anode and air to the cathode. As a result, an oxidization reduction current of 138 mA/cm² was obtained at 0.45V.

5. Example 2

FIG. 15 is a drawing showing a fuel cell membrane electrode assembly in accordance with an example (Example 2) in which the catalyst layer of the present invention was used as a cathode catalyst layer.

In Example 2, a cathode catalyst layer was prepared in the same manner as preparation of the anode catalyst layer in Example 1 except that the materials for catalysts are different. Specifically, the material for the catalyst in Example 1 is a nanowire-supported PtRu catalyst, whereas the material for the catalyst in Example 2 is a nanowire-supported Pt catalyst. Except for this difference, a Nafion solution, a solvent etc. are common between the anode catalyst layer in Example 1 and the cathode catalyst layer in Example 2.

Further, in Example 2, an anode catalyst layer was prepared in the same manner as preparation of the anode catalyst layer in Comparative Example 2. Cathode polarization performance was evaluated by feeding hydrogen to the anode and air to the cathode. As a result, an oxidization reduction current of 192 mA/cm² was obtained at 0.45V.

6. Results of Analyses

Figure 16:
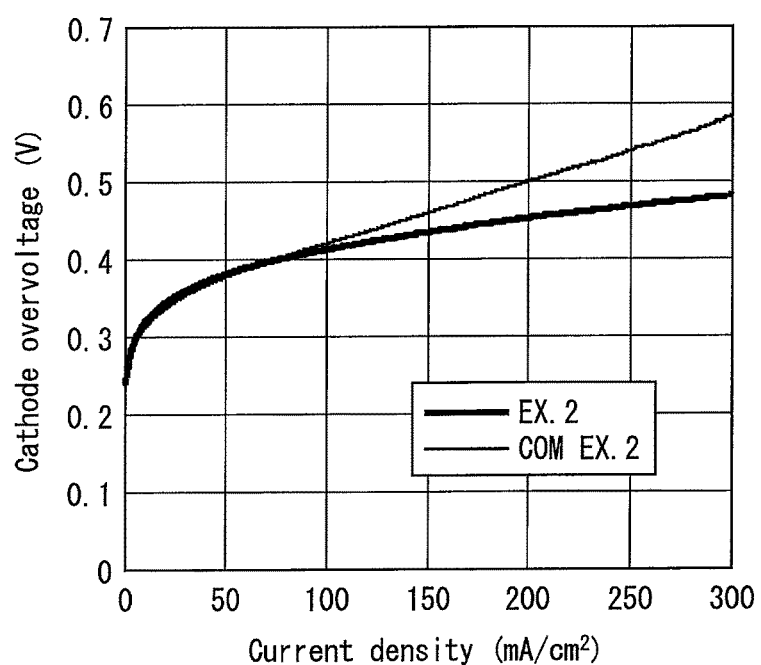
FIG. 16 is a drawing showing the results of cathode polarization tests for Example 2 shown in FIG. 15 and Comparative Example 2 shown in FIG. 14.

FIG. 16 is a drawing showing the results of cathode polarization tests for Example 2 shown in FIG. 15 and Comparative Example 2 shown in FIG. 14.

It was found that Example 2 provides a larger current than Comparative Example 2 at the same potential.

FIG. 17(a) is an SEM picture of the cathode catalyst layer in accordance with Example 2 shown in FIG. 15. FIG. 17(b) is an SEM picture of the cathode catalyst layer in accordance with Comparative Example 2 shown in FIG. 14.

The present invention may be arranged as follows.

It is preferable to arrange the catalyst layer of the present invention such that mean pore size of the pores provided between said adjacent ones of the plurality of agglomerates is larger than mean pore size of the pores provided between said adjacent ones of the plurality of catalysts.

In a catalyst layer, if the size of secondary pores is set to be substantially the same as or smaller than the size of primary pores, the area where agglomerates contact with each other gets larger. This makes the area of an interface between certain agglomerate and other agglomerate larger, resulting in drop of electron conductivity.

On the other hand, by setting the mean pore size of secondary pores to be larger than the mean pore size of primary pores, the area of an interface between certain agglomerate and other agglomerate gets smaller. This allows maintaining power generation performance without dropping electron conductivity.

It is preferable to arrange the catalyst layer of the present invention such that the mean pore size of the pores provided between said adjacent ones of the plurality of catalysts is not less than 60 nm and not more than 250 nm, and the mean pore size of the pores provided between said adjacent ones of the plurality of agglomerates is not less than 0.5 µm and not more than 5 µm.

By setting the mean pore size of the primary pores and the mean pore size of the secondary pores to be in the above ranges, respectively, it is possible to more appropriately overcome a trade-off relation between the request for making the catalyst layer compact and the request for high power generation performance necessary for a fuel cell.

It is preferable to arrange the catalyst layer of the present invention such that content of all pores whose size ranges from 0.5 µm to 5 µm out of the pores provided between said adjacent ones of the plurality of agglomerates is not less than 0.5% and not more than 5% with respect to content of all pores existing in the catalyst layer.

By setting the content of the secondary pores to be in the above range, it is possible to overcome a trade-off relation between the request for making the catalyst layer compact and the request for high power generation performance necessary for a fuel cell.

It is preferable to arrange the catalyst layer of the present invention such that mean equivalent circle diameter of the plurality of agglomerates is not less than 1 µm and not more than 10 µm.

The size of agglomerates is correlative to the size of the primary pores and the size of the secondary pores. For example, since the secondary pores are pores provided between agglomerates, smaller agglomerates result in smaller size of the secondary pores and smaller content of the secondary pores. This drops material diffusibility.

In order to deal with this problem, mean equivalent circle diameter of the agglomerates is set to be not less than 1 µm and not more than 10 µm. This makes the size of agglomerates sufficient for securing both material diffusibility and electron conductivity necessary for a fuel cell.

Note that the equivalent circle diameter is calculated based on, for example, a projected image obtained by projecting an agglomerate from a direction in which a cathode catalyst layer, an electrolyte membrane, and an anode catalyst layer are laminated. The equivalent circle diameter has the same meaning as Heywood diameter.

It is preferable to arrange the catalyst layer of the present invention such that mean diameter of the fiber-like support material is not more than 300 nm and an aspect ratio of the fiber-like support material is not less than 10 and not more than 1350.

The mean diameter of the fiber-like support material and the aspect ratio thereof are correlative to the size of agglomerates. When the mean diameter of the fiber-like support material is too large, the specific surface area of the fiber-like support material is too small. At that time, if a large amount of noble metal catalyst fine particles is supported on the surface of a fiber-like support material, the noble metal catalyst fine particles get closer to one another, resulting in agglomeration of the noble metal catalyst fine particles. This makes it impossible to increase the amount of the noble metal catalyst fine particles supported on the surface of the fiber-like support material. Consequently, in case of forming a catalyst layer including noble metal catalyst fine particles in an amount necessary for desired cell performance, the catalyst layer gets thicker, which may lead to drop of material diffusibility or to larger ion conductive resistance that drops power generation performance of a fuel cell.

Further, when the aspect ratio of the fiber-like support material is too high or too low, it is impossible to form agglomerates whose size is sufficient for securing both material diffusibility and electron conductivity.

In order to deal with this problem, the mean diameter of the fiber-like support material is set to not more than 300 nm and the aspect ratio thereof is set to not less than 10 and not more than 1350. This makes the size of agglomerates sufficient for securing both material diffusibility and electron conductivity necessary for a fuel cell.

The fuel cell membrane electrode assembly of the present invention is arranged such that at least one of an anode catalyst layer and a cathode catalyst layer is a catalyst layer of the present invention.

With the arrangement, it is possible to realize a fuel cell membrane electrode assembly having excellent power generation performance and having a compact size.

The fuel cell of the present invention includes a fuel cell membrane electrode assembly of the present invention.

With the arrangement, it is possible to realize a fuel cell membrane electrode assembly having excellent power generation performance and having a compact size.

The followings are descriptions disclosed in the specification, claims, etc. of the U.S. Provisional Application Ser. No. 61/175,293 on which the subject application claims priority. The following descriptions are to be referred to when understanding the invention defined by claims of the subject application. The entire contents of the following descriptions are included in the present invention.

Fuel cells are devices that convert the chemical energy of fuels, such as hydrogen and methanol, directly into electrical energy. The basic physical structure or building block of a fuel cell consists of an electrolyte layer in contact with a porous anode and cathode on either side. In a typical fuel cell, a fuel (e.g., methanol or hydrogen) is fed to an anode catalyst that converts the fuel molecules into protons (and carbon dioxide for methanol fuel cells), which pass through the proton exchange membrane to the cathode side of the cell. At the cathode catalyst, the protons (e.g., hydrogen atoms without an electron) react with the oxygen ions to form water. By connecting a conductive wire from the anode to the cathode side, the electrons stripped from fuel, hydrogen or methanol on the anode side, can travel to the cathode side and combine with oxygen to form oxygen ions, thus producing electricity. Fuel cells operating by electrochemical oxidation of hydrogen or methanol fuels at the anode and reduction of oxygen at the cathode are attractive power sources because of their high conversion efficiencies, low pollution, lightweight design, and high energy density.

In direct methanol fuel cells (DMFCs), the liquid methanol ($CH_3OH$) is oxidized in the presence of water at the anode generating $CO_2$, hydrogen ions and the electrons that travel through the external circuit as the electric output of the fuel cell. The hydrogen ions travel through the electrolyte and react with oxygen from the air and the electrons from the external circuit to form water at the anode completing the circuit.

Anode Reaction: $CH_3OH + H_2O \rightarrow CO_2 + 6H^+ + 6e^-$
Cathode Reaction $3/2 O_2 + 6H^+ + 6e^- \rightarrow 3H_2O$
Overall Cell Reaction: $CH_3OH + 3/2 O_2 \rightarrow CO_2 + 2H_2O$ Initially developed in the early 1990s, DMFCs were not embraced because of their low efficiency and power density, as well as other problems. Improvements in catalysts and other recent developments have increased power density 20-fold and the efficiency may eventually reach 40%. These cells have been tested in a temperature range from about 50° C.-120° C. This low operating temperature and no requirement for a fuel reformer make the DMFC an excellent candidate for very small to mid-sized applications, such as cellular phones, laptops, cameras and other consumer products, up to automobile power plants. One of the drawbacks of the DMFC is that the low-temperature oxidation of methanol to hydrogen ions and carbon dioxide requires a more active catalyst, which typically means a larger quantity of expensive platinum (and/or ruthenium) catalyst is required.

A DMFC typically requires the use of ruthenium (Ru) as a catalyst component because of its high carbon monoxide (CO) tolerance and reactivity. Ru disassociates water to create an oxygenated species that facilitates the oxygenation of CO, which is produced from the methanol, to $CO_2$. Some existing DMFCs use nanometer-sized bimetallic Pt:Ru particles as the electro-oxidation catalyst because of the high surface area to volume ratio of the particles. The Pt/Ru nanoparticles are typically provided on a carbon support (e.g., carbon black, fullerene soot, or desulfurized carbon black) to yield a packed particle composite catalyst structure. Most commonly used techniques for creating the Pt:Ru carbon packed particle composite are the impregnation of a carbon support in a solution containing platinum and ruthenium chlorides followed by thermal reduction.

A multi-phase interface or contact is established among the fuel cell reactants, electrolyte, active Pt:Ru nanoparticles, and carbon support in the region of the porous electrode. The nature of this interface plays a critical role in the electrochemical performance of the fuel cell. Often, only a portion of catalyst particle sites in packed particle composites are utilized because other sites are either not accessible to the reactants, or not connected to the carbon support network (electron path) and/or electrolyte (proton path). In addition, there is a need for catalysts with increased activity, including Pt:Ru catalysts with improved properties for use in fuel cells.

In one embodiment, the present invention provides electrochemical catalyst nanoparticles. Suitably, the nanoparticles comprising one or more metals, wherein the atomic ratio of oxygen in the nanoparticles to one of the metals in the nanoparticles is in the range of about 3 to about 6 (suitably, about 3.6 to about 5, about 3.6 to about 4, or about 3.6). Suitably, the nanoparticles have a size of about 1 nm to about 10 nm.

In exemplary embodiments, electrochemical catalyst nanoparticles comprise a metal that comprises one or more of Pt, Au, Pd, Ru, Re, Rh, Os, Ir, Fe, Co, Ni, Cu, Ag, V, Cr, Mo, W and alloys or mixtures thereof. Suitably, the nanoparticles comprise Pt:Ru. In suitable such embodiments, the ratio of oxygen to Ru is in the range of about 3.6 to about 6, the percentage of metallic ruthenium is less than about 30%, and the percentage of metallic platinum is about 70% to about 90%. In an exemplary embodiment, the present invention provides Pt:Ru electrochemical catalyst nanoparticles, wherein the atomic ratio of oxygen to Ru in the nanoparticle is in the range of about 3 to about 6, the percentage of metallic ruthenium is less than about 30%, and the percentage of metallic platinum is about 70% to about 90%. Suitably, the Pt:Ru nanoparticles have a lattice parameter of greater than 3.923 Å. In further embodiments the Pt:Ru nanoparticles have a crystal size of less than 2.2 nm. The nanoparticles also suitably comprise nitrogen.

In further embodiments, the present invention provides supported electrochemical catalysts. Exemplary supports for the catalysts include carbon black, carbon powder (including cross-linked carbon powder), nanowires, and carbon powder-nanowire (also called nanowire-powder) composites. Suitably, the electrochemical catalysts comprise a nanoparticle comprising one or more metals, wherein the atomic ratio of oxygen in the nanoparticle to one of the metals in the nanoparticle is in the range of about 3 to about 6. Exemplary sizes and compositions of the nanoparticles are described throughout. In suitable embodiments, the nanowires of the nanowire-supported electrochemical catalysts are selected from the group consisting of $RuO_2$, SiC, GaN, $TiO_2$, $SnO_2$, $WC_x$, $MoC_x$, ZrC, $WN_x$, and $MoN_x$ nanowires, wherein x is a positive integer. In exemplary embodiments, the present invention provides supported electrochemical catalyst, the electrochemical catalyst comprising a Pt:Ru nanoparticle, wherein the atomic ratio of oxygen to Ru in the nanoparticle is about 3 to about 6, the percentage of metallic ruthenium is less than about 30%, and the percentage of metallic platinum is about 70% to about 90%. Suitably, the Pt:Ru nanoparticles have a lattice parameter of greater than 3.923 Å. In further embodiments, the Pt:Ru nanoparticles have a crystal size of less than 2.2 nm.

In further embodiments, the present invention provides membrane electrode assemblies (MEAs) comprising the electrochemical catalyst nanoparticles of the present invention, suitably carbon black, carbon powder (including cross-linked carbon powder), nanowires, and nanowire-powder composites, supported electrochemical catalysts. In addition, the present invention provides fuel cells comprising the MEAs.

The present invention also provides methods of preparing supported Pt:Ru electrochemical catalyst nanoparticles, including carbon black, carbon powder (including cross-linked carbon powder), nanowires, and nanowire-powder composites, supported catalysts. Suitably, the atomic ratio of oxygen to Ru in the nanoparticles is in the range of about 3 to about 6, the percentage of metallic ruthenium is less than about 30%, and the percentage of metallic platinum is about 70% to about 90%. The methods suitably comprise providing a Pt:Ru colloid solution prepared by combining $RCl_3xH_2O$, ethylene glycol, $H_2PtCl_6xH_2O$ and NaOH. This solution is then added to a support, e.g., a suspension of nanowires (e.g., carbon-comprising nanowires) to prepare a nanowire-Pt:Ru colloid solution. The pH of the nanowire-Pt:Ru colloid solution is then reduced, and then the nanowire-supported Pt:Ru electrochemical catalyst nanoparticles are recovered. Suitably, the pH is reduced pH 11, then to pH 7, then to pH 4, then to pH 1, over the course of about 18 hours.

It should be appreciated that the particular implementations shown and described herein are examples of the invention and are not intended to otherwise limit the scope of the present invention in any way. Indeed, for the sake of brevity, conventional electronics, manufacturing, semiconductor devices, and nanowire (NW), nanorod, nanotube, and nanoribbon technologies and other functional aspects of the systems (and components of the individual operating components of the systems) may not be described in detail herein. Furthermore, for purposes of brevity, the invention is frequently described herein as pertaining to nanowires, though other similar structures are also encompassed herein.

It should be appreciated that although nanowires are frequently referred to, the techniques described herein are also applicable to other nanostructures, such as nanorods, nanotubes, nanotetrapods, nanoribbons and/or combinations thereof. It should further be appreciated that a carbon-based layer (including non-crystalline carbon, such as non-basal plane carbon, as well as crystalline nanographite coatings) can be produced on the surface of a wide range of materials, including, but not limited to, conventional fibers and fiber structures; flat, curved and irregular surfaces; and various materials such as metal, semiconductors, ceramic foams, reticulated metals and ceramics.

As used herein, an "aspect ratio" is the length of a first axis of a nanostructure divided by the average of the lengths of the second and third axes of the nanostructure, where the second and third axes are the two axes whose lengths are most nearly equal to each other. For example, the aspect ratio for a perfect rod would be the length of its long axis divided by the diameter of a cross-section perpendicular to (normal to) the long axis.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In another embodiment, the nanostructure comprises a core of a first material and at least one shell of a second (or third etc.) material, where the different material types are distributed radially about the long axis of a nanowire, a long axis of an arm of a branched nanocrystal, or the center of a nanocrystal, for example. A shell need not completely cover the adjacent materials to be considered a shell or for the nanostructure to be considered a heterostructure. For example, a nanocrystal characterized by a core of one material covered with small islands of a second material is a heterostructure. In other embodiments, the different material types are distributed at different locations within the nanostructure. For example, material types can be distributed along the major (long) axis of a nanowire or along a long axis or arm of a branched nanocrystal. Different regions within a heterostructure can comprise entirely different materials, or the different regions can comprise a base material.

As used herein, a "nanostructure" is a structure having at least one region or characteristic dimension with a dimension of less than about 500 nm, e.g., less than about 200 nm, less than about 100 nm, less than about 50 nm, or even less than about 20 nm. Typically, the region or characteristic dimension will be along the smallest axis of the structure. Examples of such structures include nanowires, nanorods, nanotubes, branched nanocrystals, nanotetrapods, tripods, bipods, nanocrystals, nanodots, quantum dots, nanoparticles, branched tetrapods (e.g., inorganic dendrimers), and the like. Nanostructures can be substantially homogeneous in material properties, or in other embodiments can be heterogeneous (e.g., heterostructures). Nanostructures can be, for example, substantially crystalline, substantially monocrystalline, polycrystalline, amorphous, or combinations thereof. In one aspect, one of the three dimensions of the nanostructure has a dimension of less than about 500 nm, for example, less than about 200 nm, less than about 100 nm, less than about 50 nm, or even less than about 20 nm.

As used herein, the term "nanowire" generally refers to any elongated conductive or semiconductive material (or other material described herein) that includes at least one cross sectional dimension that is less than 500 nm, and preferably, less than 100 nm, and has an aspect ratio (length:width) of greater than 10, preferably greater than 50, and more preferably, greater than 100.

The nanowires of this invention can be substantially homogeneous in material properties, or in other embodiments can be heterogeneous (e.g. nanowire heterostructures). The nanowires can be fabricated from essentially any convenient material or materials, and can be, e.g., substantially crystalline, substantially monocrystalline, polycrystalline, amorphous, or combinations thereof. Nanowires can have a variable diameter or can have a substantially uniform diameter, that is, a diameter that shows a variance less than about 20% (e.g., less than about 10%, less than about 5%, or less than about 1%) over the region of greatest variability and over a linear dimension of at least 5 nm (e.g., at least 10 nm, at least 20 nm, or at least 50 nm). Typically the diameter is evaluated away from the ends of the nanowire (e.g., over the central 20%, 40%, 50%, or 80% of the nanowire). A nanowire can be straight or can be e.g., curved or bent, over the entire length of its long axis or a portion thereof. In other embodiments, a nanowire or a portion thereof can exhibit two- or three-dimensional quantum confinement.

Examples of such nanowires include semiconductor nanowires as described in Published International Patent Application Nos. WO 02/17362, WO 02/48701, and WO 01/03208, carbon nanotubes, and other elongated conductive or semiconductive structures of like dimensions, which are incorporated herein by reference.

As used herein, the term "nanorod" generally refers to any elongated conductive or semiconductive material (or other material described herein) similar to a nanowire, but having an aspect ratio (length:width) less than that of a nanowire. Note that two or more nanorods can be coupled together along their longitudinal axis so that the coupled nanorods span all the way between electrodes. Alternatively, two or more nanorods can be substantially aligned along their longitudinal axis, but not coupled together, such that a small gap exists between the ends of the two or more nanorods. In this case, electrons can flow from one nanorod to another by hopping from one nanorod to another to traverse the small gap. The two or more nanorods can be substantially aligned, such that they form a path by which electrons can travel between electrodes.

A wide range of types of materials for nanowires, nanorods, nanotubes and nanoribbons can be used, including semiconductor material selected from, e.g., Si, Ge, Sn, Se, Te, B, C (including diamond), P, B—C, B—P($BP_6$), B—Si, Si—C, Si—Ge, Si—Sn and Ge—Sn, SiC, BN, BP, BAs, AlN, AlP, AlAs, AlSb, GaN, GaP, GaAs, GaSb, InN, InP, InAs, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, AgF, AgCl, AgBr, AgI, $BeSiN_2$, $CaCN_2$, $ZnGeP_2$, $CdSnAs_2$, $ZnSnSb_2$, $CuGeP_3$, $CuSi_2P_3$, (Cu, Ag)(Al, Ga, In, Tl, Fe)(S, Se, Te)$_2$, $Si_3N_4$, $Ge_3N_4$, $Al_2O_3$, (Al, Ga, In)$_2$ (S, Se, Te)$_3$, $Al_2CO$, and an appropriate combination of two or more such semiconductors.

The nanowires can also be formed from other materials such as metals such as gold, nickel, palladium, iridium, cobalt, chromium, aluminum, titanium, tin and the like, metal alloys, polymers, conductive polymers, ceramics, and/or combinations thereof. Other now known or later developed conducting or semiconductor materials can be employed.

Nanowires of the present invention may also be comprised of organic polymers, ceramics, inorganic semiconductors such as carbides and nitrides, and oxides (such as $TiO_2$ or ZnO), carbon nanotubes, biologically derived compounds, e.g., fibrillar proteins, etc. or the like. For example, in certain embodiments, inorganic nanowires are employed, such as semiconductor nanowires. Semiconductor nanowires can be comprised of a number of Group IV, Group III-V or Group II-VI semiconductors or their oxides. In one embodiment, the nanowires may include metallic conducting, semiconducting, carbide, nitride, or oxide materials such as $RuO_2$, SiC, GaN, $TiO_2$, $SnO_2$, $WC_x$, $MoC_x$, ZrC, $WN_x$, $MoN_x$ etc. As used throughout, the subscript "x," when used in chemical formulae, refers to a whole, positive integer (e.g., 1, 2, 3, 4, 5, 6, 7, 8, 9, 10, etc). It is suitable that the nanowires be made from a material that is resistant to degradation in a weak acid so that the nanowires are compatible with the reactants of a variety of different fuel cells. Nanowires according to this invention can include, or can expressly exclude, carbon nanotubes, and, in certain embodiments, exclude "whiskers" or "nanowhiskers", particularly whiskers having a diameter greater than 100 nm, or greater than about 200 nm.

In other aspects, the semiconductor may comprise a dopant from a group consisting of: a p-type dopant from Group III of the periodic table; an n-type dopant from Group V of the periodic table; a p-type dopant selected from a group consisting of: B, Al and In; an n-type dopant selected from a group consisting of: P, As and Sb; a p-type dopant from Group II of the periodic table; a p-type dopant selected from a group consisting of: Mg, Zn, Cd and Hg; a p-type dopant from Group IV of the periodic table; a p-type dopant selected from a group consisting of: C and Si.; or an n-type dopant selected from a group consisting of: Si, Ge, Sn, S, Se and Te. Other now known or later developed dopant materials can be employed.

Additionally, the nanowires or nanoribbons can include carbon nanotubes, or nanotubes formed of conductive or semiconductive organic polymer materials, (e.g., pentacene, and transition metal oxides).

It should be understood that the spatial descriptions (e.g., "above", "below", "up", "down", "top", "bottom", etc.) made herein are for purposes of illustration only, and that devices of the present invention can be spatially arranged in any orientation or manner.

Nanomaterials have been produced in a wide variety of different ways. For example, solution based, surfactant mediated crystal growth has been described for producing spherical inorganic nanomaterials, e.g., quantum dots, as well as elongated nanomaterials, e.g., nanorods and nanotetrapods. Other methods have also been employed to produce nanomaterials, including vapor phase methods. For example, silicon nanocrystals have been reportedly produced by laser pyrolysis of silane gas.

Other methods employ substrate based synthesis methods including, e.g., low temperature synthesis methods for producing, e.g., ZnO nanowires as described by Greene et al. ("Low-temperature wafer scale production of ZnO nanowire arrays," L. Greene, M. Law, J. Goldberger, F. Kim, J. Johnson, Y. Zhang, R. Saykally, P. Yang, Angew. Chem. Int. Ed. 42, 3031-3034, 2003), and higher temperature VLS methods that employ catalytic gold particles, e.g., that are deposited either as a colloid or as a thin film that forms a particle upon heating. Such VLS methods of producing nanowires are described in, for example, Published International Patent Application No. WO 02/017362, the full disclosure of which is incorporated herein by reference in its entirety for all purposes.

Nanostructures can be fabricated and their size can be controlled by any of a number of convenient methods that can be adapted to different materials. For example, synthesis of nanocrystals of various composition is described in, e.g., Peng et al. (2000) "Shape Control of CdSe Nanocrystals" Nature 404, 59-61; Puntes et al. (2001) "Colloidal nanocrystal shape and size control: The case of cobalt" Science 291, 2115-2117; U.S. Pat. No. 6,306,736 to Alivisatos et al. (Oct. 23, 2001) entitled "Process for forming shaped group III-V semiconductor nanocrystals, and product formed using process;" U.S. Pat. No. 6,225,198 to Alivisatos et al. (May 1, 2001) entitled "Process for forming shaped group II-VI semiconductor nanocrystals, and product formed using process;" U.S. Pat. No. 5,505,928 to Alivisatos et al. (Apr. 9, 1996) entitled "Preparation of III-V semiconductor nanocrystals;" U.S. Pat. No. 5,751,018 to Alivisatos et al. (May 12, 1998) entitled "Semiconductor nanocrystals covalently bound to solid inorganic surfaces using self-assembled monolayers;" U.S. Pat. No. 6,048,616 to Gallagher et al. (Apr. 11, 2000) entitled "Encapsulated quantum sized doped semiconductor particles and method of manufacturing same;" and U.S. Pat. No. 5,990,479 to Weiss et al. (Nov. 23, 1999) entitled "Organo luminescent semiconductor nanocrystal probes for biological applications and process for making and using such probes."

Growth of nanowires having various aspect ratios, including nanowires with controlled diameters, is described in, e.g., Gudiksen et al. (2000) "Diameter-selective synthesis of semiconductor nanowires" J. Am. Chem. Soc. 122, 8801-8802; Cui et al. (2001) "Diameter-controlled synthesis of single-crystal silicon nanowires" Appl. Phys. Lett. 78, 2214-2216; Gudiksen et al. (2001) "Synthetic control of the diameter and length of single crystal semiconductor nanowires" J. Phys. Chem. B 105, 4062-4064; Morales et al. (1998) "A laser ablation method for the synthesis of crystalline semiconductor nanowires" Science 279, 208-211; Duan et al. (2000) "General synthesis of compound semiconductor nanowires" Adv. Mater. 12, 298-302; Cui et al. (2000) "Doping and electrical transport in silicon nanowires" J. Phys. Chem. B 104, 5213-5216; Peng et al. (2000) "Shape control of CdSe nanocrystals" Nature 404, 59-61; Puntes et al. (2001) "Colloidal nanocrystal shape and size control: The case of cobalt" Science 291, 2115-2117; U.S. Pat. No. 6,306,736 to Alivisatos et al. (Oct. 23, 2001) entitled "Process for forming shaped group III-V semiconductor nanocrystals, and product formed using process;" U.S. Pat. No. 6,225,198 to Alivisatos et al. (May 1, 2001) entitled "Process for forming shaped group II-VI semiconductor nanocrystals, and product formed using process"; U.S. Pat. No. 6,036,774 to Lieber et al. (Mar. 14, 2000) entitled "Method of producing metal oxide nanorods"; U.S. Pat. No. 5,897,945 to Lieber et al. (Apr. 27, 1999) entitled "Metal oxide nanorods"; U.S. Pat. No. 5,997,832 to Lieber et al. (Dec. 7, 1999) "Preparation of carbide nanorods;" Urbau et al. (2002) "Synthesis of single-crystalline perovskite nanowires composed of barium titanate and strontium titanate" J. Am. Chem. Soc., 124, 1186; and Yun et al. (2002) "Ferroelectric Properties of Individual Barium Titanate Nanowires Investigated by Scanned Probe Microscopy" Nanoletters 2, 447.

In certain embodiments, the nanowires of the present invention are produced by growing or synthesizing these elongated structures on substrate surfaces. By way of example, published U.S. Patent Application No. US-2003-0089899-A1 discloses methods of growing uniform populations of semiconductor nanowires from gold colloids adhered to a solid substrate using vapor phase epitaxy. Greene et al. ("Low-temperature wafer scale production of ZnO nanowire arrays", L. Greene, M. Law, J. Goldberger, F. Kim, J. Johnson, Y. Zhang, R. Saykally, P. Yang, Angew. Chem. Int. Ed. 42, 3031-3034, 2003) discloses an alternate method of synthesizing nanowires using a solution based, lower temperature wire growth process. A variety of other methods are used to synthesize other elongated nanomaterials, including the surfactant based synthetic methods disclosed in U.S. Pat. Nos. 5,505,928, 6,225,198 and 6,306,736, for producing shorter nanomaterials, and the known methods for producing carbon nanotubes, see, e.g., US-2002/0179434 to Dai et al., as well as methods for growth of nanowires without the use of a growth substrate, see, e.g., Morales and Lieber, Science, V.279, p. 208 (Jan. 9, 1998). As noted herein, any or all of these different materials may be employed in producing the nanowires for use in the invention. For some applications, a wide variety of group III-V, II-VI and group IV semiconductors may be utilized, depending upon the ultimate application of the substrate or article produced. In general, such semiconductor nanowires have been described in, e.g., US-2003-0089899-A1, incorporated herein above.

Growth of branched nanowires (e.g., nanotetrapods, tripods, bipods, and branched tetrapods) is described in, e.g., Jun et al. (2001) "Controlled synthesis of multi-armed CdS nanorod architectures using monosurfactant system" J. Am. Chem. Soc. 123, 5150-5151; and Manna et al. (2000) "Synthesis of Soluble and Processable Rod-, Arrow-, Teardrop-, and Tetrapod-Shaped CdSe Nanocrystals" J. Am. Chem. Soc. 122, 12700-12706.

Synthesis of nanoparticles is described in, e.g., U.S. Pat. No. 5,690,807 to Clark Jr. et al. (Nov. 25, 1997) entitled "Method for producing semiconductor particles"; U.S. Pat. No. 6,136,156 to El-Shall, et al. (Oct. 24, 2000) entitled "Nanoparticles of silicon oxide alloys;" U.S. Pat. No. 6,413,489 to Ying et al. (Jul. 2, 2002) entitled "Synthesis of nanometer-sized particles by reverse micelle mediated techniques;" and Liu et al. (2001) "Sol-Gel Synthesis of Free-Standing Ferroelectric Lead Zirconate Titanate Nanoparticles" J. Am. Chem. Soc. 123, 4344. Synthesis of nanoparticles is also described in the above citations for growth of nanocrystals, nanowires, and branched nanowires, where the resulting nanostructures have an aspect ratio less than about 1.5.

Synthesis of core-shell nanostructure heterostructures, namely nanocrystal and nanowire (e.g., nanorod) core-shell heterostructures, are described in, e.g., Peng et al. (1997) "Epitaxial growth of highly luminescent CdSe/CdS core/shell nanocrystals with photostability and electronic accessibility" J. Am. Chem. Soc. 119, 7019-7029; Dabbousi et al. (1997) "(CdSe)ZnS core-shell quantum dots: Synthesis and characterization of a size series of highly luminescent nanocrysallites" J. Phys. Chem. B 101, 9463-9475; Manna et al. (2002) "Epitaxial growth and photochemical annealing of graded CdS/ZnS shells on colloidal CdSe nanorods" J. Am. Chem. Soc. 124, 7136-7145; and Cao et al. (2000) "Growth and properties of semiconductor core/shell nanocrystals with InAs cores" J. Am. Chem. Soc. 122, 9692-9702. Similar approaches can be applied to growth of other core-shell nanostructures.

Growth of nanowire heterostructures in which the different materials are distributed at different locations along the long axis of the nanowire is described in, e.g., Gudiksen et al. (2002) "Growth of nanowire superlattice structures for nanoscale photonics and electronics" Nature 415, 617-620; Bjork et al. (2002) "One-dimensional steeplechase for electrons realized" Nano Letters 2, 86-90; Wu et al. (2002) "Block-by-block growth of single-crystalline Si/SiGe superlattice nanowires" Nano Letters 2, 83-86; and U.S. patent application 60/370,095 (Apr. 2, 2002) to Empedocles entitled "Nanowire heterostructures for encoding information." Similar approaches can be applied to growth of other heterostructures.

As described herein, and throughout co-assigned provisional Patent Application No. 60/738,100, filed Nov. 21, 2005, the entire contents of which are incorporated by reference herein, nanowire structures with multiple shells can also be fabricated, such as, for example, a conducting inner core wire (which may or may not be doped) (e.g., to impart the necessary conductivity for electron transport) and one or more outer-shell layers that provide a suitable surface for binding catalyst (and/or polymer electrolyte). For example, in one embodiment, a multi-layer or multi-walled carbon nanotube (MWNT) can be formed in which the outermost shell layer is converted to silicon carbide to provide a surface (SiC) to bind catalyst (and/or polymer electrolyte) and a conductive carbon nanotube core to impart the necessary conductivity. In alternative embodiments, the core may consist of heavily doped material such as doped silicon, and a shell of a carbide, nitride etc. material (e.g., SiC) may then be formed on the core. The use of silicon as the core material leverages the extensive experience and infrastructure known for fabricating silicon nanowires. A carbide shell, such as SiC, WC, MoC or mixed carbide (e.g. WSiC) may be formed around the core material using a controlled surface reaction. SiC, WC and MoC are known for their high conductivity and chemical stability. In addition, these materials have been shown to have catalytic properties similar to those of precious metals, such as Pt, for methanol oxidation, and therefore may provide further performance enhancements in the nanowire bird's nest MEA. The precursor materials for the shell may be deposited on the core nanowire surface (e.g., silicon) by atomic layer deposition (ALD) and then converted to the carbide by high-temperature carbothermal reduction, for example.

Exemplary nanowires that can be used in the practice of the present invention include carbon-comprising nanowires, such as those disclosed in U.S. Patent Application Publication No. 2007-0212538 and U.S. patent application Ser. No. 11/808,760, filed Jun. 12, 2007, the disclosures of each of which are incorporated by reference herein in their entireties for all purposes. As disclosed in U.S. Patent Application Publication No. 2007-0212538 and U.S. patent application Ser. No. 11/808,760, in suitable embodiments, the nanowires can form an interconnected nanowire network, comprising a plurality of nanowire structures, wherein carbon-based structures, in the form of nanographitic plates, attached to the various nanowire cores connect the nanowire structures.

The structure of densely packed nanowires, with or without interconnecting nanographitic plates, is also referred to throughout as a "bird's nest" structure. This arrangement takes the form of a porous structure, wherein the size of pores between the nanowires and nanographitic plates are suitably mesopores and macropores. As used herein the term "mesopores" refers to pores that are larger than micropores (micropores are defined as less than about 2 nm in diameter), but smaller than macropores (macropores are defined as greater than about 50 nm in diameter), and therefore have a pore size in the range of greater than about 30 nm to less than about 200 nm in diameter. Suitably, interconnected nanowire network 300 will be substantially free of micropores, that is, less than about 0.1% of the pores will be micropores (i.e., less than about 2 nm in diameter).

Electrochemical Catalysts

In one embodiment, the present invention provides electrochemical catalyst nanoparticles (also called nanoparticles, catalyst nanoparticles, and catalysts throughout). Suitably, the electrochemical catalyst nanoparticles comprise one or more metals. Using the methods described herein, the electrochemical catalyst nanoparticles produced have an atomic ratio of oxygen in the nanoparticle, to one of the metals in the nanoparticle in the range of about 2 to about 6. As used herein "atomic ratio" is the ratio of the number of atoms of one element to another. For example, the atomic ratio of oxygen in the nanoparticles to one of the metals in the nanoparticles means the ratio of the number of atoms of oxygen in the nanoparticles to the number of atoms of one of the metals in the nanoparticles. Suitably, the ratio is measured as the number of atoms of oxygen in the nanoparticles to the main constituent metal of the nanoparticles.

Suitably, the atomic ratio of oxygen in the nanoparticle to one or more of the metals in the nanoparticle is in the range of about 2.5 to about 6, for example, about 3 to about 6, about 3.1 to about 6, about 3.2 to about 6, about 3.3 to about 6, about 3.4 to about 6, about 3.5 to about 6, about 3.6 to about 6, about 3.7 to about 6, about 3.8 to about 6, about 3.9 to about 6, about 4 to about 6, about 4.1 to about 6, about 4.2 to about 6, about 4.3 to about 6, about 4.4 to about 6, about 4.5 to about 6, about 4.6 to about 6, about 4.7 to about 6, about 4.8 to about 6, about 4.9 to about 6, about 5 to about 6, about 5.1 to about 6, about 5.2 to about 6, about 5.3 to about 6, about 5.4 to about 6, about 5.5 to about 6, about 5.6 to about 6, about 5.7 to about 6, about 5.8 to about 6, or about 5.9 to about 6. As used herein, the term "about" when referring to a numerical value includes ±10% of that value. For example "about 5" includes the range of 4.5 to 5.5. In further embodiments, the atomic ratio of oxygen in the nanoparticle to one or more of the metals in the nanoparticle is in the range of about 3 to about 5, for example about 3.1 to about 5, about 3.2 to about 5, about 3.3 to about 5, about 3.4 to about 5, about 3.5 to about 5, about 3.6 to about 5, about 3.7 to about 5, about 3.8 to about 5, about 3.9 to about 5, about 4.0 to about 5, about 4.1 to about 5, about 4.2 to about 5, about 4.3 to about 5, about 4.4 to about 5, about 4.5 to about 5, about 4.6 to about 5, about 4.7 to about 5, about 4.8 to about 5, about 4.9 to about 5, or in the range of about 3 to about 4, for example, about 3.1 to about 4, about 3.2 to about 4, about 3.3 to about 4, about 3.4 to about 4, about 3.5 to about 4, about 3.6 to about 4, about 3.7 to about 4, about 3.8 to about 4, about 3.9 to about 4, or about 3.6.

Suitably, at least one metal of the electrochemical catalyst nanoparticles is selected from the group comprising one or more of Pt, Au, Pd, Ru, Re, Rh, Os, Ir, Fe, Co, Ni, Cu, Ag, V, Cr, Mo, W and alloys or mixtures thereof. For example, the electrochemical catalyst nanoparticles suitably comprise mixtures of Pt and Ru, and are suitably Pt:Ru nanoparticles.

As used herein, a "nanoparticle" refers to a particle, crystal, sphere, or other shaped structure having at least one region or characteristic dimension with a dimension of less than about 500 nm, suitably less than about 200 nm, less than about 100 nm, less than about 50 nm, less than about 20 nm, or less than about 10 nm. Suitably, all of the dimensions of the electrochemical catalyst nanoparticles of the present invention are less than about 50 nm, and suitably have a size of about 1 nm to about 30 nm, or about 1 nm to about 20 nm, about 1 nm to about 10 nm, about 1 nm to about 9 nm, about 1 nm to about 8 nm, about 1 nm to about 7 nm, about 1 nm to about 6 nm, about 1 nm to about 5 nm, about 1 nm to about 4 nm, about 1 nm to about 3 nm, or about 1 nm to about 2 nm, for example, about 1 nm, about 2 nm, about 3 nm, about 4 nm, about 5 nm, about 6 nm, about 7 nm, about 8 nm, about 9 nm, or about 10 nm.

Suitably, the electrochemical catalyst nanoparticles of the present invention comprise Pt:Ru, wherein the atomic ratio of oxygen to Ru is in the range of about 3 to about 6, suitably, about 3.6 to about 6, about 3.6 to about 5, about 3.6 to about 4, or about 3.6.

The electrochemical catalyst nanoparticles of the present invention in which the atomic ratio of oxygen to one or more metals of the electrochemical catalyst nanoparticles (e.g., Ru) is greater than about 3.0 (e.g., about 3.6 to about 6) show higher catalytic activity when utilized as electrodes (including anodes), including when utilized as part of a membrane electrode assembly (MEA) of a fuel cell, such as a methanol fuel cell.

Physical characterization performed on the electrochemical catalyst nanoparticles of the present invention (including x-ray diffraction and x-ray photoelectric spectroscopy) indicate that the nanoparticles comprise an atomic ratio of oxygen of greater than about 3, suitably greater than about 3.6, as compared to a metal of the nanoparticles (e.g., Ru).

In suitable embodiments, the electrochemical catalyst nanoparticles comprise ruthenium (Ru) as an oxide or hydroxide. Suitably, the percentage of metallic ruthenium in the nanoparticles is less than about 40% (with the remaining amount of ruthenium present as ruthenium oxide ($RuO_x$, where x ranges from 0 to 2); or ruthenium hydroxide ($Ru(OH)_x$, where x ranges from 0 to 3). As used herein, "metallic ruthenium" refers to ruthenium that is not in the form of an oxide or a hydroxide, but rather, is present in its reduced metallic form. Suitably, the percentage of metallic ruthenium in the electrochemical catalyst nanoparticles of the present invention is less than about 30% metallic ruthenium, less than about 25%, less than about 20%, less than about 15%, less than about 10%, for example, less than, or about, 9%, less than, or about, 8%, less than, or about, 7%, less than, or about, 6%, less than, or about, 5%, less than, or about, 4%, less than, or about, 3%, less than, or about, 2%, less than, or about, 1%, or 0% metallic ruthenium.

Suitably, the electrochemical catalyst nanoparticles comprise Pt:Ru, in which the percentage of metallic ruthenium is less than about 30%. In suitable embodiments in which Pt:Ru catalyst nanoparticles are utilized, the percentage of metallic platinum in the nanoparticles is about 60% to about 90%, suitably about 70% to about 90%, or about 80% to about 90%, for example, less than, or about, 87%.

In exemplary embodiments, the present invention provides Pt:Ru electrochemical catalyst nanoparticles, wherein the atomic ratio of oxygen to Ru in the nanoparticles is about 3 to about 6. In suitable nanoparticles, the percentage of metallic ruthenium in the nanoparticles is less than about 30%, and the percentage of metallic platinum in the nanoparticles is about 70% to about 90%. Suitably, the atomic ratio of oxygen to Ru in the Pt:Ru nanoparticles is about 3.6 to about 4, the percentage of metallic ruthenium is less than about 10%, and the percentage of metallic platinum is about 70% to about 90%.

Not wishing to be bound by any theory, it is believed that the presence of oxygen at a ratio of about 3.6 to 6, for example in the form of an oxide, such as ruthenium oxide in Pt:Ru nanoparticles, helps to reduce agglomeration or aggregation between the electrochemical catalyst nanoparticles, thereby helping to maintain the size of the nanoparticles of between about 1 nm to about 10 nm, suitably about 1 nm to about 5 nm, more suitably about 1 nm to about 3 nm. Reducing the amount of agglomeration between the nanoparticles, thereby allowing them to remain as separate nanoparticles with a size of about 1 nm to about 10 nm, leads to a higher mass activity of the nanoparticles when utilized in an anode or cathode, for example, in an MEA and/or a fuel cell (see FIG. 20). In addition, in further embodiments, the nanoparticles comprise nitrogen, for example, in a percentage of about 0.5-5%, suitably about 0.5-2% or about 0.5-1.5% N. While not wishing to be bound by any theory, it is believed that about 0.5-5% nitrogen in the nanoparticles, for example Pt:Ru nanoparticles, helps to generate small sized particles.

Figure 21:
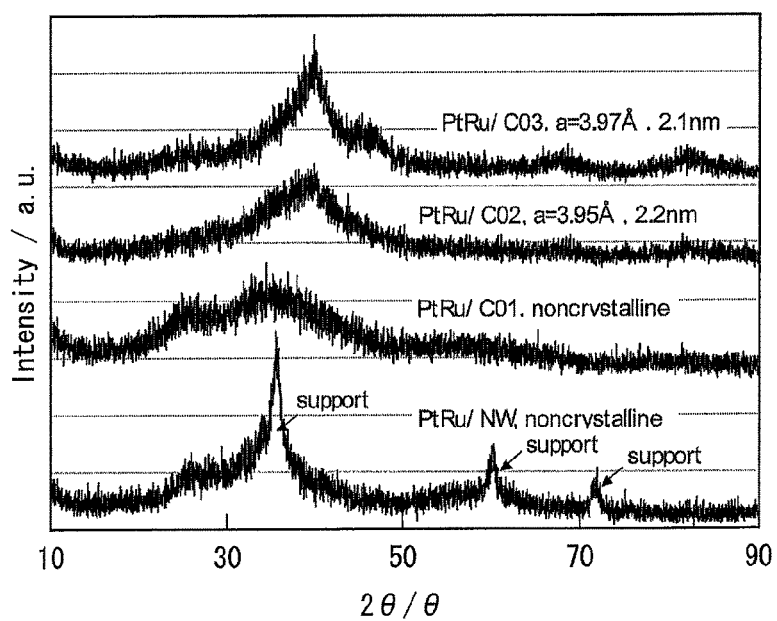
FIG. 21 shows the results of X-ray diffraction of Pt:Ru electrochemical catalyst nanoparticles of the present invention on carbon and nanowire supports.

In further embodiments, the Pt:Ru electrochemical catalyst nanoparticles of the present invention have a lattice parameter of greater than 3.923 Å. As shown in FIG. 21, Pt:Ru nanoparticles on carbon supports ($CO_3$ and $CO_2$) demonstrate a lattice parameter measured using X-ray diffraction of greater than about 3.923 Å. Suitably, the lattice parameter is about 3.923 Å to about 9 Å. As used herein "lattice parameter" refers to the distance between unit cells in a crystal lattice.

In additional embodiments, the Pt:Ru electrochemical catalyst nanoparticles of the present invention have a crystal size of less than 2.2 nm, suitably about 1 nm to about 2.2 nm, about 1.5 nm to about 2.2 nm, or about 1.8 nm to about 2.2 nm. As shown in FIG. 21, exemplary Pt:Ru nanoparticles exhibit a crystal size of about 2.2 nm or about 2.1 nm.

The electrochemical catalyst nanoparticles can be utilized in various membrane electrode assemblies and fuel cells as described herein. In exemplary embodiments, the nanoparticles can be attached or associated with various catalysts supports (also called "supports" herein), for example, a carbon support (e.g., carbon black (e.g., Cabot VULCAN® XC72), fullerene soot, or desulfurized carbon black). As used throughout, carbon black refers to the material produced by the incomplete combustion of petroleum products. Carbon black is a form of amorphous carbon that has an extremely high surface area to volume ratio.

In further embodiments, the present invention provides catalyst supports comprising carbon powders, including cross-linked carbon powder. In still further embodiments, the present invention provides nanowire-supported electrochemical catalysts (also called catalyst-associated nanowires throughout and in U.S. Patent Application Publication No. 2007-0212538 and U.S. patent application Ser. No. 11/808, 760). In other embodiments, the catalyst supports of the present invention can comprise a composite of nanowires and carbon powder (called carbon powder-nanowire composites or nanowire-powder composites herein), including cross-linked carbon powder.

As described herein, the electrochemical catalysts of the present invention comprise nanoparticles comprising one or more metals, wherein the atomic ratio of oxygen in the nanoparticles to one or more of the metals in the nanoparticles is in the range of about 3 to about 6. As described throughout, suitably, the atomic ratio of oxygen to metal is in the range of about 3.6 to about, suitably about 3.6 to about 4, or about 3.6.

As described herein, suitably the nanoparticles that are supported by the various supports of the present invention, including carbon black, carbon powder (including cross-linked carbon powder), nanowires, and nanowire-powder composites, have a size of about 1 nm to about 10 nm, or about 1 nm to about 5 nm, suitably about 1 nm to about 3 nm. In exemplary embodiments, the nanoparticles comprise one or more of Pt, Au, Pd, Ru, Re, Rh, Os, Ir, Fe, Co, Ni, Cu, Ag, V, Cr, Mo, W and alloys or mixtures thereof. In exemplary embodiments, the nanoparticles that are supported by the various supports comprise Pt:Ru, including Pt:Ru nanoparticles where the ratio of oxygen to Ru in the nanoparticles is in the range of about 3.6 to about 6, suitably about 3.6 to about 5, about 3.6 to about 4 or about 3.6, as described throughout.

In addition, the percentage of metallic ruthenium in the nanoparticles (suitably Pt:Ru nanoparticles) is less than about 30%, suitably less than about 20%, less than about 10% or less than about 5%. In embodiments where Pt:Ru electrochemical catalyst nanoparticles are supported on the supports, the percentage of metallic platinum is about 70% to about 95%. Suitably, the Pt:Ru electrochemical catalyst nanoparticles have a lattice parameter of greater than 3.923 Å. In further embodiments, the Pt:Ru electrochemical catalyst nanoparticles of the present invention have a crystal size of less than 2.2 nm.

In exemplary embodiments, the nanowires of the nanowire-supported and carbon powder-nanowire composite-supported electrochemical catalysts comprise $RuO_2$, SiC, GaN, $TiO_2$, $SnO_2$, $WC_x$, $MoC_x$, ZrC, $WN_x$, or $MoN_x$ nanowires, wherein x is a positive integer. Suitably, the nanowires are carbon-comprising nanowires, such as SiC nanowires, including interconnected nanowire networks such as those disclosed in U.S. Patent Application Publication No. 2007-0212538 and U.S. patent application Ser. No. 11/808,760.

In embodiments, the present invention provides nanowire-supported electrochemical catalysts comprising a Pt:Ru nanoparticle, wherein the atomic ratio of oxygen to Ru in the nanoparticle is about 3 to about 6, the percentage of metallic ruthenium is less than about 30%, and the percentage of metallic platinum is about 70% to about 90%. In further embodiments, the nanowire-supported electrochemical catalysts comprise nanoparticles in which the atomic ratio of oxygen to Ru in the nanoparticle is about 3.6 to about 4, the percentage of metallic ruthenium is less than about 10%, and the percentage of metallic platinum is about 70% to about 90%. Suitably, the Pt:Ru electrochemical catalyst nanoparticles have a lattice parameter of greater than 3.923 Å. In further embodiments, the Pt:Ru electrochemical catalyst nanoparticles of the present invention have a crystal size of less than 2.2 nm.

The present invention also provides catalyst supports comprising carbon black and cross-linked carbon powder, wherein the powder has at least one metal catalyst deposited thereon. As described throughout, these catalyst supports can be utilized in a membrane electrode assembly of a fuel cell. The catalyst supports can comprise catalyst materials, including nanoparticles, comprising of Pt, Au, Pd, Ru, Re, Rh, Os, Tr, Fe, Co, Ni, Cu, Ag, V, Cr, Mo, W and alloys or mixtures thereof. Suitably the catalysts are Pt:Ru electrochemical catalyst nanoparticles as described throughout, including those where the atomic ratio of oxygen to Ru in the nanoparticle is in the range of about 3.6 to about 6. Exemplary sizes and additional characteristics of the Pt:Ru electrochemical catalyst nanoparticles are described throughout.

Cross-linked carbon powder supports of the present invention are suitably cross-linked via graphene sheets (and/or nanographitic plates) extending from the carbon powder. The interaction between graphene sheets and carbon powder to form such cross-links is described throughout published U.S. Patent Application No. 2007/0212538. The graphene layers grow out of the plane of the carbon powder, attached via the a-b edges of the graphenes to the carbon powder and to each other. In embodiments, graphene layers can be interconnected as in the structure of graphite. Suitably, nanographitic plates will comprise less than about 100 graphene sheets, and more suitably, between about 2-15 graphenes. While the dimension of nanographitic plates in the a-b plane (i.e., the plane of the graphene layers) can be any size, generally they will be on the order of 10's to 100's of nanometers. Suitably the nanographitic plates will be less than about 100 nm across in the a-b plane. Graphenes and/or nanographitic plates generally extend away from the carbon powder a distance of between about 1 nm and about 500 nm, suitably on the order a few nanometers to 10's of nanometers or even to a few 100 nanometers, and link other particles of carbon powder.

Suitably, the cross-linked carbon powder catalyst supports further comprise a proton conducting polymer, e.g., an ionomer such as Nafion, in contact with the powder. Such catalysts supports can be incorporated in fuel cells, such as DMFCs. Large pores present between the carbon powders can be reduced by the cross-linking graphene layers which block the pores, thereby reducing the amount of precious metal (e.g., Pt and/or Ru) required to prepare the catalysts. In addition, the cross-linked carbon powders provide an improved interface between catalysts layers and the polymer electrolyte membrane of the fuel cell, thereby reducing delamination of the catalyst layers. Ball-milling, grinding, or other mechanical methods can be utilized to control the size of the carbon powder supports by machining the supports after graphitization and cross-linking of the carbon powders.

In further embodiments, the present invention provides catalyst supports (e.g., nanostructured catalyst supports) comprising a composite of a network of inorganic nanowires and carbon powder, wherein the nanowires and/or the powder have at least one metal catalyst deposited thereon. Exemplary nanowires, such as the bird nest structures described herein (e.g, SiC nanowires with graphene sheets), can be utilized in the catalysts supports. Suitable catalysts, such as catalyst nanoparticles comprising Pt:Ru, as described herein, can be utilized. In exemplary embodiments, the carbon powder can be cross-linked via graphene sheets, or can be linked to the nanowires via graphene sheets, as described herein.

The catalyst supports comprising composites of a network of inorganic nanowires and carbon powder (carbon powder-nanowire composites, or nanowire-powder composites) of the present invention demonstrate improved performance in fuel cells, including DMFCs. While not wishing to be bound by any theory, it is believed that the improved performance is based on carbon powder being trapped in the spaces between the nanowire structures, thus reducing or eliminating $CO_2$ and/or water trapping. In addition, the carbon powders improve the interface between the catalyst layers and the polymer electrolyte membrane of a fuel cell, thereby reducing delamination.

The catalyst supports, including nanowire structures, interconnected nanowire networks, carbon powder, carbon black, and carbon powder-nanowire composites, comprising electrochemical catalysts of the present invention (also called "supported electrochemical catalysts" throughout) can be used in various fuel cell applications and configurations. The supported electrochemical catalysts can be used as fuel cell cathodes, for example, a cathode comprising a nanowire, carbon black, carbon powder, interconnected nanowire network, or carbon powder-nanowire composite, and Pt:Ru nanoparticles with a diameter from about 1 nm to about 10 nm, about 1 to 3 nm, or about 3 nm to about 5 nm. The supported electrochemical catalysts can also be used as fuel cell anodes, for example, by using catalytic Pt:Ru nanoparticles on the order of about 1 nm to about 10 nm, or more suitably, from about 1 nm to about 5 nm in diameter. FIG. 19 illustrates nanoparticles of about 1.67 nm. In exemplary anode catalysts, the Pt:Ru nanoparticles will have an atomic ratio of Pt:Ru of about 0.1 to about 20, or more suitably about 0.5 to about 3.

The present invention also provides membrane electrode assemblies comprising the nanowire, carbon black, carbon powder, interconnected nanowire network, or carbon powder-nanowire composite, supported electrochemical catalyst nanoparticles of the present invention. As described throughout, suitably the electrochemical catalyst nanoparticles comprise one or more metals, wherein the atomic ratio of oxygen in the nanoparticle to one or more of the metals in the nanoparticle is about 3 to about 6 (about 3.6 to about 5, about 3.6 to about 4, or about 3.6). Exemplary nanoparticles include Pt:Ru nanoparticles, wherein the ratio of oxygen to Ru is in the range of about 3.6 to about 6, and wherein the percentage of metallic ruthenium is less than about 30%, and the percentage of metallic platinum is about 70% to about 90%. Suitably, the Pt:Ru electrochemical catalyst nanoparticles have a lattice parameter of greater than about 3.923 Å. In further embodiments, the Pt:Ru electrochemical catalyst nanoparticles of the present invention have a crystal size of less than 2.2 nm. The membrane electrode assemblies of the present invention can be utilized as a component in a fuel cell, including methanol fuel cells, formic acid fuel cells, ethanol fuel cells, hydrogen fuel cells or ethylene glycol fuel cells.

The membrane electrode assemblies (MEA) of the present invention suitably comprise the electrochemical catalyst nanoparticles disclosed herein as components of cathode catalysts and/or anode catalysts, and also a membrane (e.g., a NAFION® membrane, DuPont, Wilmington, Del.). Such MEAs can be constructed using well known methods in the art, for example as set forth in U.S. Pat. Nos. 6,933,033; 6,926,985; and 6,875,537, the disclosures of each of which are incorporated herein by reference in their entireties. In exemplary embodiments, the membrane will be disposed on one side with a cathode catalyst and on the other side an anode catalyst. Fuel cells comprising such MEAs, as well as gas diffusion layers (e.g., carbon fiber cloth), bipolar plates and end plates (e.g., machined graphite or molded conducting polymer composites) can also be constructed, as is well known in the art. Exemplary fuel cells that can be constructed using the nanowire, carbon black, carbon powder, interconnected nanowire network, or carbon powder-nanowire composite, supported electrochemical catalyst nanoparticles disclosed herein include proton exchange membrane fuel cells (PEMFC) and direct methanol fuel cells (DMFC). The supported electrochemical catalyst nanoparticles can also be used to generate anodes and cathodes, for example for use in lithium batteries and electrochemical capacitors. The components and construction of such batteries and capacitors is well known in the art.

In one embodiment of the invention, the nanowire portion of the anode (and/or cathode) electrode of the invention may be synthesized on a growth substrate, and then transferred and incorporated into the membrane electrode assembly structure of the fuel cell, such as described in U.S. Patent Application Publication No. 2007-0212538 and U.S. patent application Ser. No. 11/808,760.

Following growth of the nanowires, the nanowires are suitably harvested from their synthesis location. The free standing nanowires can then be introduced into or deposited upon the relevant surface of the fuel cell component such as the gas diffusion layer(s) or proton exchange membrane, for example, by spray/brush painting, solution coating, casting, electrolytic deposition, filtering a fluid suspension of the nanowires, and combinations thereof. Suitably, electrochemical catalyst nanoparticles of the present invention are then introduced. Deposition may simply involve immersing the component of interest (e.g., one or more of the gas diffusion layers or the proton exchange membrane) into a suspension of such nanowires, or may additionally involve pretreating all or portions of the component to functionalize the surface or surface portions for wire attachment. As described in U.S. Patent Application Publication No. 2007-0212538 and U.S. patent application Ser. No. 11/808,760, the nanowires may also be introduced into a solution (e.g., methanol, ethylene glycol or water), filtered (e.g., vacuum filtered over a polyvinylidene fluoride (PVDF) membrane) to give them a dense, intertwined mat or "bird's nest structure," removed from the filter after drying and washing, and then heat treated (e.g., annealed) at high temperatures. The resulting porous sheet of nanowires (whether interconnected with nanographitic plates or not) can then be incorporated into the membrane electrode assembly of the fuel cell. A variety of other deposition methods, e.g., as described in U.S. Patent Application Publication No. 20050066883, published Mar. 31, 2005, and U.S. Pat. No. 6,962,823, the full disclosures of which are incorporated herein by reference in their entirety for all purposes, can also be used. The nanowires may also be grown directly on one or more of the fuel cell components such as one or more of the bipolar plates and/or proton exchange membrane.

Typically, a fuel cell generally comprises an anode electrode, a cathode electrode, and a proton exchange membrane (PEM). The assembly of these three components is generally referred to as a membrane electrode assembly (MEA). As described in U.S. Patent Application Publication No. 2007-0212538 and U.S. patent application Ser. No. 11/808,76, nanowires can be used to replace traditional carbon particles in PEMFCs as the catalyst support and electron conducting medium to make MEAs. Because the generation of surface functional groups on nanostructured catalyst supports and nanowires, e.g., nanowires such as SiC or GaN, is relatively straightforward, catalyst nanoparticles such as Pt and/or Pt:Ru nanoparticles of the present invention (as well as a proton conducting polymer (e.g., NAFION®)), can be facilely deposited on the nanostructured catalyst supports and nanowires, e.g., without agglomeration of the particles. Each catalyst particle is then directly connected to the anode (and cathode) through the nanowire shell. The multiple electrical connectivity of the interconnected nanowires secures the electronic route from Pt to the electron conducting layer.

An exemplary fuel cell comprising nanowire, carbon black, carbon powder, interconnected nanowire network, or carbon powder-nanowire composite, supported electrochemical catalyst nanoparticles of the present invention suitably includes an anode bipolar electrode plate, a cathode bipolar electrode plate, a proton exchange membrane, an anode electrode, a cathode electrode, and nanowire, carbon black, carbon powder, interconnected nanowire network, or carbon powder-nanowire composite, catalyst supports positioned between both the anode electrode and cathode electrode on one side, and the proton exchange membrane on the other side of the fuel cell. Generally, a plurality of fuel cells or MEAs can be combined to form a fuel cell stack. The cells within the stacks are connected in series by virtue of the bipolar plates, such that the voltages of the individual fuel cells are additive.

Suitably, the nanowire, carbon black, carbon powder, interconnected nanowire network, or carbon powder-nanowire composite, catalyst supports and electrochemical catalyst nanoparticles disclosed herein are dispersed in a polymer electrolyte material that disperses on the surface of nanowires, carbon black and/or carbon powder to provide sufficient contact points for proton (e.g., $H^+$) transport. Polymer electrolytes can be made from a variety of polymers including, for example, polyethylene oxide, poly(ethylene succinate), poly(b-propiolactone), and sulfonated fluoropolymers such as NAFION® (commercially available from DuPont Chemicals, Wilmington). A suitable cation exchange membrane is described in U.S. Pat. No. 5,399,184, for example, the disclosure of which is incorporated herein by reference. Alternatively, the proton conductive membrane can be an expanded membrane with a porous microstructure where an ion exchange material impregnates the membrane effectively filling the interior volume of the membrane. U.S. Pat. No. 5,635,041, incorporated herein by reference, describes such a membrane formed from expanded polytetrafluoroethylene (PTFE). The expanded PTFE membrane has a microstructure of nodes interconnected by fibrils. Similar structures are described in U.S. Pat. No. 4,849,311, the disclosure of which is incorporated herein by reference. In additional embodiments, proton shuttle molecules can be attached to the nanowires. For example, short hydrocarbon chains comprising—$SO_3H$ groups (e.g., 2-6 carbons long) can be grafted to the nanowires, as described in U.S. Patent Application Publication No. 2007-0212538 and U.S. patent application Ser. No. 11/808,760. Use of such proton shuttle molecules can reduce the amount of NAFION® or other ionomer required, thereby increasing the available surface area of the catalytic nanoparticles.

The nanowires which form the interconnected nanowire networks may optionally be fused or cross-linked at the points where the various wires contact each other, to create a more stable, robust and potentially rigid membrane electrode assembly. The nanowires may also include surface chemical groups that may form chemical cross-links in order to cross-link the underlying nanowires. For example, the nanowires may be cross-linked or fused together by depositing a small amount of conducting or semiconducting material at their cross-points. For example, SiC nanowires (or, e.g., carbon nanotube nanowires having a SiC shell layer) can be cross-linked by depositing amorphous or polycrystalline SiC at their cross-points.

The nanowire networks disclosed in U.S. Patent Application Publication No. 2007-0212538 and U.S. patent application Ser. No. 11/808,760 are suitably employed as the support for the electrochemical catalyst nanoparticles (e.g., platinum, ruthenium, Pt:Ru) which may be coated or deposited, for example, on the nanowires. See e.g., FIG. 19, showing transmission electron micrograph images of 1.67 nm Pt:Ru (1:1) nanoparticles deposited on the surface of nanographite coated nanowires at two different magnifications. Appropriate catalysts for fuel cells generally depend on the reactants selected. For example, the electrochemical catalyst nanoparticles (also called catalyst metals throughout) may be selected from the group comprising, but not limited to, one or more of platinum (Pt), ruthenium (Ru), iron (Fe), cobalt (Co), gold (Au), chromium (Cr), molybdenum (Mo), tungsten (W), manganese (Mn), technetium (Tc), rhenium (Re), osmium (Os), rhodium (Rh), iridium (Ir), nickel (Ni), palladium (Pd), copper (Cu), silver (Ag), zinc (Zn), tin (Sn), aluminum (Al), and combinations and alloys thereof (such as bimetallic Pt:Ru nanoparticles). Suitable catalyst materials for oxidation of hydrogen or methanol fuels specifically include metals such as, for example, Pd, Pt, Ru, Rh and Pt:Ru.

As described herein, suitably the electrochemical catalyst nanoparticles that are supported by the nanowire, carbon black, carbon powder, interconnected nanowire network, or nanowire-carbon powder composite, comprise oxygen at an atomic ratio to one or more of the metals of the nanoparticles of about 3.6 to about 5, and are about 1 to about 10 nm in size. Suitably, the electrochemical catalyst nanoparticles comprise Pt:Ru, wherein the percentage of metallic ruthenium is less than about 30%, and the percentage of metallic platinum is about 70% to about 90%. Suitably, the Pt:Ru electrochemical catalyst nanoparticles have a lattice parameter of greater than 3.923 Å. In further embodiments, the Pt:Ru electrochemical catalyst nanoparticles of the present invention have a crystal size of less than 2.2 nm.

The electrochemical catalyst nanoparticles may be deposited or otherwise associated with the nanowire, carbon black, carbon powder, interconnected nanowire network, or carbon powder-nanowire composite, catalyst support surface as a thin film (e.g., less than about 10 angstroms in thickness) (or a series of catalyst particles) using a variety of catalyst deposition techniques including, for example, chemical vapor deposition, electrochemical deposition (e.g., electroplating or electroless chemical plating), physical vapor deposition, solution impregnation and precipitation, colloid particle absorption and deposition, atomic layer deposition, and combinations thereof. The amount of the catalyst metal coated by the methods described herein is preferably in the range of about 0.5%-85% by weight, suitably about 10%-85%, about 20%-80%, more suitably about 20-50% by weight, for example about 30%-45% by weight, based on the total amount of catalyst metal and nanowire, carbon black, carbon powder, interconnected nanowire network, or nanowire-carbon powder composite, material.

Alternatively, in one embodiment, the electrochemical catalyst nanoparticles can be deposited on the nanowire, carbon black, carbon powder, interconnected nanowire network, or carbon powder-nanowire composite, catalyst support surface as a plurality of nanometer-sized metallic catalyst particles (e.g., between about 1 and 50 nm in diameter, e.g., less than about 10 nm in diameter, e.g., between about 1 and 5 nm or about 1 and 3 nm in diameter), in solution. By derivatizing the nanowire, carbon black, carbon powder, interconnected nanowire network, or carbon powder-nanowire composite, catalyst support external surface with one or more functional linker moieties (e.g., a chemically reactive group) such as one or more carboxylic acid groups, nitric acid groups, hydroxyl groups, amine groups, sulfonic acid groups, and the like, the nanoparticles are able to more easily bind to the surface of the supports. The electrochemical catalyst nanoparticles (or film) can be attached to the supports either uniformly or non-uniformly. The electrochemical catalyst nanoparticles can be spherical, semi-spherical or non-spherical. The electrochemical catalyst nanoparticles can form islands on the surface of the supports or can form a continuous coating on the surface of the supports such as in a core-shell arrangement, for example as stripes or rings along the length of the nanowire, etc. The electrochemical catalyst nanoparticles can be attached to the nanowire, carbon black, carbon powder, interconnected nanowire network, or carbon powder-nanowire composite, catalyst support surface before or after the support is incorporated/deposited into the MEA of the fuel cell. In one embodiment, the electrochemical catalyst nanoparticles can be selected from a population of catalyst particles having a uniform size distribution of less than about 50%, for example, less than about 30%, for example, less than about 20%.

When a chemical linker molecule is used to bind the electrochemical catalyst nanoparticles to the nanowire, carbon black, carbon powder, interconnected nanowire network, or carbon powder-nanowire composite, the chemical linker can be selected to promote electrical connection between the electrochemical catalyst nanoparticles and the support, or the chemical linker can be subsequently removed to promote electrical connection. For example, heat, vacuum, chemical agents or a combination thereof, can optionally be applied to the supports to cause the linker molecule to be removed to place the catalysts in direct physical contact with the supports to form a solid electrical connection between the catalyst particles and the support. The structure can also be heated to anneal the interface between the catalysts and the supports in order to improve the electrical contact therebetween. Appropriate temperatures and heating conditions are well known to those of skill in the art.

Nanowire-supported electrochemical catalyst nanoparticles of the present invention can be prepared using the various methods disclosed in U.S. Patent Application Publication No. 2007-0212538 and U.S. patent application Ser. No. 11/808,760. Suitably, one or more nanowires are dispersed in a solution. One or more catalyst metals are then added to the solution, and the solution is refluxed, whereby the catalyst metals become associated with the nanowires. Any suitable solution can be used for dispersion of the nanowires and then subsequent refluxing. Exemplary solutions include organic solvents such as ethylene glycol, as well as alcohols and aqueous-based solutions.

As discussed throughout, in exemplary embodiments, the nanowires are derivatized with at least a first functional group which binds the catalyst metal, for example, a nitric acid, a carboxylic acid group, a hydroxyl group, an amine group, and a sulfonic acid group.

Following refluxing the nanowire solution, the nanowire-supported electrochemical nanoparticles (also referred to as catalyst metal-associated nanowires throughout) are filtered to generate a solid nanowire dispersion with associated catalyst metals, and then dried.

Following catalyst deposition, a proton conducting polymer such as NAFION® may optionally be deposited on the nanowire, carbon black, carbon powder, interconnected nanowire network, or carbon powder-nanowire composite, surface between catalyst particle sites, for example, by functionalizing the surface of the support with a second functional group (different from the catalyst functional group, when used) that preferentially binds the electrolyte or which promotes consistent and/or controlled wetting. The polymer can either be a continuous or discontinuous film on the surface of the nanowire. For example, the polymer electrolyte can be uniformly wetted on the surface of the wires, or can form point-contacts along the length of the wire. The nanowire, carbon black, carbon powder, interconnected nanowire network, or carbon powder-nanowire composite, may be functionalized with a sulfonated hydrocarbon molecule, a fluorocarbon molecule, a short chain polymer of both types of molecules, or a branched hydrocarbon chain which may be attached to the support surface via silane chemistry. Those of skill in the art will be familiar with numerous functionalizations and functionalization techniques which are optionally used herein (e.g., similar to those used in construction of separation columns, bio-assays, etc.). Alternatively, instead of binding ionomer to the supports through a chemical binding moiety, the supports may be directly functionalized to make them proton conductive. For example, the supports may be functionalized with a surface coating such as a perfluorinated sulfonated hydrocarbon using well-known functionalization chemistries.

For example, details regarding relevant moiety and other chemistries, as well as methods for construction/use of such, can be found, e.g., in Hermanson Bioconjugate Techniques Academic Press (1996), Kirk-Othmer Concise Encyclopedia of Chemical Technology (1999) Fourth Edition by Grayson et al. (ed.) John Wiley & Sons, Inc., New York and in Kirk-Othmer Encyclopedia of Chemical Technology Fourth Edition (1998 and 2000) by Grayson et al. (ed.) Wiley Interscience (print edition)/John Wiley & Sons, Inc. (e-format). Further relevant information can be found in CRC Handbook of Chemistry and Physics (2003) 83rd edition by CRC Press. Details on conductive and other coatings, which can also be incorporated onto the nanowire surface by plasma methods and the like can be found in H. S. Nalwa (ed.), Handbook of Organic Conductive Molecules and Polymers, John Wiley & Sons 1997. See also, "ORGANIC SPECIES THAT FACILITATE CHARGE TRANSFER TO/FROM NANOCRYSTALS," U.S. Pat. No. 6,949,206. Details regarding organic chemistry, relevant for, e.g., coupling of additional moieties to a functionalized surface can be found, e.g., in Greene (1981) Protective Groups in Organic Synthesis, John Wiley and Sons, New York, as well as in Schmidt (1996) Organic Chemistry Mosby, St Louis, Mo., and March's Advanced Organic Chemistry Reactions, Mechanisms and Structure, Fifth Edition (2000) Smith and March, Wiley Interscience New York ISBN 0-471-58589-0, and U.S. Patent Publication No. 20050181195, published Aug. 18, 2005. Those of skill in the art will be familiar with many other related references and techniques amenable for functionalization of surfaces herein.

By increasing the density of sulfonic groups on the ionomer utilized in the MEAs and varying the ionomer side chains, the characteristics, including surface groups and equilibrant weight of the ionomer (e.g., Nafion) can be matched to the supported electrochemical catalysts. This allows for an increase in the ratio of catalyst in contact with the electrolyte ionomer. For example, a Nafion ionomer having a equilibrant weight (EW) of 1000, or a shorter side chain ionomer (e.g., Hyflon) with a lower EW (e.g., 850), can be utilized with the supported electrochemical catalysts in direct methanol fuel cells. With the nanowires, supported electrochemical catalysts align on the nanowire supports, thereby exposing the catalysts to large pores in the nanowire structure, thus allowing for the tailored ionomers to efficiently contact the catalysts increasing the ratio of catalysts in contact with ionomer. As used herein "tailored ionomer" refers to an ionomer that is matched to the characteristics of the nanowire, carbon black, carbon powder, interconnected nanowire network, or carbon powder-nanowire composite, support of the present invention such that a greater amount of ionomer is able to reach the catalysts than if the ionomer is not appropriately matched. Suitably, the ionomer has a equilibrant weight of 1000 or 850.

The polymer electrolyte coating may be directly linked to the surface of the nanowire, carbon black, carbon powder, interconnected nanowire network, or carbon powder-nanowire composite, e.g., through silane groups, or may be coupled via linker binding groups or other appropriate chemical reactive groups to participate in linkage chemistries (derivitization) with linking agents such as, e.g., substituted silanes, diacetylenes, acrylates, acrylamides, vinyl, styryls, silicon oxide, boron oxide, phosphorus oxide, N-(3-aminopropyl)-3-mercapto-benzamide, 3-aminopropyl-trimethoxysilane, 3-mercaptopropyl-trimethoxysilane, 3-maleimidopropyl-trimethoxysilane, 3-hydrazidopropyl-trimethoxysilane, trichloro-perfluoro octyl silane, hydroxysuccinimides, maleimides, haloacetyls, hydrazines, ethyldiethylamino propyl-carbodiimide, and/or the like. Other surface functional chemistries can be used such as those that would be known to one or ordinary skill in the art.

In addition, a solubilized perfluorosulfonate ionomer (e.g., NAFION®) may be placed into the space between nanowires, carbon powder, or in the composites. The structure (e.g., as a porous sheet of interconnected nanowires, carbon powder, or nanowires and carbon powder), when not produced in situ on one of the bipolar plates and/or proton exchange membrane, may then be placed between bipolar plates on either side of a proton exchange membrane, and the assembly hot pressed to form a complete membrane-electrode assembly fuel cell according to the present invention. The pressing temperature is determined such that the proton exchange membrane is softened in that temperature range, for example, to 125° Celsius for NAFION®. The pressure level is about 200 kgf/cm$^2$.

In order to efficiently distribute fuel/oxygen to the surface of the anode/cathode electrodes a gas diffusion layer is typically needed in conventional fuel cells between the anode electrode and bipolar plate on one side, and the cathode electrode and bipolar plate on the other side of the fuel cell. Typically, a carbon fiber cloth is used as the gas diffusion layer. With the interconnecting nanowire composite membrane electrode catalyst support assembly of the present invention, this gas diffusion layer can be eliminated due to the superior structure of the nanowire-based electrodes.

Figure 22:
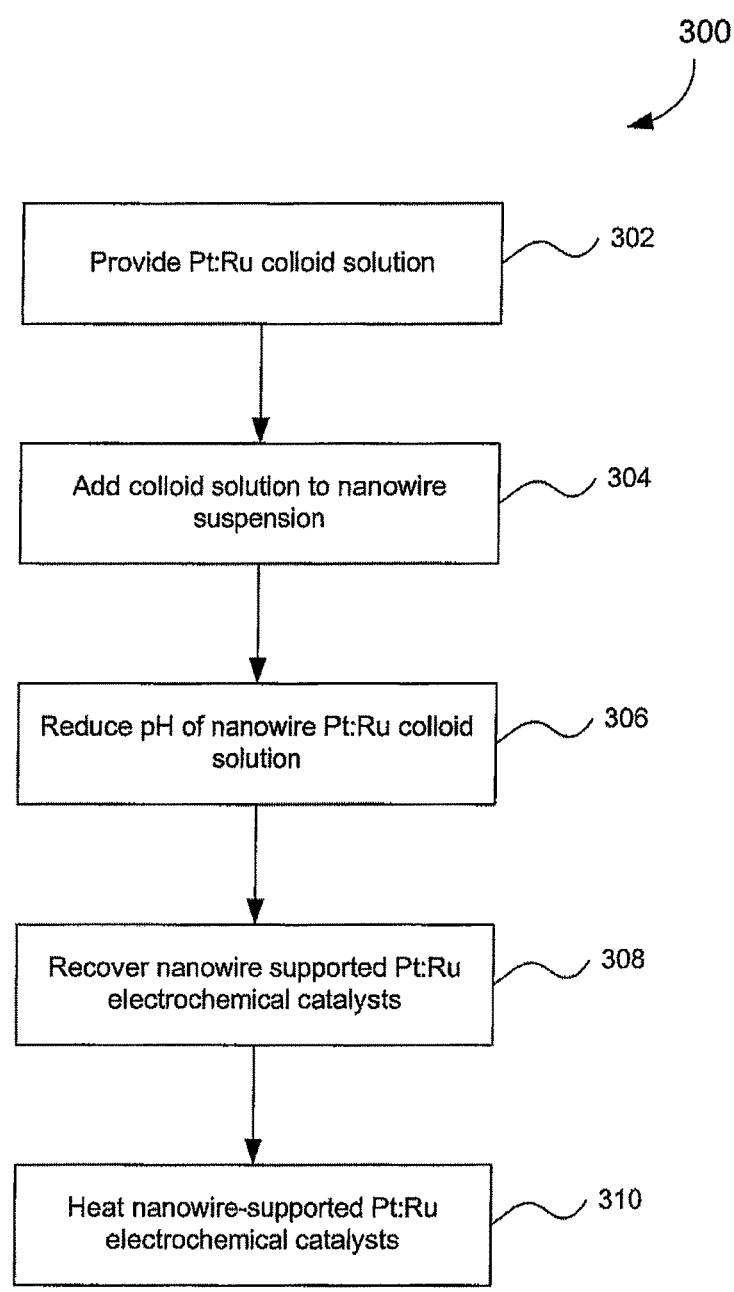
FIG. 22 shows a method of forming nanowire-supported electrochemical catalysts in accordance with one embodiment of the present invention.

In further embodiments, as shown in flowchart 300 of FIG. 22, the present invention provides methods of preparing a nanowire-supported Pt:Ru electrochemical catalyst nanoparticles. As described herein, suitably, the atomic ratio of oxygen to Ru in the nanoparticles is in the range of about 3 to about 6, the percentage of metallic ruthenium is less than about 30%, and the percentage of metallic platinum is about 70% to about 95%.

In exemplary embodiments, as shown in flowchart 300, a Pt:Ru colloid solution is provided in 302. In suitable embodiments, the Pt:Ru colloid solution is prepared by combining $RuCl_3 xH_2O$, ethylene glycol, $H_2PtCl_6 xH_2O$ and NaOH. Suitably, the amount of $RCl_3 xH_2O$ is about 100 mg to about 500 mg, or about 200 mg to about 300 mg, or about 250 mg. The amount of $H_2PtCl_6 xH_2O$ that is used is suitably about 300 mg to about 700 mg, or about 400 mg to about 600 mg, or about 500 mg. Suitably, 0.5M NaOH is used at an amount of about 20 mL to about 80 mL, or about 30 mL to about 60 mL, or about 50 mL. It should be understood that the amounts and concentrations of these agents is provided only for illustrative purposes and the ordinarily skilled artisan will readily understand that the amounts and concentrations can be varied accordingly to produce larger or smaller size samples, and also, can be modified without ultimately changing the final resulting product. Appropriate mixing methods and materials are well known in the art.

In 304 of flowchart 300, the Pt:Ru colloid solution is then added to a suspension of nanowires to prepare a nanowire-Pt:Ru colloid solution. In exemplary embodiments, the nanowires are carbon comprising nanowires, such as those described herein and in U.S. Patent Application Publication No. 2007-0212538 and U.S. patent application Ser. No. 11/808,760. Suitably, the nanowires are suspended in ethylene glycol, though other aqueous (or non-aqueous) solutions can also be used, e.g., water, ethanol, etc. The amounts of the colloid solution and the nanowire suspension can be readily adjusted by those of ordinary skill in the art to produce larger or smaller samples, and also, to produce higher or lower concentrations of catalysts on the nanowires.

In 306 of flowchart 300 of FIG. 22, the pH of the nanowire-Pt:Ru colloid solution is then reduced. Suitably, the pH is reduced from its initial level to about 12-10, suitably about 11, then to about 6-9, suitably about 7, then to about 3-5, suitably about 4, and then finally, to about 1-2, suitably about 1. In embodiments, this pH reduction is performed over the course of about 10-24 hours, for example, about 12-24 hours, or about 18 hours. It should be understood that additional pH levels between these values can also be used. In suitable embodiments, the pH is reduced to about 11, then dropped to about 7 and maintained at pH 7 for about 12 hours. The pH is then dropped to about 4, and maintained at pH 4 for about 4 hours. Finally, the pH is dropped to about pH 1 and maintained there for about 1 hour prior to recovery of the nanowires. Any suitable acid can be used to reduce the pH of the solution, including nitric acid, HCl, etc.

In 308 of flowchart 300, the nanowire-supported Pt:Ru electrochemical catalysts are then recovered from the solution. In exemplary embodiments, this recovery comprises filtering the solution and then washing the nanowires (e.g., in deionized water) to remove contaminants and other debris.

In suitable embodiments, the methods further comprise step 310 of flowchart 300 of heating the nanowire-supported Pt:Ru electrochemical catalysts after the recovery (e.g., after the filtering and washing). For example, the nanowire-supported Pt:Ru catalysts are heated to a temperature of about 150-300° C., for example, about 150-200° C. or about 180° C., for about 3-10 hours, suitably about 5 hours.

A similar method can be utilized to prepare carbon black, carbon powder (including cross-linked carbon powder), or nanowire-carbon powder composites, comprising the electrochemical nanoparticle catalysts of the present invention.

Membrane Electrode Assemblies and Fuel Cells Comprising Electrochemical Catalyst Nanoparticles As described throughout, present invention also provides membrane electrode assemblies (MEAs) comprising the electrochemical catalyst nanoparticles of the present invention, as well as fuel cells comprising the nanoparticles and MEAs. Exemplary methods of preparing MEAs are disclosed in U.S. Patent Application Publication No. 2007-0212538 and U.S. patent application Ser. No. 11/808,760. In suitable embodiments, an optional gas diffusion layer is provided, such as a, TEFLON® (DuPont) treated surface, for example TEFLON® treated carbon paper or woven cloth (e.g., carbon cloth). Supported electrochemical catalysts are then disposed adjacent the optional gas diffusion layer. Disposing components adjacent one another, includes, layering, applying, spraying, coating, spreading, or any other form of application of the various components.

A membrane layer is then disposed adjacent the supported electrochemical catalyst composition. Suitably, membrane layer comprises a proton conducting polymer, such as NAFION® or other sulfonated polymer. A second composition of supported electrochemical catalysts is then disposed adjacent the membrane layer. In exemplary embodiments, the proton conducing polymer can comprise an interfacial layer, as disclosed in U.S. Provisional Patent Application No. 61/108,301, filed Oct. 24, 2008, entitled "Membrane Electrode Assemblies with Interfacial Layer," the disclosure of which is incorporated by reference herein in its entirety.

In suitable embodiments, nanowire-supported electrochemical catalysts comprise nanowire ink solutions, suitably comprising one or more additional components such as surfactants or polymers (for example, to aid in nanowire dispersion) and/or ionomers, such as NAFION®. Suitably, the concentration of nanowires in the various nanowires solutions are from about 0.01% to about 50% by volume, for example, about 0.1% to about 20% by volume. Suitably, the first and second compositions of catalyst metal-associated nanowires are nanowire solutions which also further comprise one or more ionomers, such as NAFION®.

Exemplary nanowire-supported electrochemical catalyst nanoparticles for use in preparing the MEAs and fuel cells of the present invention include those described throughout. In additional embodiments, the carbon black, carbon powder, or carbon powder-nanowire composite, supports of the present invention can be utilized to prepare MEAs and fuel cells. Nanoparticles wherein the atomic ratio of oxygen in the nanoparticles to metal in the nanoparticles is in the range of about 3.6 to about 5, as described herein, are suitably used in the MEAs and fuel cells. Suitably, the supported electrochemical catalyst nanoparticles are used to prepare anodes and cathodes of the MEAs and fuel cells.

Additional methods of forming MEAs and fuel cells comprising the electrochemical catalyst nanoparticles, and suitably the nanowire, carbon black, carbon powder, interconnected nanowire network, or carbon powder-nanowire composite, supported electrochemical catalyst nanoparticles, are found throughout U.S. Patent Application Publication No. 2007-0212538 and U.S. patent application Ser. No. 11/808, 760. Methods for disposing the various layers of MEAs include layering, brushing, etc., and in suitable embodiments, spraying the various layers. Spraying a solution of nanowire, carbon black, carbon powder, interconnected nanowire network, or carbon powder-nanowire composite, supported electrochemical catalyst nanoparticles (e.g., nanowires in an aqueous or alcohol-based solution) allows for the control of the thickness and density of the layer. In addition, one or more ionomers can be provided in the solution to be sprayed, thereby allowing for spraying of a solution of supported electrochemical catalyst nanoparticles and one or more ionomers. Exemplary ionomers are described throughout and include sulphonated polymers (e.g., NAFION®) and the like.

Membrane electrode assemblies prepared by the methods of the present invention can be utilized in preparation of various fuel cell electrodes, for example, in fuel cell electrode stacks. Exemplary fuel cells include oxidative fuel cells, such as methanol fuel cells, formic acid fuel cells, ethanol fuel cells, hydrogen fuel cells, ethylene glycol fuel cells and other fuel cells known those of ordinary skill in the art.

For example, the present invention also provides fuel cell membrane electrode assemblies. For example, as disclosed in U.S. Patent Application Publication No. 2007-0212538 and U.S. patent application Ser. No. 11/808,760, suitable MEAs can comprise an optional gas diffusion layer comprising one or more nanowires. The MEAs also further comprise a first composition of supported electrochemical catalyst nanoparticles of the present invention and ionomer adjacent the gas diffusion layer. Exemplary MEAs also comprise a proton-conducing membrane layer (suitably comprising a interfacial layer) adjacent the first supported electrochemical catalyst nanoparticles, and a second composition of supported electrochemical catalyst nanoparticles and ionomer adjacent the proton-conducting membrane layer. In further embodiments, the MEAs can further comprise an optional additional gas diffusion layer adjacent the second composition of supported catalyst.

As described throughout, exemplary nanowires for use in the MEAs are nanowires wherein each nanowire in the network of nanowires is contacted by at least one other nanowire in the nanowire network and is electrically connected to one or more other nanowires in the nanowire network. For example, at least one of the nanowires in the network has a branched structure. Exemplary nanowires for use in the practice of the present invention are selected from the group comprising $RuO_2$, SiC, GaN, $TiO_2$, $SnO_2$, $WC_x$, $MoC_x$, ZrC, $WN_x$, and $MoN_x$ nanowires (as noted herein, x represents a positive integer (e.g., a whole integer)). Suitably, the MEAs are components in a oxidative fuel cells, such as methanol fuel cells, formic acid fuel cells, ethanol fuel cells, hydrogen fuel cells or ethylene glycol fuel cells.

Any number of MEA layers up to an nth, or final desired MEA layer, can be prepared in the fuel cell electrode stacks of the present invention. Suitably, the ends of a fuel cell electrode stack comprise end plates and bipolar plates. Typically, bipolar plates and end plates are highly electrically conductive and can be made from graphite, metals, conductive polymers, and alloys and composites thereof. Materials such as stainless steel, aluminum alloys, carbon and composites, with or without coatings, are good viable options for bipolar end plates in fuel cells. Bipolar plates and end plates can also be formed from composite materials comprising highly-conductive or semiconducting nanowires incorporated in the composite structure (e.g., metal, conductive polymer etc.). While bipolar plates suitably comprise channels and/or groves on both surfaces, end plates typically only comprise channels and/or groves on the surface that is contact with the fuel cell components (i.e., the internal surface), while the external surface does not comprise such channels or groves. Suitably, the various fuel cell components are repeatedly disposed/layered/stacked until the final, desired fuel cell stack is achieved.

The final fuel cell stack can then be clamped together, and fuel impregnated with a suitable electrolyte, for example, an ethylene glycol solution, methanol, formic acid, formaldehyde or small alcohols. Addition of further components as disclosed throughout and known in the art can then be added to yield a working fuel cell.

As the electrochemical catalyst nanoparticles and nanowire, carbon black, carbon powder, interconnected nanowire network, or carbon powder-nanowire composite, supported electrochemical catalyst nanoparticles of the present invention provide for increased catalytic activity relative to other catalysts without the disclosed characteristics, the amount of catalyst particles that are required for a particular application can be reduced, thereby allowing for a reduced material cost and thus reduced cost for fuel cell production. In addition, utilizing less catalyst in the electrodes allows for the production of thinner electrodes, and thus reduced resistance of the electrodes.

It will be readily apparent to one of ordinary skill in the relevant arts that other suitable modifications and adaptations to the methods and applications described herein can be made without departing from the scope of the invention or any embodiment thereof. Having now described the present invention in detail, the same will be more clearly understood by reference to the following examples, which are included herewith for purposes of illustration only and are not intended to be limiting of the invention.

Examples

Example 3

Preparation of Electrochemical Catalyst Nanoparticles and Nanowire-Supported Electrochemical Catalyst Nanoparticles Materials:
$RuCl_3.xH_2O$ (Aldrich), $H_2PtCl_6.xH_2O$ (Aldrich), Anhydrous ethylene glycol (Aldrich) and 0.5 M NaOH ethylene glycol solution.

Preparation:
250 mg $RuCl_3.xH_2O$ was added to a 150 mL three-neck flask. 30 mL of ethylene glycol was added and stirred with a magnetic stirring bar until a clear solution was formed (approximately a few hours). 500 mg of $H_2PtCl_6.xH_2O$ and an additional 200 mL of ethylene glycol were then added. 50 mL of 0.5 M NaOH solution was added, and the solution was purged with Ar gas. The solution was then heated in an oil bath at about 165° C. for about 3 hours to produce a Pt:Ru colloid solution.

100 mg of carburized nanowires suspended in 10 mL of ethylene glycol were dispersed via sonication. The dispersion was transferred to a 250 mL beaker.

15 mL of the Pt:Ru colloid solution was then added to the nanowires, and nitric acid of proper concentration was added drop-wise until the pH of the solution reached pH 11. Additional nitric oxide (10 mL of 0.0000065% nitric acid, 10 mL of 0.0002% nitric acid, 10 mL of 0.01% nitric acid and 0.2% nitric acid as required) was added drop-wise until the solution reached pH 7. The solution was then stirred for 12 hours. Additional nitric oxide (0.2% nitric acid) was then added drop-wise until the solution reached pH 4. The solution was stirred for an additional four hours, and then additional nitric acid (6% nitric acid) was added drop-wise until the solution reached pH 1. The solution was stirred for one additional hour, and then the solution was filtered. Use of the specified nitric acid concentrations allow for the rate of drop of the pH to be controlled.

The filtered nanowire-supported electrochemical catalyst nanoparticles were then washed three times in deionized water, suspended in deionized water, filtered, and then washed again. The nanowire-supported electrochemical catalyst nanoparticles were dried at 120° C. overnight under vacuum, and then heated at 180° C. in air for 5 hours.

Several lots of nanowire-supported Pt:Ru electrochemical catalyst nanoparticles were prepared using the above method and characterized by x-ray diffraction and x-ray photoelectron spectroscopy to determine the surface characteristics of the catalysts, specifically, the atomic ratio of oxygen to ruthenium. The nanowire-supported Pt:Ru electrochemical catalyst nanoparticles were then prepared into electrodes and the mass activity of the different lots were measured.

Figure 20:
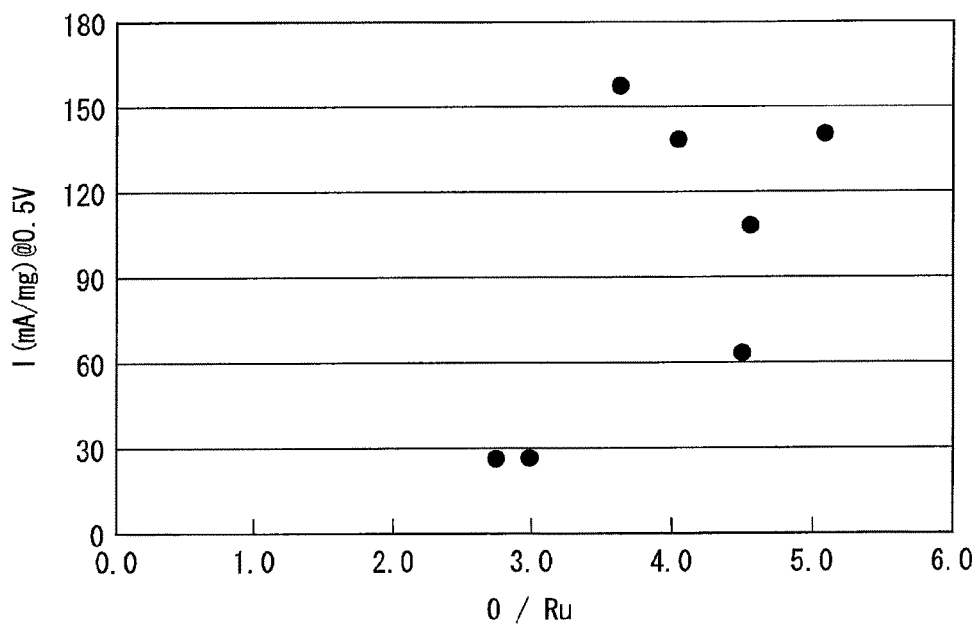
FIG. 20 shows a plot of the current (mg/mA) for Pt:Ru electrochemical catalyst nanoparticles a function of atomic ratio of oxygen to Ru.

The results of these tests are shown in FIG. 20, showing the mass activity (mA/mg) at 0.5V, versus the measured ratio of oxygen to Ru for the different lots. As can be seen in FIG. 20, for nanoparticles in which the atomic ratio of oxygen to Ru is greater than about 3, for example, greater than about 3.6, there is a dramatic increase in the mass activity of the nanoparticles, ranging from about 2-5 times the activity of nanoparticles that have an atomic ratio of oxygen to Ru of less than about 3.

Characteristics of several lots of Pt:Ru electrochemical catalyst nanoparticles supported by an interconnected nanowire network are shown in Table 1 below, as well as commercially available Pt:Ru catalysts on a carbon support.

TABLE 1

| Characteristc | Nanowire-supported Pt: Ru Catalysts Lot No: | | | | | | Commercially available Pt: Ru catalysts on carbon |
|---|---|---|---|---|---|---|---|
| | 127 | 127D | 65 | 103D2 | 181-1 | 181-1D | |
| O/Ru | 4.6 | 5.1 | 3.6 | 4.1 | 2.8 | 4.5 | 3 |
| Ru metal (%) | 0 | 0 | 2 | 0 | 9 | <1 | 30 |
| Pt metal (%) | 92 | 71 | 87 | 77 | 98 | 92 | 94 |
| N (%) | 1.3 | 0.8 | 1.2 | 1 | — | — | — |
| Current at 0.5 V | 110 | 141 | 156 | 142 | 27 | 63 | 27 |

Figure 23:
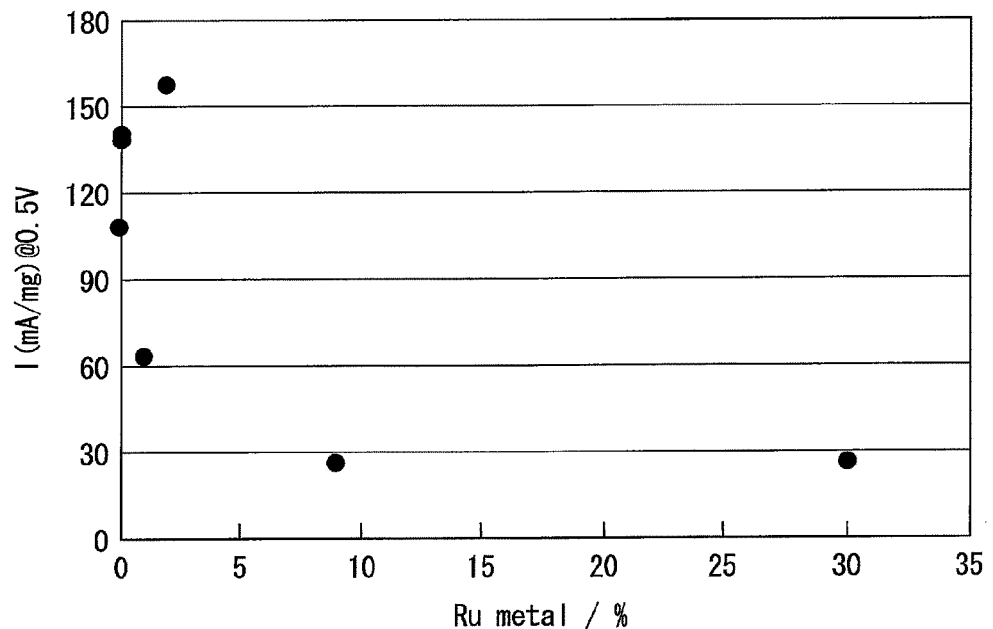
FIG. 23 shows the current at 0.5V for electrochemical catalysts, represented as a percentage of Ru metal.
Figure 24:
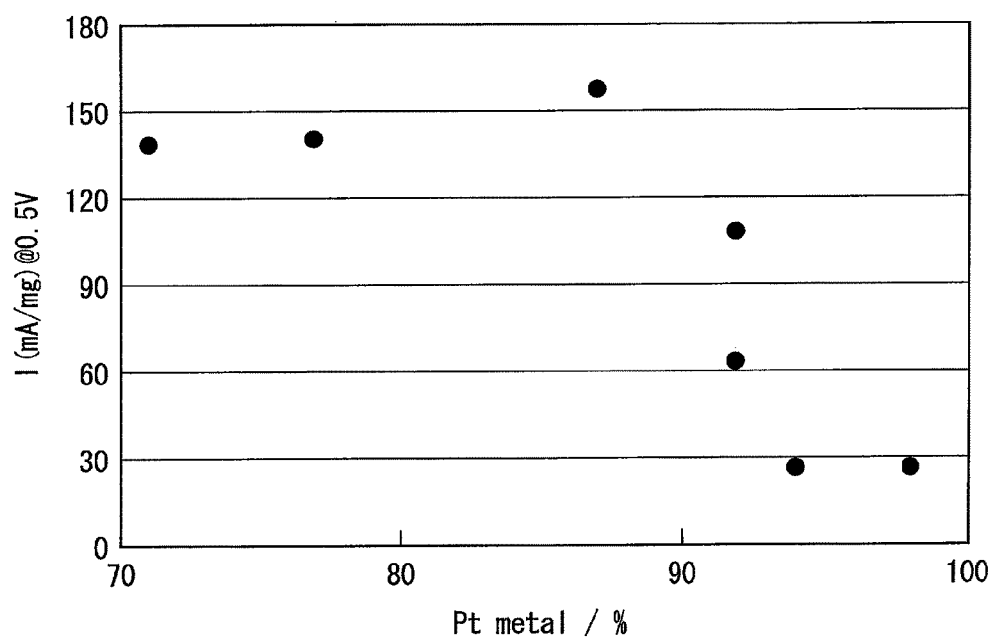
FIG. 24 shows the current at 0.5V for electrochemical catalysts, represented as a percentage of Pt metal FIG. 24.

FIGS. 23 and 24 show the current at 0.5V for the catalysts in Table 1, represented as a percentage of Ru metal (FIG. 23) and Pt metal (FIG. 24).

Example 4

Preparation of Mea with Matching Ionomer

The supported electrochemical catalysts (e.g., Pt:Ru/nanowire catalysts) of the present invention provide distinct advantages over commercially available carbon-supported catalysts (e.g., Pt:Ru/Carbon black or carbon paper), including the absence of primary pores (e.g., no pores less than 20 nm), as well as dimensional matching between the porous structure of the nanowire catalysts and the ionomer utilized, and efficient collection of current from carburized nanowires.

By increasing the density of sulfonic groups on the ionomer and varying the ionomer side chains, the ionomer (e.g., Nafion) is able to be matched to the nanowire-supported electrochemical catalysts, thereby increasing the ratio of catalyst in contact with the electrolyte ionomer. For example, a Nafion ionomer having a equilibrant weight (EW) of 1000, or a shorter side chain ionomer (e.g., Hyflon) with a lower EW (e.g., 850) provides enhanced performance of the nanowire-supported electrochemical catalysts in direct methanol fuel cells. The nanowire-supported electrochemical catalysts align on the nanowire supports, thereby exposing the catalysts to large pores in the nanowire structure, thus allowing for the tailored ionomers to efficiently contact the catalysts increasing the ratio of catalysts in contact with ionomer.

Figure 25:
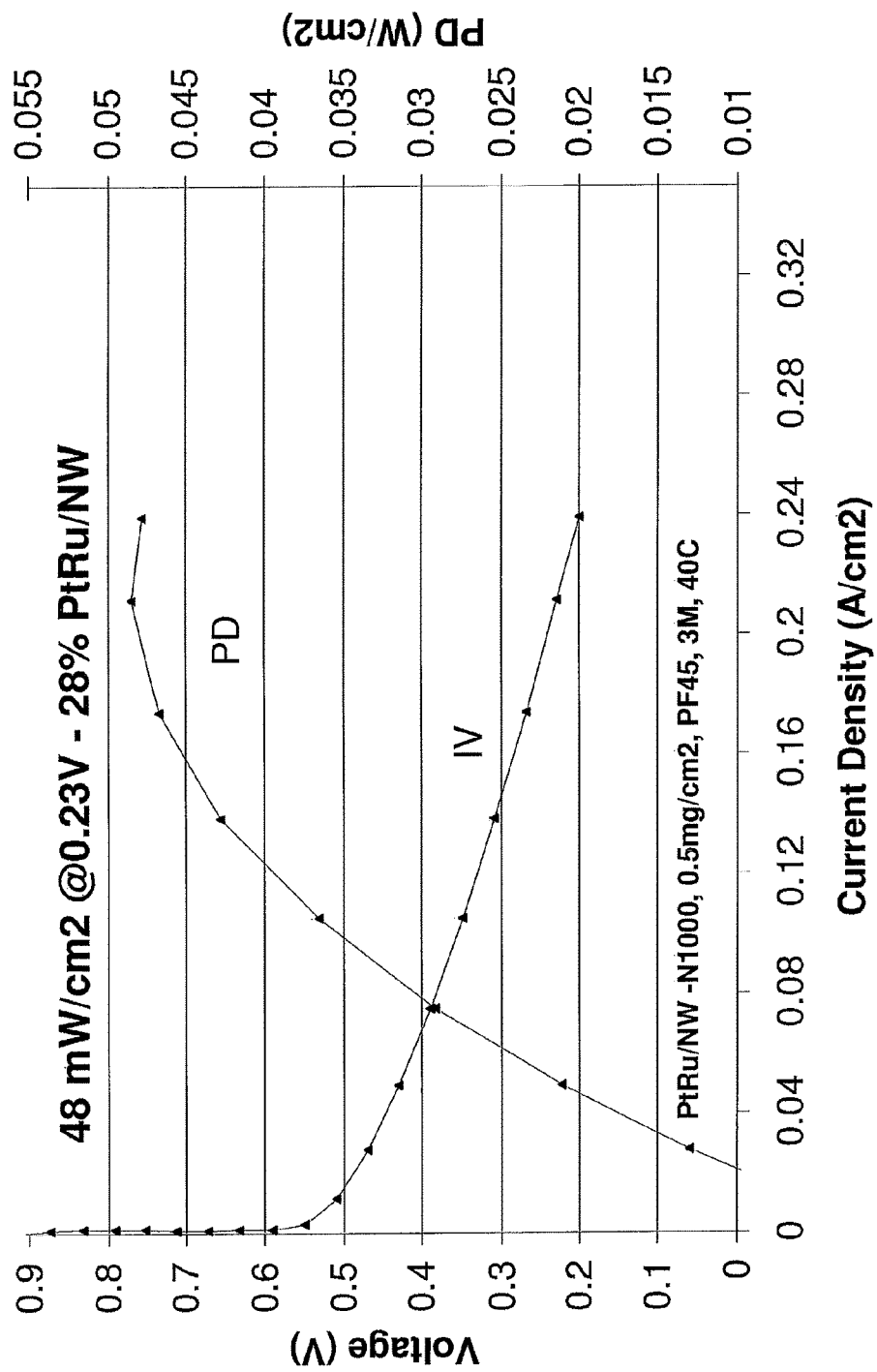
FIG. 25 shows the voltage and power density (PD) of Pt:Ru nanowire-associated catalysts in a fuel cell utilizing a EW1000 Nafion ionomer.

Performance characteristics of a 5 $cm^2$ methanol fuel cell comprising the nanowire-associated electrochemical catalysts of the present invention were determined using various methods. FIG. 25 shows the voltage and power density (PD) of Pt:Ru nanowire-associated catalysts in a fuel cell utilizing a EW1000 Nafion ionomer. The PD at 0.23V was calculated to be 48 $mW/cm^2$ for a catalyst comprising 28% Pt:Ru associated nanowire catalysts.

Figure 26:
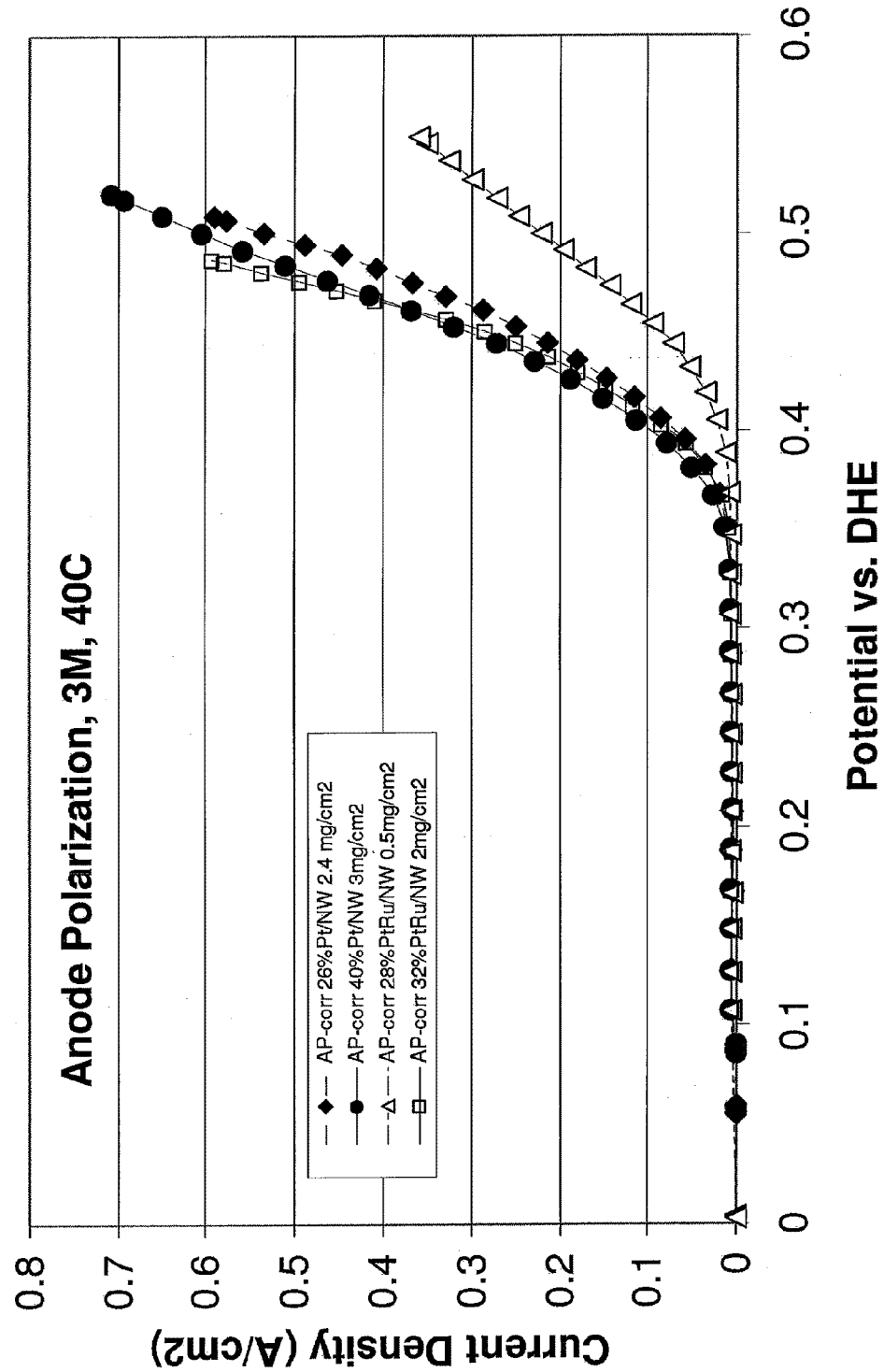
FIG. 26 shows the results of anode polarization representing the current density versus potential vs. DHE for four exemplary nanowire-associated catalysts of the present invention at different percentages of Pt and Pt:Ru catalyst and nanowire density.

FIG. 26 shows the results of anode polarization representing the current density versus potential vs. DHE for four exemplary nanowire-associated catalysts of the present invention at different percentages of Pt and Pt:Ru catalyst and nanowire density.

FIG. 27 compares the Voltage and Power Density as a function of current density for Pt and Pt:Ru nanowire associated catalysts, including the impact of EW1000 Nafion on performance.

FIG. 28 shows the cathode polarization of two different concentrations of Pt-catalyst-associated nanowires of the present invention as compared with a Pt-Carbon-associated catalyst (TKK). A voltage of 0.71V was achieved at a current density of 0.3 $A/cm^2$.

FIG. 29 shows the potential v. DHE versus current density for both Pt:Ru-carbon supported catalysts (TKK and 172-9D) compared with three Pt:Ru-nanowire-supported electrochemical catalysts of the present invention. The two carbon-supported catalysts were utilized with EW1000 Nafion, while the three Pt:Ru-nanowire-supported catalysts compared EW1100, EW1000 and EW850 Nafion. The Pt:Ru nanowire catalysts were prepared at 0.5 $mg/cm^2$, 30% catalysts, and the fuel cell was a methanol fuel cell. The results demonstrated that the greatest performance was observed in Pt:Ru nanowire-supported catalysts with EW1100, followed Pt:Ru nanowire-supported catalysts with EW 1000, Pt:Ru-carbon-supported catalysts with EW1000, and Pt:Ru nanowire-supported catalysts with EW 850. The results are also presented below in Table 2.

FIG. 31 shows pore size distribution, according to the present invention. The catalyst layer in the example exhibited its peak of pore size distribution at a range of 60 nm or more, where the catalyst later in the comparative example exhibited its peak pore size distribution in the range of 60 nm or less.

FIGS. 32A-B shows anode polarization performance, according to the present invention. MEA in the example exhibited higher anode polarization performance than MEA in the comparative example.

FIG. 33 shows anode polarization performance, according to the present invention. MEA in the example exhibited higher anode polarization performance than MEA in the comparative example, due to a result of improved accessibility.

FIGS. 34A-B shows anode polarization and DMFC performance, according to the present invention. MEA in the example exhibited higher anode polarization performance and DMFC performance than MEA in the comparative example.

FIG. 35 shows a durability test, according to the present invention. MEA in the example exhibited lower chronological decrease in cell voltage and longer durability (in a 1000 hours life test, at about 9V/hr loss was observed at 100 $mA/cm^2$; stability was achieved after a200 hr initial operation).

FIG. 36A illustrates core-shell nano wires grown using vapor-liquid-solid (VLS) method with diameter distribution between about 30 nm and 40 nm, and an aspect ratio of about 100:1.

FIG. 36B shows carburized silicon core-shell nano wires bonded with the nano-graphite shell, in which crystallinity and integrity of the nano wire structure is maintained.

FIG. 36C shows final "birds nest" structure formation having high conductivity and stability achieved due to high crystallinity and covalent bonding. The surface area Brunauer-Emmett-Teller (BET) of greater than or equal to about 125 $m^2/g$ was achieved with nano-graphite shell with barbs.

FIGS. 37A-B illustrate catalyst nanoparticles with well-dispersed nanoparticles (TEM image) with particle size, size-distribution and composition having been tuned independently. EDX analysis indicated the ratio of Pt and Ru of 1:1 and PtRu particles controlled from 1 to 3 nm (average 2 nm).

FIGS. 38A-B illustrate catalyst nanoparticle by XRD characterization, and specifically, metallic PtRu particles with particle size 2.7 nm (XRD)>2.1 nm (TEM), and diffraction peak indicates PtRu solid solution with 1:1 composition.

FIGS. 39A-B illustrate nanowire supported PtRu and activity for methanol oxidation. Small PtRu particle size is maintained on nanowire support, having controlled catalyst metal content, typically 30% PtRu on nanowire support, uniform distribution of nanoparticles on nanowire support

TABLE 2

| Current Density (mA/mg) | Anode 27708 w/EW850 (Anode Potential (V)) | Anode 27708 w/EW1000 (Anode Potential (V)) | Anode 27708 w/EW1100 (Anode Potential (V)) | Delta V of EW1000 and EW850 | Delta V of EW1100 and EW850 |
|---|---|---|---|---|---|
| 100 | 0.387 | 0.406 | 0.414 | 0.019 | 0.027 |
| 200 | 0.417 | 0.432 | 0.445 | 0.015 | 0.028 |
| 300 | 0.435 | 0.456 | 0.470 | 0.021 | 0.035 |

FIGS. 30A-C shows SEM pictures comparing agglomerate structures, according to the present invention. For example, the electrode catalyst layer is constituted by a large number of agglomerates, whereas in a comparative example substantially no agglomerates exist.

(TEM), and high mass activity for MOR using the nanowire supported PtRu catalyst at 40° C., 0.5V, PtRu/NW 2.5x>PtRu/C.

FIGS. 40A-C illustrate better-performing MEA with high catalyst utilization; the size distribution of pores in a nanowire supported catalyst layer is optimized for ionomer transport; with average pore size for nanowires being 160 nm, no pore <30 nm; average pore size for carbon black: 36 nm, no pore >50 nm. FIG. 40B shows ionomer uniformly distributed in the catalyst layer with nanowire supported catalysts. In contrast, as shown in FIG. 40C, large ionomer agglomerates were observed in the layer with carbon supported catalysts. These features result in a higher total triple-phase boundary area and hence higher catalyst utilization for the nanowire supported catalysts over the carbon supported catalysts.

A membrane electrode assembly comprising a catalyst layer comprising the catalyst supported on high aspect ratio support material, wherein the catalyst supported on low aspect ratio nanowire supported material form agglomerates which longest diameter is larger than 10 nm, a plurality of such agglomerates form the catalyst layer and contact with at least one of the other agglomerates in the catalyst layer. The porosity of catalyst layer is more than 70% and the mean pores of the catalyst layer is ranging larger than 60 nm.

Since the catalyst layer formed by packing the nanowire agglomerates has high porosity and larger pores, there is an advantage in mass transport.

(Example A) The catalyst dispersion is prepared by ultrasonicating nanowire supported PtRu catalyst, Nagion ionomer solution, water and 2-propanol. The above dispersion is sprayed onto electrolyte membrane to form anode catalyst layer. The cathode catalyst layer was formed on the opposite side from the anode catalyst layer by spraying the dispersion of carbon supported Pt catalyst, Nafion ionomer solution, water and 2-proparnol. The SEM picture clearly showed the aggolomerates of nanowire supported catalysts which longest diameter is at least more than 10 um. The catalyst layer has inhomogeneous structure composed of such aggolomerates and the majority of agglomerates contact with at least one of the other agglomerates. The porosity of the catalyst layer was calculated as 82%. The peak of the pore size distribution determined by mercury intrusion porosimetry for the catalyst layer prepared by similar manner was 147 nm. The anode polarization performance was evaluated by feeding 3 mol/L methanol to the anode and H2 to the cathode. The 93.6 mA/mg-PtRu of methanol oxidation current was obtained at 0.45V.

(Comparison A) The catalyst dispersion is prepared by ultrasonicating carbon supported PtRu catalyst, Nafion ionomer solution, water and 2-propanol. The above dispersion is sprayed onto electrolyte membrane to form anode catalyst layer. The cathode is prepared by similar manner to the example 1. The SEM picture clearly showed negligible amount of aggolomerates of carbon supported catalysts which longest diameter is at least more than 10 um and showed uniform structure. The porosity of the catalyst layer was 51%. The peak of the pore size distribution determined by mercury intrusion porosimetry for the catalyst layer prepared by similar manner was 58 nm. The 77 mA/mg-PtRu of methanol oxidation current was obtained at 0.45V.

(Comparison B) The catalyst dispersion is prepared by ball milling the nanowire supported PtRu catalyst, Nafion ionomer solution, water and 2-propanol for 30 min at 500 rpm with zirconia beads. The above dispersion is sprayed onto electrolyte membrane to form anode catalyst layer. The cathode is prepared by similar manner to the example 1. The SEM picture clearly showed negligible amount of aggolomerates of nanowire supported catalysts which longest diameter is at least more than 10 um and showed uniform structure. The porosity of the catalyst layer was 69%. The 75.4 mA/mg-PtRu of methanol oxidation current was obtained at 0.45V.

A membrane electrode assembly comprising a catalyst layer comprising the catalyst supported on high aspect ratio support material, wherein the catalyst supported on low aspect ratio nanowire supported material form agglomerate which longest diameter is larger than 10 nm, a plurality of such agglomerates form the catalyst layer and contanct with at least one of the other agglomerates in the catalyst layer.

The porosity of catalyst layer is more than 70% and the mean pores of the catalyst layer is ranging larger than 60 nm.

The catalyst dispersion is prepared by ultrasonicating the nanowire supported catalyst, proton conducting polymer and solvent. The nanowire supported catalysts form agglomerates in the dispersion because of its hydrophobic nature. Since the shear force of the ultrasonication is not so strong, the ultrasonication does not prevent agglomerate formation. Such catalyst dispersion is spray painted on the electrolyte membrane. The catalyst layer obtained by above process has a plurality of agglomerates wherein the longest diameter of agglomerates is larger than 10 nm and the resulting mean pore size is larger than 60 nm.

The void between the agglomerates promotes mass transport. So the fuel and air effectively supplied to even the catalysts near the electrolyte membrane and this feature have advantage in start-up of the fuel cell. The fuel and air transport property is good even when the catalyst layer became thick, so the fuel cell performance can be easily improved by increasing catalyst loading in the catalyst layer.

The void between the agglomerates promotes carbon dioxide and air elimination. So the stability of the fuel cell improves.

By forming the agglomerate structure, the damage or puncture of electrolyte membrane can be prevented even when high aspect ratio support material is used. So the reliability of the fuel cell improves.

The interfacial resistance between catalyst layer and gas diffusion layer or current collector decreases, since the contact area increases by forming agglomerate of support material.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

The present invention may be expressed as follows.

(1st Invention) An electrochemical catalyst nanoparticle comprising one or more metals, wherein the atomic ratio of oxygen in the nanoparticle to one of the metals in the nanoparticle is in the range of about 3 to about 6.

(2nd Invention) The electrochemical catalyst nanoparticle of the 1st invention, wherein the nanoparticles have a size of about 1 nm to about 10 nm.

(3rd Invention) The electrochemical catalyst nanoparticle of the 1st invention, wherein the atomic ratio of oxygen in the nanoparticle to one of the metals in the nanoparticle is in the range of about 3.6 to about 5.

(4th Invention) The electrochemical catalyst nanoparticle of the 1st invention, wherein the atomic ratio of oxygen in the nanoparticle to one of the metals in the nanoparticle is in the range of about 3.6 to about 4.

(5th Invention) The electrochemical catalyst nanoparticle of the 1st invention, wherein the atomic ratio of oxygen in the nanoparticle to one of the metals in the nanoparticle is about 3.6.

(6th Invention) The electrochemical catalyst nanoparticle of the 1st invention, wherein the metal comprises one or more of Pt, Au, Pd, Ru, Re, Rh, Os, Ir, Fe, Co, Ni, Cu, Ag, V, Cr, Mo, W and alloys or mixtures thereof.

(7th Invention) The electrochemical catalyst nanoparticle of the 1st invention, wherein the nanoparticle comprises Pt:Ru.

(8th Invention) The electrochemical catalyst nanoparticle of the 7th invention, wherein the ratio of oxygen to Ru is in the range of about 3.6 to about 6.

(9th Invention) The electrochemical catalyst nanoparticle of the 7th invention, wherein the ratio of oxygen to Ru is in the range of about 3.6 to about 5.

(10th Invention) The electrochemical catalyst nanoparticle of the 7th invention, wherein the ratio of oxygen to Ru is in the range of about 3.6 to about 4.

(11th Invention) The electrochemical catalyst nanoparticle of the 7th invention, wherein the ratio of oxygen to Ru is about 3.6.

(12th Invention) The electrochemical catalyst nanoparticle of the 7th invention, wherein the percentage of metallic ruthenium is less than about 30%, the percentage of metallic platinum is about 70% to about 87%, and the nanoparticle comprises nitrogen.

(13th Invention) The electrochemical catalyst nanoparticle of the 12th invention, wherein the percentage of metallic ruthenium is less than about 20%.

(14th Invention) The electrochemical catalyst nanoparticle of the 12th invention, wherein the percentage of metallic ruthenium is less than about 10%.

(15th Invention) The electrochemical catalyst nanoparticle of the 12th invention, wherein the percentage of metallic ruthenium is less than about 2%.

(16th Invention) The electrochemical catalyst nanoparticle of the 7th invention, wherein the Pt:Ru nanoparticle has a lattice parameter of greater than 3.923 Å.

(17th Invention) The electrochemical catalyst nanoparticle of the 7th invention, wherein the Pt:Ru nanoparticle has a crystal size of less than 2.2 nm.

(18th Invention) A Pt:Ru electrochemical catalyst nanoparticle, wherein the atomic ratio of oxygen to Ru in the nanoparticle is in the range of about 3 to about 6, the percentage of metallic ruthenium is less than about 30%, and the percentage of metallic platinum is about 70% to about 87%.

(19th Invention) The Pt:Ru electrochemical catalyst nanoparticle of the 18th invention, wherein the atomic ratio of oxygen to Ru in the nanoparticle is about 3.6 to about 4, the percentage of metallic ruthenium is less than about 2%, the percentage of metallic platinum is about 70% to about 87%, and the nanoparticle comprises nitrogen.

(20th Invention) The Pt:Ru electrochemical catalyst nanoparticle of the 19th invention, wherein the nanoparticle has a lattice parameter of greater than 3.923 Å.

(21st Invention) The Pt:Ru electrochemical catalyst nanoparticle of the 19th invention, wherein the nanoparticle has a crystal size of less than 2.2 nm.

(22nd Invention) A nanowire-supported electrochemical catalyst, the electrochemical catalyst comprising a nanoparticle comprising one or more metals, wherein the atomic ratio of oxygen in the nanoparticle to one of the metals in the nanoparticle is in the range of about 3 to about 6.

(23rd Invention) The nanowire-supported electrochemical catalyst of the 22nd invention, wherein the nanoparticle has a size of about 1 nm to about 10 nm.

(24th Invention) The nanowire-supported electrochemical catalyst of the 22nd invention, wherein the atomic ratio of oxygen in the nanoparticle to one of the metals in the nanoparticle is in the range of about 3.6 to about 5.

(25th Invention) The nanowire-supported electrochemical catalyst of the 22nd invention, wherein the atomic ratio of oxygen in the nanoparticle to one of the metals in the nanoparticle is in the range of about 3.6 to about 4.

(26th Invention) The nanowire-supported electrochemical catalyst of the 22nd invention, wherein the atomic ratio of oxygen in the nanoparticle to one of the metals in the nanoparticle is about 3.6.

(27th Invention) The nanowire-supported electrochemical catalyst of the 22nd invention, wherein the metal comprises one or more of Pt, Au, Pd, Ru, Re, Rh, Os, Ir, Fe, Co, Ni, Cu, Ag, V, Cr, Mo, W and alloys or mixtures thereof.

(28th Invention) The nanowire-supported electrochemical catalyst of the 22nd invention, wherein the nanoparticle comprises Pt:Ru.

(29th Invention) The nanowire-supported electrochemical catalyst of the 28th invention, wherein the ratio of oxygen to Ru is in the range of about 3.6 to about 6.

(30th Invention) The nanowire-supported electrochemical catalyst of the 28th invention, wherein the ratio of oxygen to Ru is in the range of about 3.6 to about 5.

(31st Invention) The nanowire-supported electrochemical catalyst of the 28th invention, wherein the ratio of oxygen to Ru is in the range of about 3.6 to about 4.

(32nd Invention) The nanowire-supported electrochemical catalyst of the 28th invention, wherein the ratio of oxygen to Ru is about 3.6.

(33rd Invention) The nanowire-supported electrochemical catalyst of the 28th invention, wherein the percentage of metallic ruthenium is less than about 30%, the percentage of metallic platinum is about 70% to about 87%, and the nanoparticle comprises nitrogen.

(34th Invention) The nanowire-supported electrochemical catalyst of the 33th invention, wherein the percentage of metallic ruthenium is less than about 20%.

(35th Invention) The nanowire-supported electrochemical catalyst of the 33th invention, wherein the percentage of metallic ruthenium is less than about 10%.

(36th Invention) The nanowire-supported electrochemical catalyst of the 33th invention, wherein the percentage of metallic ruthenium is less than about 2%.

(37th Invention) The nanowire-supported electrochemical catalyst of the 28th invention, wherein the Pt:Ru nanoparticle has a lattice parameter of greater than 3.923 Å.

(38th Invention) The nanowire-supported electrochemical catalyst of the 28th invention, wherein the Pt:Ru nanoparticle has a crystal size of less than 2.2 nm.

(39th Invention) The nanowire-supported electrochemical catalyst of the 22nd invention, wherein the nanowires are selected from the group consisting of $RuO_2$, SiC, GaN, $TiO_2$, $SnO_2$, $WC_x$, $MoC_x$, ZrC, $WN_x$, and $MoN_x$ nanowires, wherein x is a positive integer.

(40th Invention) A nanowire-supported electrochemical catalyst, the electrochemical catalyst comprising a Pt:Ru nanoparticle, wherein the atomic ratio of oxygen to Ru in the nanoparticle is about 3 to about 6, the percentage of metallic ruthenium is less than about 30%, and the percentage of metallic platinum is about 70% to about 90%.

(41st Invention) The nanowire-supported electrochemical catalyst of the 40th invention, wherein the atomic ratio of oxygen to Ru in the nanoparticle is about 3.6 to about 4, the percentage of metallic ruthenium is less than about 2%, and the percentage of metallic platinum is about 70% to about 87%, and the nanoparticle comprises nitrogen.

(42nd Invention) The nanowire-supported electrochemical catalyst of the 40th invention, wherein the nanowire is selected from the group consisting of $RuO_2$, SiC, GaN, $TiO_2$, $SnO_2$, $WC_x$, $MoC_x$, ZrC, $WN_x$, and $MoN_x$ nanowires, wherein x is a positive integer.

(43rd Invention) The nanowire-supported electrochemical catalyst of the 40th invention, wherein the nanoparticle has a lattice parameter of greater than 3.923 Å.

(44th Invention) The nanowire-supported electrochemical catalyst of the 40th invention, wherein the nanoparticle has a crystal size of less than 2.2 nm.

(45th Invention) A membrane electrode assembly comprising an electrochemical catalyst nanoparticle comprising one or more metals, wherein the atomic ratio of oxygen in the nanoparticle to one of the metals in the nanoparticle is about 3 to about 6.

(46th Invention) The membrane electrode assembly of the 45th invention, wherein the nanoparticle has a size of about 1 nm to about 10 nm.

(47th Invention) The membrane electrode assembly of the 45th invention, wherein the atomic ratio of oxygen in the nanoparticle to one of the metals in the nanoparticle is in the range of about 3.6 to about 5.

(48th Invention) The membrane electrode assembly of the 45th invention, wherein the atomic ratio of oxygen in the nanoparticle to one of the metals in the nanoparticle is in the range of about 3.6 to about 4.

(49th Invention) The membrane electrode assembly of the 45th invention, wherein the atomic ratio of oxygen in the nanoparticle to one of the metals in the nanoparticle is about 3.6.

(50th Invention) The membrane electrode assembly of the 45th invention, wherein the metal comprises one or more of Pt, Au, Pd, Ru, Re, Rh, Os, Ir, Fe, Co, Ni, Cu, Ag, V, Cr, Mo, W and alloys or mixtures thereof.

(51st Invention) The membrane electrode assembly of the 45th invention, wherein the nanoparticle comprises Pt:Ru.

(52nd Invention) The membrane electrode assembly of the 51st invention, wherein the ratio of oxygen to Ru is in the range of about 3.6 to about 6.

(53rd Invention) The membrane electrode assembly of the 51st invention, wherein the ratio of oxygen to Ru is in the range of about 3.6 to about 5.

(54th Invention) The membrane electrode assembly of the 51st invention, wherein the ratio of oxygen to Ru is in the range of about 3.6 to about 4.

(55th Invention) The membrane electrode assembly of the 51st invention, wherein the ratio of oxygen to Ru is about 3.6.

(56th Invention) The membrane electrode assembly of the 51st invention, wherein the percentage of metallic ruthenium is less than about 30%, and the percentage of metallic platinum is about 70% to about 87%, and the nanoparticle comprises nitrogen.

(57th Invention) The membrane electrode assembly of the 56th invention, wherein the percentage of metallic ruthenium is less than about 20%.

(58th Invention) The membrane electrode assembly of the 56th invention, wherein the percentage of metallic ruthenium is less than about 10%.

(59th Invention) The membrane electrode assembly of the 56th invention, wherein the percentage of metallic ruthenium is less than about 2%.

(60th Invention) The membrane electrode assembly of the 51st invention, wherein the Pt:Ru nanoparticle has a lattice parameter of greater than 3.923 Å.

(61st Invention) The membrane electrode assembly of the 51st invention, wherein the Pt:Ru nanoparticle has a crystal size of less than 2.2 nm.

(62nd Invention) A membrane electrode assembly comprising a Pt:Ru electrochemical catalyst nanoparticle, wherein the atomic ratio of oxygen to Ru in the nanoparticle is about 3 to about 6, the percentage of metallic ruthenium is less than about 30%, and the percentage of metallic platinum is about 70% to about 90%.

(63rd Invention) The membrane electrode assembly of the 62nd invention, wherein the atomic ratio of oxygen to Ru in the nanoparticle is about 3.6 to about 4, the percentage of metallic ruthenium is less than about 10%, and the percentage of metallic platinum is about 70% to about 87%, and the nanoparticle comprises nitrogen.

(64th Invention) The membrane electrode assembly of the 62nd invention, wherein the electrochemical catalyst nanoparticle is a nanowire-supported electrochemical catalyst nanoparticle.

(65th Invention) The membrane electrode assembly of the 62nd invention, wherein the membrane electrode assembly is a component of a fuel cell.

(66th Invention) The membrane electrode assembly of the 65th invention, wherein the membrane electrode assembly is a component of a methanol fuel cell, a formic acid fuel cell, an ethanol fuel cell, a hydrogen fuel cell or an ethylene glycol fuel cell.

(67th Invention) The membrane electrode assembly of the 62nd invention, wherein the nanoparticle has a lattice parameter of greater than 3.923 Å.

(68th Invention) The membrane electrode assembly of the 51st invention, wherein the nanoparticle has a crystal size of less than 2.2 nm.

(69th Invention) A method of preparing a nanowire-supported Pt:Ru electrochemical catalyst nanoparticle, wherein the atomic ratio of oxygen to Ru in the nanoparticle is in the range of about 3 to about 6, the percentage of metallic ruthenium is less than about 30%, and the percentage of metallic platinum is about 70% to about 90%, comprising:

(a) providing a Pt:Ru colloid solution prepared by combining $RCl_3 xH_2O$, ethylene glycol, $H_2PtCl_6 xH_2O$ and NaOH;

(b) adding the solution of (a) to a suspension of nanowires to prepare a nanowire-Pt:Ru colloid solution;

(c) reducing the pH of the nanowire-Pt:Ru colloid solution; and (d) recovering the nanowire-supported Pt:Ru electrochemical catalyst nanoparticle.

(70th Invention) The method of the 69th invention, wherein the adding comprises adding the solution of (a) to a suspension of carbon-comprising nanowires.

(71st Invention) The method of the 69th invention, wherein the reducing comprises reducing the pH to pH 11, then to pH 7, then to pH 4, then to pH 1, over the course of about 18 hours, using nitric acid.

(72nd Invention) The method of the 69th invention, wherein the recovering comprises filtering and washing the nanowire-supported Pt:Ru electrochemical catalyst nanoparticle.

(73rd Invention) The method of the 69th invention, further comprising heating the nanowire-supported Pt:Ru electrochemical catalyst nanoparticle to about 180° C. for about 5 hours after the recovering.

(74th Invention) A catalyst support for a membrane electrode assembly of a fuel cell comprising cross-linked carbon powder, wherein the powder has at least one metal catalyst deposited thereon.

(75th Invention) The catalyst support of the 74th invention, wherein the catalyst metal comprises one or more of Pt, Au, Pd, Ru, Re, Rh, Os, Ir, Fe, Co, Ni, Cu, Ag, V, Cr, Mo, W and alloys or mixtures thereof.

(76th Invention) The catalyst support of the 74th invention, wherein the catalyst metal comprises nanoparticles having a diameter less than about 10 nm or less than about 5 nm.

(77th Invention) The catalyst support of the 74th invention, wherein the cross-linked carbon powder is cross-linked via graphene sheets.

(78th Invention) The catalyst support of the 74th invention, further comprising a proton conducting polymer in contact with the carbon powder.

(79th Invention) The catalyst support of the 74th invention, wherein the membrane electrode assembly is a component in a direct methanol fuel cell (DMFC).

(80th Invention) The catalyst support of the 74th invention, wherein the catalyst metal comprises nanoparticles comprising Pt:Ru.

(81st Invention) The catalyst support of the 80th invention, wherein the atomic ratio of oxygen to Ru in the nanoparticle is in the range of about 3.6 to about 6.

(82nd Invention) The catalyst support of the 81st invention, wherein the ratio of oxygen to Ru is in the range of about 3.6 to about 5.

(83rd Invention) The catalyst support of the 81st invention, wherein the ratio of oxygen to Ru is in the range of about 3.6 to about 4.

(84th Invention) The catalyst support of the 81st invention, wherein the ratio of oxygen to Ru is about 3.6.

(85th Invention) The catalyst support of the 80th invention, wherein the percentage of metallic ruthenium is less than about 30%, and the percentage of metallic platinum is about 70% to about 87%, and the nanoparticle comprises nitrogen.

(86th Invention) The catalyst support of the 85th invention, wherein the percentage of metallic ruthenium is less than about 20%.

(87th Invention) The catalyst support of the 85th invention, wherein the percentage of metallic ruthenium is less than about 10%.

(88th Invention) The catalyst support of the 85th invention, wherein the percentage of metallic ruthenium is less than about 2%.

(89th Invention) The catalyst support of the 80th invention, wherein the Pt:Ru nanoparticle has a lattice parameter of greater than 3.923 Å.

(90th Invention) The catalyst support of the 80th invention, wherein the Pt:Ru nanoparticle has a crystal size of less than 2.2 nm.

(91st Invention) A catalyst support for a membrane electrode assembly of a fuel cell comprising a composite of a network of inorganic nanowires and carbon powder, wherein said nanowires have at least one metal catalyst deposited thereon.

(92nd Invention) The catalyst support of the 91st invention, wherein the catalyst metal comprises one or more of Pt, Au, Pd, Ru, Re, Rh, Os, Ir, Fe, Co, Ni, Cu, Ag, V, Cr, Mo, W and alloys or mixtures thereof.

(93rd Invention) The catalyst support of the 91st invention, wherein the catalyst metal comprises nanoparticles having a diameter less than about 10 nm or less than about 5 nm.

(94th Invention) The catalyst support of the 91st invention, wherein the nanowires are selected from the group comprising $RuO_2$, SiC, GaN, $TiO_2$, $SnO_2$, $WC_x$, $MoC_x$, ZrC, $WN_x$, and MoNx nanowires.

(95th Invention) The catalyst support of the 91st invention, further comprising a proton conducting polymer in contact with the nanowires.

(96th Invention) The catalyst support of the 91st invention, wherein the membrane electrode assembly is a component in a direct methanol fuel cell (DMFC).

(97th Invention) The catalyst support of the 91st invention, wherein the catalyst metal comprises nanoparticles comprising Pt:Ru.

(98th Invention) The catalyst support of the 97th invention, wherein the atomic ratio of oxygen to Ru in the nanoparticle is in the range of about 3.6 to about 6.

(99th Invention) The catalyst support of the 98th invention, wherein the ratio of oxygen to Ru is in the range of about 3.6 to about 5.

(100th Invention) The catalyst support of the 98th invention, wherein the ratio of oxygen to Ru is in the range of about 3.6 to about 4.

(101st Invention) The catalyst support of the 98th invention, wherein the ratio of oxygen to Ru is about 3.6.

(102nd Invention) The catalyst support of the 97th invention, wherein the percentage of metallic ruthenium is less than about 30%, and the percentage of metallic platinum is about 70% to about 87%, and the nanoparticle comprises nitrogen.

(103rd Invention) The catalyst support of the 102nd invention, wherein the percentage of metallic ruthenium is less than about 20%.

(104th Invention) The catalyst support of the 102nd invention, wherein the percentage of metallic ruthenium is less than about 10%.

(105th Invention) The catalyst support of the 102nd invention, wherein the percentage of metallic ruthenium is less than about 2%.

(106th Invention) The catalyst support of the 97th invention, wherein the Pt:Ru nanoparticle has a lattice parameter of greater than 3.923 Å.

(107th Invention) The catalyst support of the 97th invention, wherein the Pt:Ru nanoparticle has a crystal size of less than 2.2 nm.

(108th Invention) A catalyst support for a membrane electrode assembly of a fuel cell comprising carbon black, wherein said carbon black has at least one metal catalyst deposited thereon.

(109th Invention) The catalyst support of the 108th invention, wherein the catalyst metal comprises one or more of Pt, Au, Pd, Ru, Re, Rh, Os, Ir, Fe, Co, Ni, Cu, Ag, V, Cr, Mo, W and alloys or mixtures thereof.

(110th Invention) The catalyst support of the 108th invention, wherein the catalyst metal comprises nanoparticles having a diameter less than about 10 nm or less than about 5 nm.

(111st Invention) The catalyst support of the 108th invention, further comprising a proton conducting polymer in contact with the carbon black.

(112nd Invention) The catalyst support of the 108th invention, wherein the membrane electrode assembly is a component in a direct methanol fuel cell (DMFC).

(113rd Invention) The catalyst support of the 108th invention, wherein the catalyst metal comprises nanoparticles comprising Pt:Ru.

(114th Invention) The catalyst support of the 113th invention, wherein the atomic ratio of oxygen to Ru in the nanoparticle is in the range of about 3.6 to about 6.

(115th Invention) The catalyst support of the 114th invention, wherein the ratio of oxygen to Ru is in the range of about 3.6 to about 5.

(116th Invention) The catalyst support of the 114th invention, wherein the ratio of oxygen to Ru is in the range of about 3.6 to about 4.

(117th Invention) The catalyst support of the 114th invention, wherein the ratio of oxygen to Ru is about 3.6.

(118th Invention) The catalyst support of the 113th invention, wherein the percentage of metallic ruthenium is less than about 30%, and the percentage of metallic platinum is about 70% to about 87%, and the nanoparticle comprises nitrogen.

(119th Invention) The catalyst support of the 118th invention, wherein the percentage of metallic ruthenium is less than about 20%.

(120th Invention) The catalyst support of the 118th invention, wherein the percentage of metallic ruthenium is less than about 10%.

(121st Invention) The catalyst support of the 118th invention, wherein the percentage of metallic ruthenium is less than about 2%.

(122nd Invention) The catalyst support of the 113th invention, wherein the Pt:Ru nanoparticle has a lattice parameter of greater than 3.923 Å.

(123rd Invention) The catalyst support of the 113th invention, wherein the Pt:Ru nanoparticle has a crystal size of less than 2.2 nm.

INDUSTRIAL APPLICABILITY

The present invention allows providing a catalyst layer, a fuel cell membrane electrode assembly, and a fuel cell, each of which has a compact size and has excellent power generation performance, and a method for producing the catalyst layer, the fuel cell membrane electrode assembly, and the fuel cell. Therefore, the present invention is applicable to various kinds of cells (such as fuel cells).

What is claimed is:

1. A catalyst layer for a fuel cell membrane electrode assembly, the catalyst layer comprising:
    a plurality of agglomerates, adjacent ones of the plurality of agglomerates contacting with each other with pores provided between said adjacent ones of the plurality of agglomerates,
    wherein each of the plurality of agglomerates having a plurality of catalysts packed together, each of the plurality of catalysts consisting of noble metal fine particles supported on a fiber-like support material,
    wherein the catalysts packed in the agglomerates are positioned in a network manner,
    wherein adjacent ones of the plurality of catalysts being in contact with each other with pores provided between said adjacent ones of the plurality of catalysts, and
    wherein any given one of the catalysts of the plurality of catalysts contacts one or more other catalysts of the plurality of catalysts.

2. The catalyst layer as set forth in claim 1, wherein mean pore size of the pores provided between said adjacent ones of the plurality of agglomerates is larger than mean pore size of the pores provided between said adjacent ones of the plurality of catalysts.

3. The catalyst layer as set forth in claim 2, wherein
    (a) the mean pore size of the pores provided between said adjacent ones of the plurality of catalysts is not less than 60 nm and not more than 250 nm, and
    (b) the mean pore size of the pores provided between said adjacent ones of the plurality of agglomerates is not less than 0.5 μm and not more than 5 μm.

4. The catalyst layer as set forth in claim 3, wherein mean diameter of the fiber-like support material is not more than 300 nm and an aspect ratio of the fiber-like support material is not less than 10 and not more than 1350, the aspect ratio being obtained by dividing mean diameter of the agglomerates by thickness of the fiber-like support material.

5. The catalyst layer as set forth in claim 4, wherein mean equivalent circle diameter of the plurality of agglomerates is not less than 1 μm and not more than 10 μm.

6. The catalyst layer as set forth in claim 4, wherein content of all pores whose size ranges from 0.5 μm to 5 μm out of the pores provided between said adjacent ones of the plurality of agglomerates is not less than 0.5% and not more than 5% with respect to content of all pores existing in the catalyst layer.

7. A fuel cell membrane electrode assembly, wherein at least one of an anode catalyst layer and a cathode catalyst layer is a catalyst layer as set forth in claim 1.

8. A fuel cell, comprising a fuel cell membrane electrode assembly as set forth in claim 7.

9. The catalyst layer as set forth in claim 3, wherein a central value of a numerical range of an aspect ratio of the fiber-like support material, the aspect ratio being obtained by dividing mean diameter of the agglomerates by thickness of the fiber-like support material, is 165.

10. The catalyst layer as set forth in claim 1, wherein the fiber-like support material is nanographite coated nanowires, and the fiber-like support material includes fiber-like support materials which are interconnected while being coated with nanographite.

11. The catalyst layer as set forth in claim 1, wherein a shape formed by outer surface of the agglomerate is a sphere.

* * * * *